United States Patent [19]

Webb, Jr. et al.

[11] Patent Number: 4,819,162

[45] Date of Patent: Apr. 4, 1989

[54] TIME CLOCK SYSTEM INCLUDING SCHEDULING PAYROLL AND PRODUCTIVITY ANALYSIS CAPABILITY

[75] Inventors: Frederick W. Webb, Jr., Edina; Allen D. Almendinger, Bloomington; Kevin L. Bright, Minneapolis; Kenneth J. Hendren, Eagan; Donald D. Petersen, Long Lake; Michael B. Dandrea, Minneapolis; Wesley R. Carlson, Roseville, all of Minn.

[73] Assignee: Time Management Corporation, Golden Valley, Minn.

[21] Appl. No.: 161,322

[22] Filed: Feb. 9, 1988

Related U.S. Application Data

[63] Continuation of Ser. No. 735,388, May 17, 1985, abandoned.

[51] Int. Cl.$^4$ ............................ G06F 15/21; G06k 7/10
[52] U.S. Cl. ................................. 364/401; 235/377; 346/20; 346/80; 364/406
[58] Field of Search ............... 364/406, 401; 235/376, 235/377; 346/20, 80, 86

[56] References Cited

U.S. PATENT DOCUMENTS

| | | | |
|---|---|---|---|
| 2,935,252 | 5/1960 | Brearley | 235/377 |
| 3,596,277 | 7/1971 | De Witt et al. | 346/14 R |
| 3,648,243 | 3/1972 | Wiggins | 364/406 X |
| 3,736,409 | 5/1973 | Boyan | 235/376 |
| 3,740,759 | 6/1973 | McKeegan et al. | 235/458 |
| 3,894,215 | 7/1975 | Lotter et al. | 235/377 |
| 4,011,434 | 3/1977 | Hockler | 346/33 M X |
| 4,170,015 | 10/1979 | Elliano et al. | 346/76 PH |
| 4,270,043 | 5/1981 | Baxter et al. | 235/377 X |
| 4,323,771 | 4/1982 | Chalker, Jr. et al. | 235/376 X |
| 4,333,085 | 6/1982 | Witts | 235/377 X |
| 4,361,092 | 11/1982 | Krakauer | 101/91 |
| 4,387,367 | 6/1983 | Fisher | 340/365 P |
| 4,401,994 | 8/1983 | Witts et al. | 235/377 |
| 4,409,657 | 10/1983 | Van der Legy | 364/406 |
| 4,466,078 | 8/1984 | Treiman | 235/377 |
| 4,506,274 | 3/1985 | Coe | 235/377 X |
| 4,516,138 | 5/1985 | Inagawa et al. | 235/377 X |
| 4,524,266 | 6/1985 | Krakauer et al. | 235/377 |
| 4,536,646 | 8/1985 | Adams et al. | 235/377 |
| 4,538,056 | 8/1985 | Young et al. | 235/377 X |
| 4,549,264 | 10/1985 | Carroll et al. | 364/406 |
| 4,567,357 | 1/1986 | Fedele | 235/377 |
| 4,658,357 | 4/1987 | Carroll et al. | 364/406 |

OTHER PUBLICATIONS

Remanco Systems Inc., *How to Keep Tabs on Your Staff;* 1984.

Primary Examiner—Jerry Smith
Assistant Examiner—Charles B. Meyer
Attorney, Agent, or Firm—Merchant, Gould, Smith, Edell, Welter & Schmidt

[57] ABSTRACT

The computerized time clock system includes a personal computer via which employee, job and schedule records may be assembled and maintained. A computerized time clock communicates with the personal computer and received employee and scheduling data therefrom, in order to validate and record time-in and time-out transactions executed by employees. Current time records are maintained in the memory of the time clock and at the end of each day are transmitted to the personal computer for addition to permanent disk records including a record of each time-in and time-out transaction for an extended period. Sales records may also be maintained in personal computer 20, for example the quantity of liquor or food served by a particular employee or in a particular department, which sales information may be correlated with labor costs found in the permanent time records.

29 Claims, 41 Drawing Sheets

220 →

306 — SCHEDULED TIME OUT WAS hhmm

307 — EMPLOYEE NAME

308 — GET REAL TIME

309 — CANCEL? NO → 2, YES

310

2 ↓

320 — OUT OF TIME TO TRF

321 — TIPS? NO →

322 — ENTER TIPS $DDDD.CC

323 — GET TIPS

324 — TIPS TO TRF

220

325 — TIME OUT THE EMPLOYEE

326 — CERTIFICATION

↓ 1 ered time clock system wherein employee records, sales
TIME CLOCK SYSTEM INCLUDING SCHEDULING PAYROLL AND PRODUCTIVITY ANALYSIS CAPABILITY This is a continuation of application No. 735,388, filed May 17, 1985 and now abandoned.

TECHNICAL FIELD OF THE INVENTION

The present invention pertains generally to employee time accounting apparatus, and more particularly to multipurpose computerized time accounting systems.

BACKGROUND OF THE INVENTION

Systematic and accurate time keeping for hourly employees is an essential for most businesses, providing time records for the preparation of payroll and, in addition, for control of time keeping abuses and monitoring of employee productivity. Traditionally, time records have been maintained on "time cards", which are typically used in connection with a mechanical time clock which stamps in and out times on the card. Payroll is then prepared with reference to the time records stamped on a card. Others have recognized, however, that maintaining these records in computer readable form, in addition to human readable form, would permit automization of payroll preparation.

As indicated, others have provided time keeping systems which allow integration of time keeping and payroll functions. These systems generally provide for computer readable time records which may be transferred or input to a computerized payroll system for the automatic preparation of payroll checks. There are, however, various drawbacks to those systems, and many other valuable functions which have not heretofore been implemented in a computerized time keeping system. Employee scheduling, employee productivity analysis and anti-abuse time keeping controls are just a few of these functions.

SUMMARY OF THE INVENTION

The present invention provides a personal computerized time clock system wherein employee records, sales records, time records and scheduling records are maintained in a personal computer (preferably the IBM TM PC) and wherein a remote computerized time clock interfaced with the personal computer is utilized by employees for time-in and time-out transactions. According to one aspect of the invention the computerized time clock includes computer means having input keyboard means, output printer means, output display means and memory means. A real time clock means is included in the time clock and is used for maintaining the current time and date. The memory means holds a digital data file indicative of valid employee codes, time-in and time-out times for scheduled employees, valid job codes indicative of what job the employee is scheduled to perform, the employee name associated with each of employee codes and time record files of time-in and time-out transactions recorded on the time clock.

Software means is provided in the time clock means for controlling time-in and time-out transactions. A first routine includes means for monitoring the keyboard means to detect and interpret the entry of an employee number and transaction code, means for checking an entered employee code against the file of valid employee codes, means for rejecting invalid employee codes and causing a corresponding message to be displayed. In response to a time-in transaction code the software means checks the entered employee code against the codes associated with employees currently working and aborts the time-in transaction if an employee is currently timed-in, reads the current time from the real time clock and compares the current time against the employee scheduled time-in and aborts the time-in transaction if the times vary beyond a predetermined limit, retrieves the employee name associated with the employee code and displays the name, prompts the employee for a job code indicative of the job to be performed by the employee, gets the job code entered, compares the entered job code against the valid job code for verification, rounds the current time to a predetermined fraction of an hour, compares the rounded time against the scheduled time and records the rounded time as the employee's time-in time if the rounded time-in is greater than the scheduled time and in the alternative records the scheduled time, stores the time-in time in a record in the memory means, and produces a written record of the time-in transaction for the employee. In response to a time-out transaction code the software means checks for a corresponding time-in record in the memory means and aborts the time-out transaction if there is no record of the employee timing in, reads the current time from the real time clock, rounds the current time to a predetermined fraction of an hour, compares the rounded time against the employee scheduled time-out time and aborts the time-out transaction if the rounded time is later than the scheduled time-out, records the rounded time-out time in the time record file and produces a written record of the time-in and time-out transaction for the employee.

According to another aspect of the invention there is provided software means operative on the personal computer for creating and maintaining employee and job files for maintaining a list of employees, the jobs for which they are qualified to work, the pay rate per hour of each of the various jobs in the facility, and a computerized schedule which may be communicated to the computerized time clock for reference during time-in and time-out transactions. Preferably, the employee, job and schedule files are built and maintained by the manager, and are downloaded to the computerized time clock on a daily basis. The computerized time clock references these files to validate time-in and time-out transactions, and compiles a file including a record for each time-in and time-out transaction on the clock. The compiled records are then transmitted back to the personal computer during a processing time each day, and the time-in and time-out transaction records are added to one or more diskette files which include time-in and time-out transaction records for an extended period of time.

According to yet another aspect of the invention there is provided software means operable on the personal computer for entering sales data pertaining to a particular facility's sales or to a particular individual's sales, and further software means for comparing these sales data against labor expenses extracted from the time-in and time-out transaction records. These and other aspects of the invention will be described below in more detail.

DETAILED DESCRIPTION OF THE INVENTION

The System

Figure 1A:
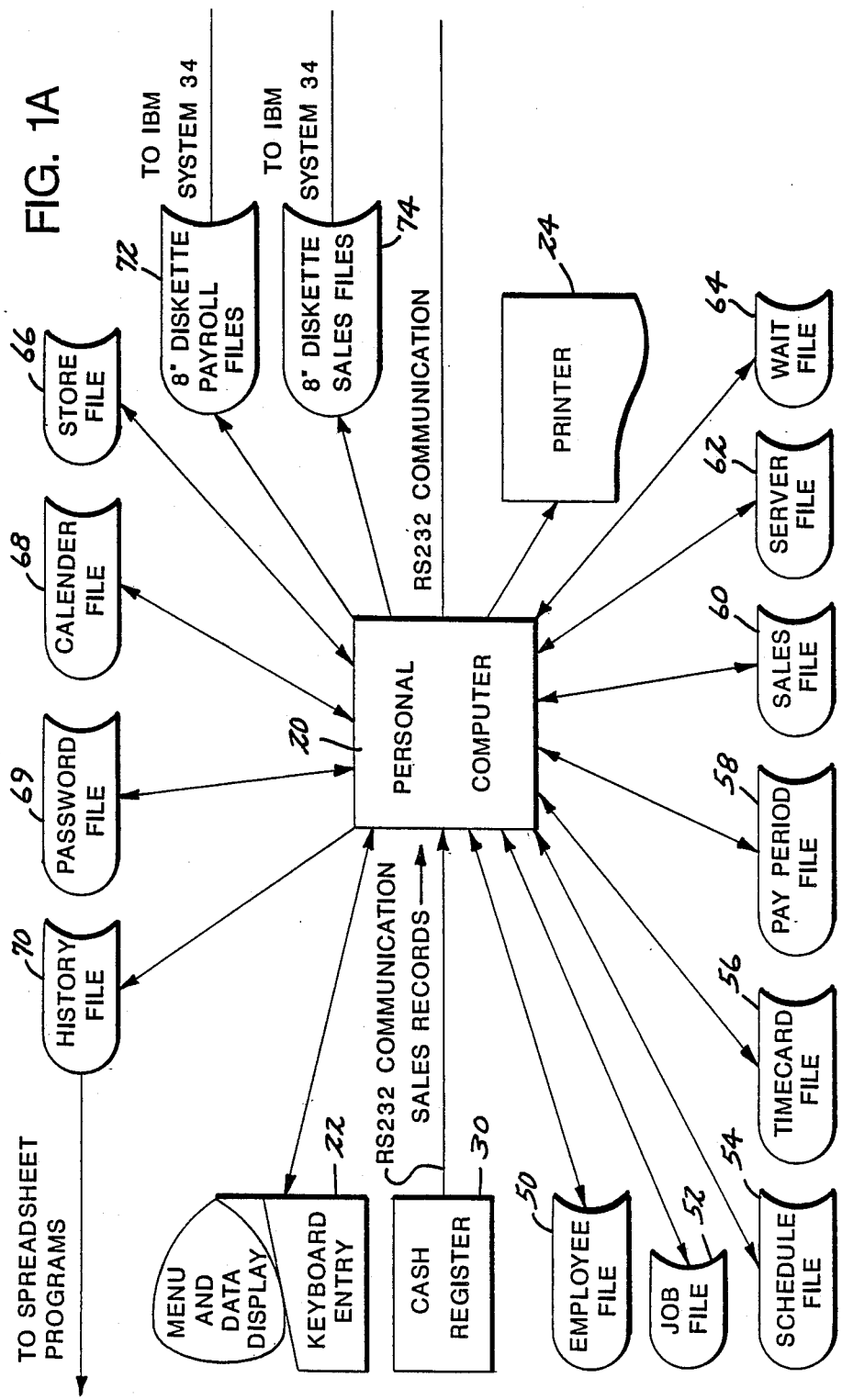
FIGS. 1A and 1B comprise a diagramatic overview of the time clock system of the present invention.
Figure 1B:
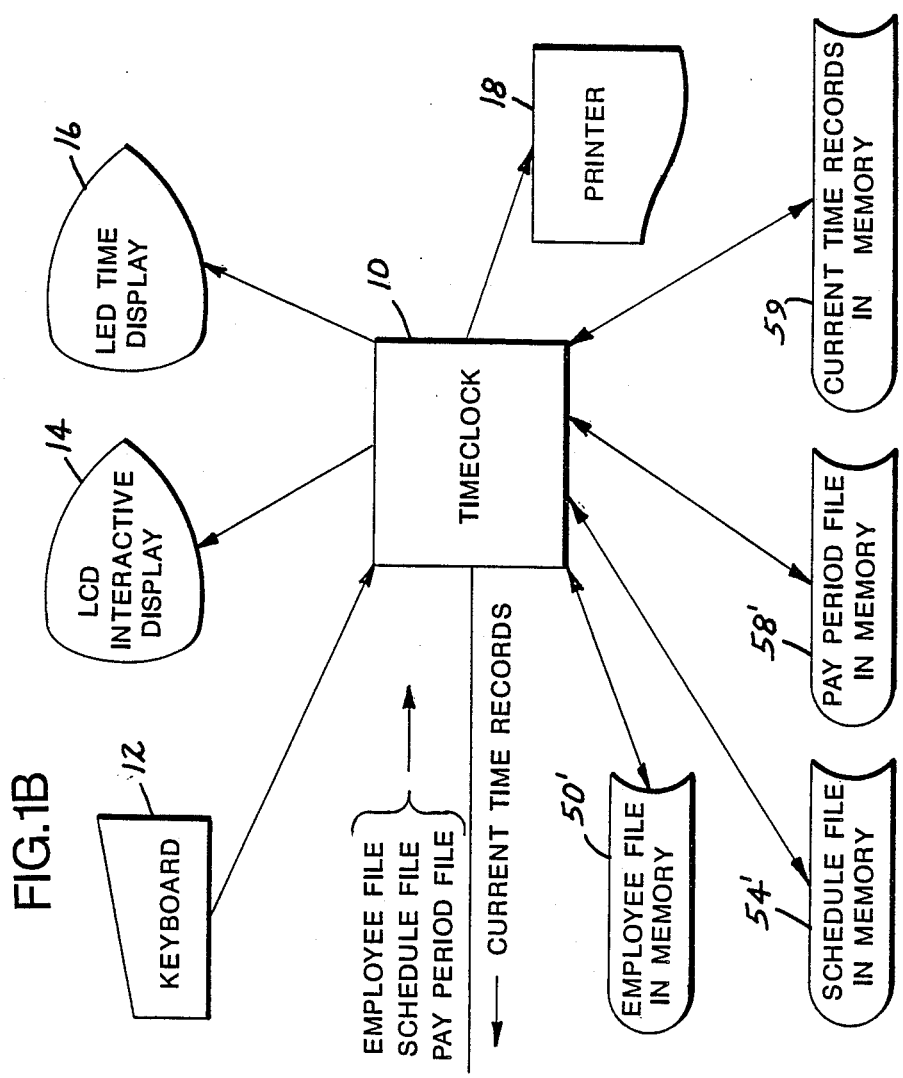

In general terms the present invention is a computerized time clock system which can perform time keeping, payroll, scheduling and productivity analysis functions. In the embodiment disclosed herein the invention is designed for the restaurant/bar business, but it is readily adaptable to other kinds of businesses, as those skilled in the art will appreciate. (For a quick appreciation of the present invention please refer to the "Operation" section). Referring to FIGS. 1A and 1B, the present invention is shown in diagrammatic form. In terms of hardware, the invention includes a computerized time clock 10, having a keyboard 12, interactive display 14, time display 16 and a printer 18. Time clock 10 is connected via an RS 232 interface to a personal computer 20, which includes a keyboard and CRT 22, and a printer 24. Personal computer 20 is optionally connected to one or more computerized cash registers 30 via RS 232 interfaces.

Figure 3:
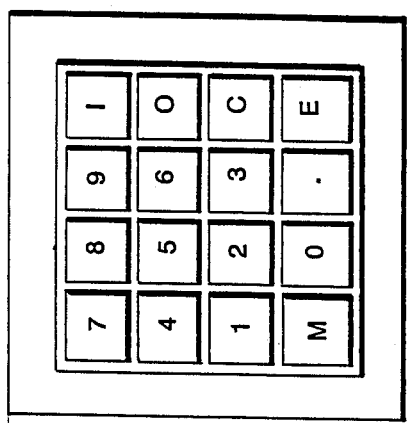
FIG. 3 is a detailed view of the time clock keyboard according to the present invention.
Figure 2:
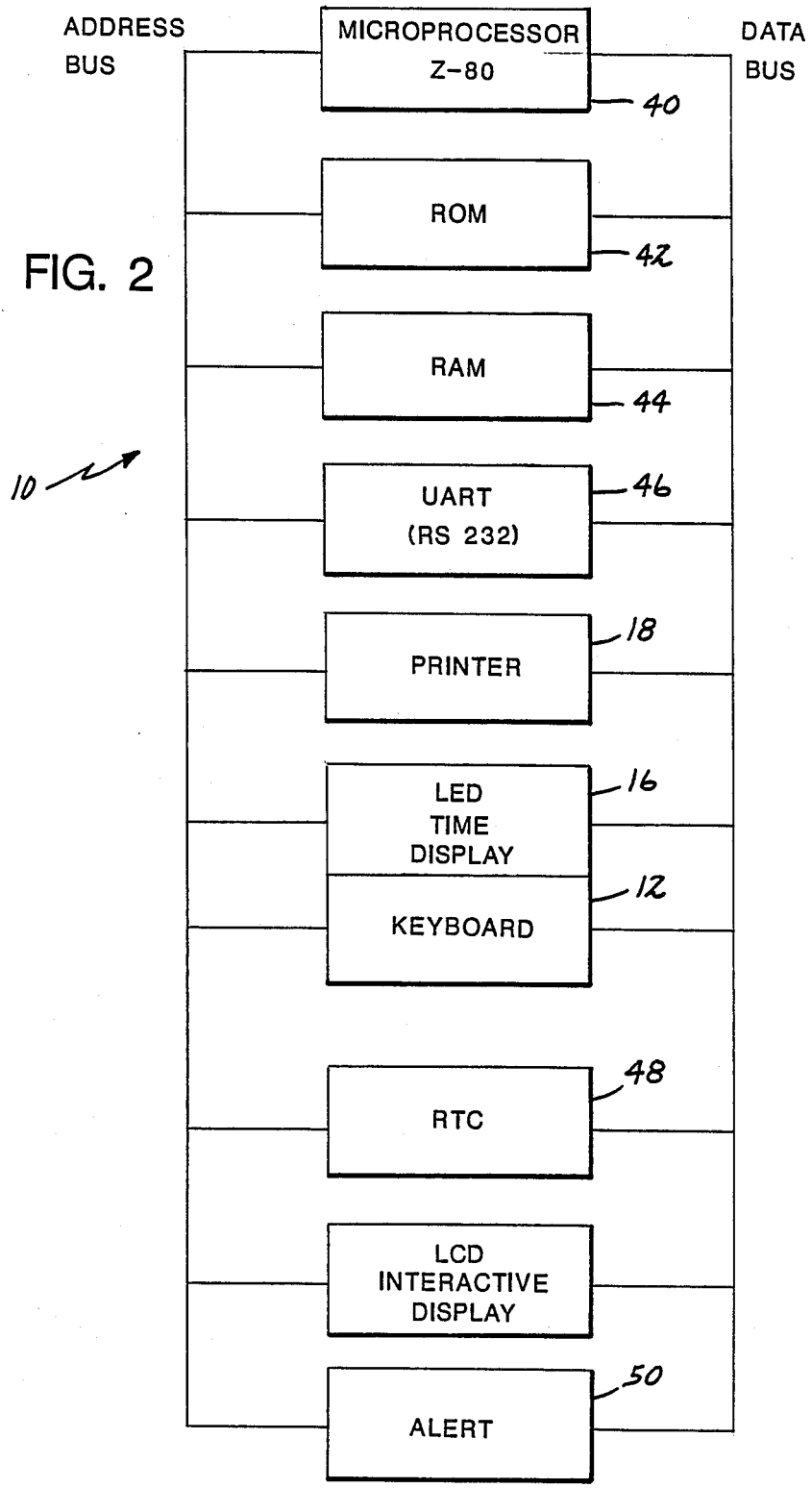
FIG. 2 is a block diagram of the time clock according to the present invention.

Referring momentarily to FIGS. 2 and 3, time clock 10 and its associated components are shown in greater detail. Clock 10 includes a microprocessor 40, ROM 42, RAM 44, communications UART 46, printer 18, LED time display 16, keyboard 12, a real time clock 48, interactive display 14 and an alert or beeper 50. As shown in FIG. 3, keyboard 12 consists of a 16 key matrix including the numeric characters 0–9, and the alpha characters "M", ".", "E", "C", "O" and "I".

Returning to FIG. 1, an overview of the various software files maintained and utilized by personal computer and time clock 10 will be given. Personal computer 20 maintains various files on diskettes, including:

EMPLOYEE FILE 50
JOB FILE 52
SCHEDULE FILE 54
TIMECARD FILE 56
PAY PERIOD FILE 58
SALES FILE 60
SERVER FILE 62
WAIT FILE 64
STORE FILE 66
CALENDAR FILE 68
PASSWORD FILE 69
HISTORY FILE 70

Personal computer 20 also generates PAYROLL FILES 72 and SALES FILES 74, which are preferably recorded on floppy disks which may be utilized by a larger system, such as an IBM system 34, to generate payroll checks or accounting records, respectively. As indicated, HISTORY FILE 70 is also transportable for use by software outside the system of the present invention, in particular a spread sheet program such as LOTUS 1 2 3 ®.

Time clock 10 maintains in its RAM 44 an EMPLOYEE FILE 50', SCHEDULE FILE 54' and PAY PERIOD FILED 58', which are downloaded copies of the corresponding computer 20 files 50, 54 and 58. In addition, time clock 10 creates and maintains a CURRENT TIME RECORDS FILE 59, which is also stored in RAM 44.

The utilization of the system of the present invention preferably begins with the initialization and building of various files, with JOB FILE 52 preferably first after the PASSWORD FILE, which will be described below. The JOB FILE 52 consists of a plurality of records each organized as shown below.

1. JOB CODE NUMBER _ _ _ _
2. DEPARTMENT NAME
3. RATE PER HOUR
4. TIP CODE

Each record in the JOB FILE 52 contains a four digit job code number which corresponds to a given job in a facility, for example a waiter, bartender, receptionist, bus boy etc. Associated with the job code number is a department name, the rate per hour for the job, and a tip code, which is either a "0" or "1", designating whether or not tips are normally received in connection with the job. As will be discussed in more detail below, several other files access JOB FILE 52 for information while being assembled.

EMPLOYEE FILE 50 must also be assembled before operation of the present invention. EMPLOYEE FILE 50 consists of a plurality of employee records each organized as follows:

| | |
|---|---|
| 1. | EMPLOYEE NUMBER _ _ _ _ _ _ _ _ |
| 2. | EMPLOYEE NAME |
| 3. | VALID JOB CODE 1 |
| | TIP CODE 1 |
| 4. | VALID JOB CODE 2 |
| | TIP CODE 2 |
| 5. | VALID JOB CODE 3 |
| | TIP CODE 3 |
| 6. | VALID JOB CODE 4 |
| | TIP CODE 4 |

Preferably, the employee number is an eight digit number which consists of the employee's phone number, with an additional digit provided in the case of two employees having the same phone number in which case a suffix number, i.e. 1, 2 or 3 is added. The employee name is maintained in the file in alpha format, while valid job codes and tip codes are numeric. As suggested, each employee may have up to 4 different valid job codes, or in other words be trained or capable of performing up to 4 different jobs in a facility. For instance, in the restaurant business for which the present invention is particularly adapted, 4 different jobs might be waiter, bartender, chef, and receptionist, with each of those jobs having a unique job code associated therewith. Also associated with each job code is a tip code, which is automatically fetched from JOB FILE 52 and inserted into the record once a job code is entered into a record. The function of the job codes and tip codes will be described in more detail below.

The work SCHEDULE FILE 54 is typically, but not necessarily also built as an initial matter, and consists of a plurality of records, each one corresponding to a particular employee scheduled to work, in the form shown below:

| | | | | | |
|---|---|---|---|---|---|
| 1. | ENDING DATE _ _ _ _ _ _ _ | | | | |
| 2. | EMPLOYEE NO | | | | |
| 3. | JOB CODE | | | | |
| 4. | STARTING TIME A/P | | | | |
| | 5.MON | 6.TUE | 7.WED | 8.THU | 9.FRI |
| STARTING: | _:_ | _:_ | _:_ | _:_ | _:_ |
| ENDING: | _:_ | _:_ | _:_ | _:_ | _:_ |
| | | 10.SAT | 11.SUN | | |
| STARTING: | | _:_ | _:_ | | |
| ENDING: | | _:_ | _:_ | | |
| 12. | | SPECIAL HOURS (Y/N) | | | |

Each SCHEDULE FILE record includes the ending date of the work schedule in month, day and year format, the employee number, the job code for the scheduled job, a starting time indicator (a.m. or p.m.) for the employee's shift, the starting and ending time for each day of the week scheduled and finally a special hours indicator via which the scheduled hours may be designated with a special flag. For instance, if the schedule record includes scheduled vacation time or jury duty time etc. . . . , this flag is set. The flag is later referenced by time clock 10 for a purpose to be described more fully below. In actual practice, the manager or scheduler would preferably develop a schedule on a traditional worksheet, and then enter that schedule into the SCHEDULE FILE records. Accordingly, SCHEDULE FILE 54, once complete, contains a schedule for each employee for one or more weeks worth of time. Although the records are shown as including only one starting and ending time for each day, it is possible to provide more fields for this purpose such that split shifts may be accommodated. Otherwise, a second record may be used to schedule the second work period on the same day.

The STORE FILE 66, SALES FILE 60, SERVER FILE 62 and WAIT FILE 64 are also built and maintained by the manager or supervisor but are not absolutely essential to timekeeping operations. As will be explained in more detail below, these files are used to analyze productivity and produce reports.

STORE FILE 66 is used primarily to set up "templates" or record forms for the SALES FILE 60 records, and consists of a plurality of records each corresponding to one store in which the present invention is implemented, with one record per store. It should be noted at this juncture that the system of the present invention is adaptable to keep time and records for different facilities if desired, as provided by the adaptable structure of the SALES FILE 60 records provided by the information recorded in the STORE FILE 66 records. Each record including:

| | | | |
|---|---|---|---|
| 1. | STORE NUMBER _ _ _ _ | | |
| 2. | STORE NAME | | |
| 3. | DEPT BEGIN | | |
| 4. | DEPT END | | |
| 5. | # OF DIV | | |
| 6. | HEADINGS | : : | |
| | | : : | |
| 7. | SUB HEADINGS | : : | (ENTRY & EDIT LIST) |
| | | : : | (ENTRY & EDIT LIST) |
| | | : : | (EDIT LIST ONLY) |
| 8. | SALES TAX | | |
| 9. | PROMOTIONS | | |
| 10. | DISCOUNTS | | |
| 11. | EMP MEALS | | |
| 12. | OVER/SHORT | | |
| 13. | COMPS | | |
| 14. | WASTE | | |
| 15. | DOLLAR COVER | 18. | CATEGORY 3 |
| 16. | CATEGORY 1 | 19. | CATEGORY 4 |
| 17. | CATEGORY 2 | 20. | CATEGORY 5 |
| Another record for a store includes: | | | |
| 1. | STORE NUMBER | | 0000 |
| 2. | STORE NAME | | |
| 3. | STORE POSTING # | | 50 |
| 4. | BREAKFST START TIME | | 0400 |
| 5. | BREAKFST STOP TIME | | 1059 |
| 6. | LUNCH START TIME | | 1100 |
| 7. | LUNCH STOP TIME | | 1559 |
| 8. | DINNER START TIME | | 1600 |
| 9. | DINNER STOP TIME | | 0359 |

As shown, in the first record there is recorded a unique store number, store name, the beginning and ending numbers of the range of departments within the store, i.e. kitchen, dining room etc. . . . , the number of different divisions, corresponding to headings, i.e. bar, restaurant, grill etc. . . . , and subheadings within a division, i.e. breakfast, lunch, dinner etc. . . . Also, flag fields (y-applicable to store/N-not applicable) are provided for sales tax, promotions, discounts, employee meals, over/short (receipts), complimentaries, waste and cover charge. Up to five catagories of product breakdown, i.e. beer, wine, appetiers etc. . . . . These flag settings, categories and divisions are used by the software 400 to generate the "template" or fields for the SALES FILE 60 records. The second record again includes store number and name and a unique posting number. Also, the start and stop time of breakfast, lunch and dinner are recorded, such that in preparing labor reporte etc. . . . the time-in and time-out times may be compared against these times to supply a report of how much labor per serving period has been incurred, as provided by report functions to be explained below.

The SERVER FILE consists of a plurality of records each associating an employee with a server number. These records contain the following information:

1. SERVER NUMBER _____
2. EMPLOYEE NUMBER

Each server, i.e. an employee who serves food, is assigned a unique server number which is stored as a record together with the employee's number. The use of these records will be described in more detail below.

The WAIT FILE 64 consists of a number of records each containing the information set forth below.
1. DATE OF WAIT SUMMARY _____
2. SERVER NUMBER
3. BREAKFAST/LUNCH/DINNER (B/L/D) TOTAL HOURS:
4. NUMBER OF CUSTOMERS SERVED
5. TOTAL DOLLARS SOLD
6. NUMBER OF APPETIZERS SOLD

7. NUMBER OF DESSERTS SOLD
8. NUMBER OF SPECIALS SOLD
9. WINE DOLLARS SOLD

As shown, each of the records in the WAIT FILE includes the date of the day which the record represents, the server number, whether the server worked over lunch or dinner, the number of customers served, the total amount in dollars of food served, the total number of appetizers sold the total number of desserts sold, the number of specials sold and the amount in dollars of wine sold. The total hours entry is fetched from the TIMECARD FILE 56, based on the meal served (B, L, D), from which the start/end time of the mean is found in the STORE FILE 66, and from which the TIMECARD FILE 56 records are called according to time-in and time-out times. Utilization of information in the WAIT FILE 64 records will be discussed in more detail below.

SALES FILE 60 consists of 40 fields with the headings (i.e. DINING ROOM, BAR. . . . ) and subheadings (LUNCH, DINNER) being derived from the corresponding STORE FILE 66 record (by store number reference), for instance as shown below.

| 1. STORE NUMBER ____ | | | F-FOOD | L-LIQUOR |
|---|---|---|---|---|
| 2. DATE | | | B-BEER | W-WINE |
| | | | C-CUSTOMERS | |
| DINING ROOM | | BAR | | GARDEN |
| LUNCH | DINNER | LUNCH | DINNER | LUNCH | DINNER |
| F 3. | 8. | 13. | 18. | 23. | 28. |
| L 4. | 9. | 14. | 19. | 24. | 29. |
| B 5. | 10. | 15. | 20. | 25. | 30. |
| W 6. | 11. | 16. | 21. | 26. | 31. |
| C 7. | 12. | 17. | 22. | 27. | 32. |
| 33. | TOTAL SALES TAX | 37. | COMPS | TOTAL SALES |
| 34. | PROMOTIONS | 38. | WASTE | NBR CUSTS |
| 35. | DISCOUNTS | 39. | DOLLAR COVER | AVE CUST |
| 36. | EMP MEALS | 40. | OVER/SHORT | SERVICE TL |

Each record in the SALES FILE as shown includes a field for the store number, the date, food (F), liquor (L), beer (B), wine (W) and customer count (C) for each separate departments, headings designated (via STORE FILE 66) in the facility, for instance the dining room, bar and garden restaurant, for instance, lunch and dinner, as designated as subheadings in STORE FILE 66. Also included are fields (optional) for total sales tax, promotions, discounts, employee meals, complimentary meals, waste, dollar cover, and over/short. The total sales (TOTAL SALES), NBR customers (NBR CUSTS), average customers (AVE CUST) and service total (SERVICE TL) are generated by computer 20 from the entries in the SALES FILES record once the entries are complete. The use of this file and its records will be discussed in more detail below.

PASSWORD FILE 69 is a necessary prerequisite to system operations and is preferably first to be assembled. The file contains one or more passwords which may be maintained by a manager and which provide protection against unauthorized entry into various files, as used in a conventional manner. The specific use of passwords in protecting the system of the present invention will be discussed in more detail below.

CALENDAR FILE 68 is a prerequisite to the operation of certain software routines in personal computer 20, and includes a computerized calendar, through which certain dates and days of the week may be automatically fetched for entry into records, date verification or for display on CRT and keyboard 22 during utilization of the system.

TIMECARD FILE 56 and PAY PERIOD FILE 58 are files generated and maintained by computer 20 primarily from information (time records) received from time clock 10, or as input by the manager, as will be discussed in more detail below. Thus, the system may be started without these files.

The TIMECARD FILE 56 consists of a plurality of records each including the following information:

| | |
|---|---|
| 1. | EMPLOYEE NUMBER |
| 2. | WORK DATE |
| 3. | TIME IN |
| 4. | TIME OUT |
| 5. | EMPLOYEE JOB CODE |
| 6. | TOTAL TIPS |
| 7. | STATUS CODE |

Each of the records in TIMECARD FILE 56 corresponds to one time-in and time-out transaction for an employee. The date, time-in, time-out, total hours (automatically calculated), job code, tips and status code (vacation etc.) are recorded. As will be described in more detail below, the TIMECARD FILE 56 is automatically updated and maintained via the Transmit Time Clock Files function 412b, and contains a complete record of all timeclock transactions without reference to pay periods (i.e. week to week or bi-monthly pay periods).

PAY PERIOD FILE 58 consists of a plurality of records each identical with those in the TIMECARD FILE 56. However, the PAY PERIOD FILE 58 is purged of records at the end of each pay period so that it contains records of only those transactions which have occurred within the current pay period.

Figure 4:
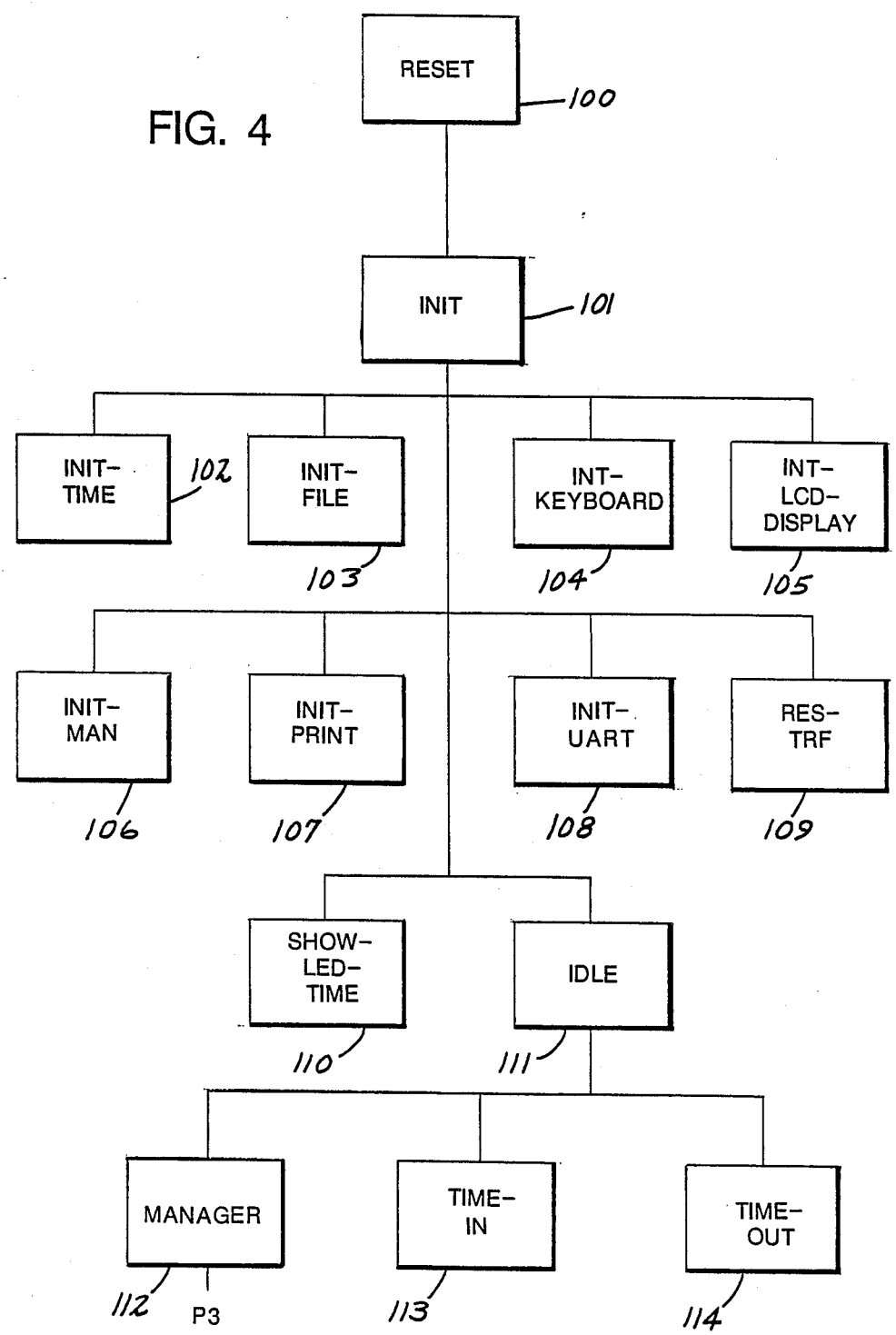
FIG. 4 is a top-down chart of the software employed in the time clock according to the present invention.

Referring now to FIG. 4, there is shown a top down diagram of the software employed in time clock 10 to carry out its time keeping functions. The time clock 10 software includes a reset function (used only upon power-up or from time to time as might be required due to malfunction etc. . . . ) operable in the conventional manner to reset the various components of the time clock system 10 as shown in FIG. 2. Following reset, as shown in FIG. 4, an initialization routine (maintained in ROM 42) is performed which initializes the real time clock (RTC) 48 (102) (Date and time setting is requested from operator via display 14 for input via keyboard 12), the various files required for operation (103), the keyboard 12 (104), the LCD interactive display 14 (105), the printer 18 (107), the UART 46 (108), the MANAGER routine (106) and the TIME RECORDS FILE 59. All the time clock 10 software as described below is maintained in ROM 42, with records or files being maintained in RAM 44.

Once initialized, time clock program proceeds to an IDLE routine (111) and time display mode (110), via which it maintains a display of the current on the LED time display 16 and in which it awaits the execution of either the MANAGER (112), TIME-IN (113), or TIME-OUT (114) routines, as will be explained in more detail below.

Figure 5A:
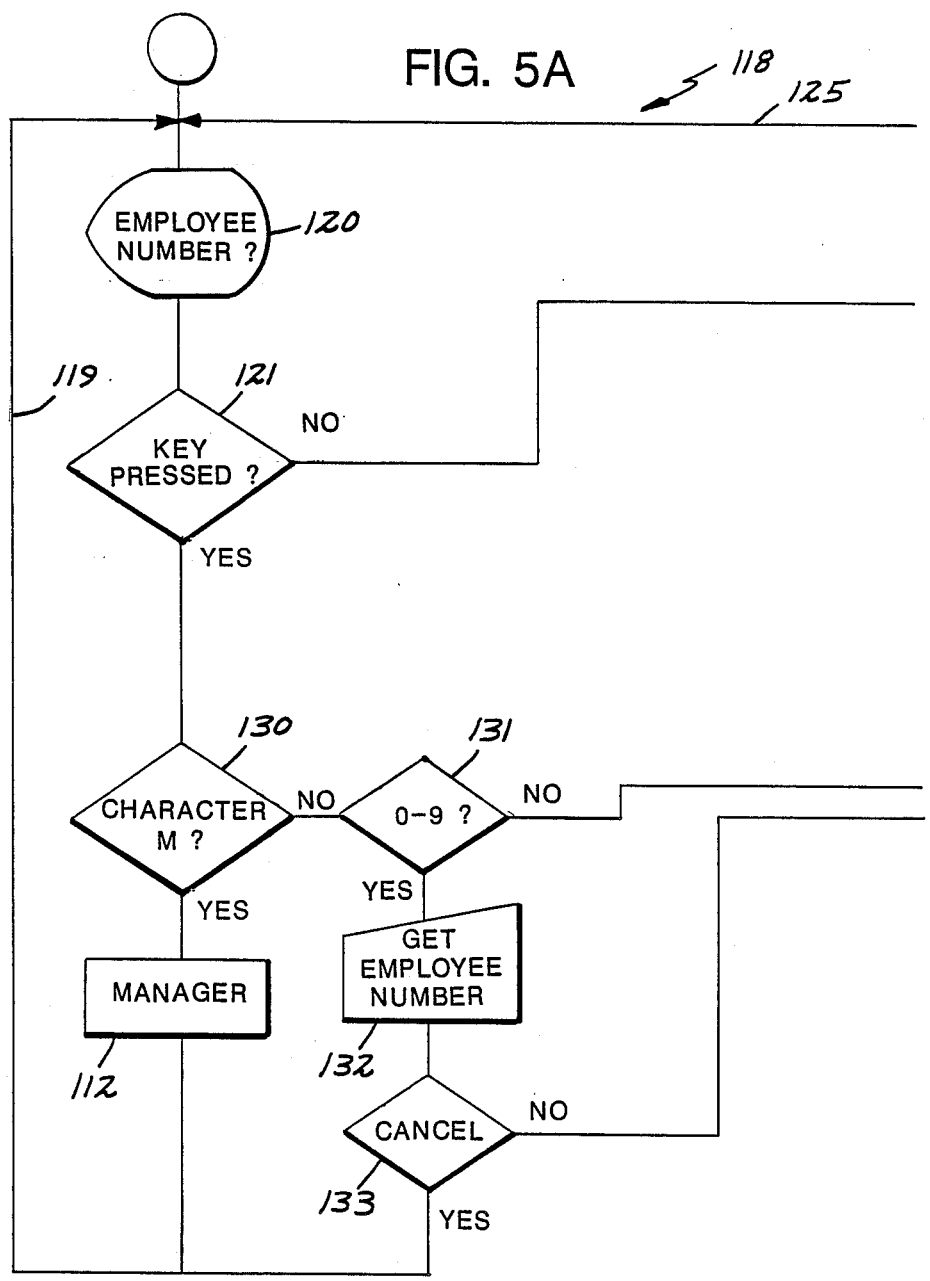
FIGS. 5A and 5B comprise a flow chart of the IDLE routine according to the present invention.
Figure 5B:
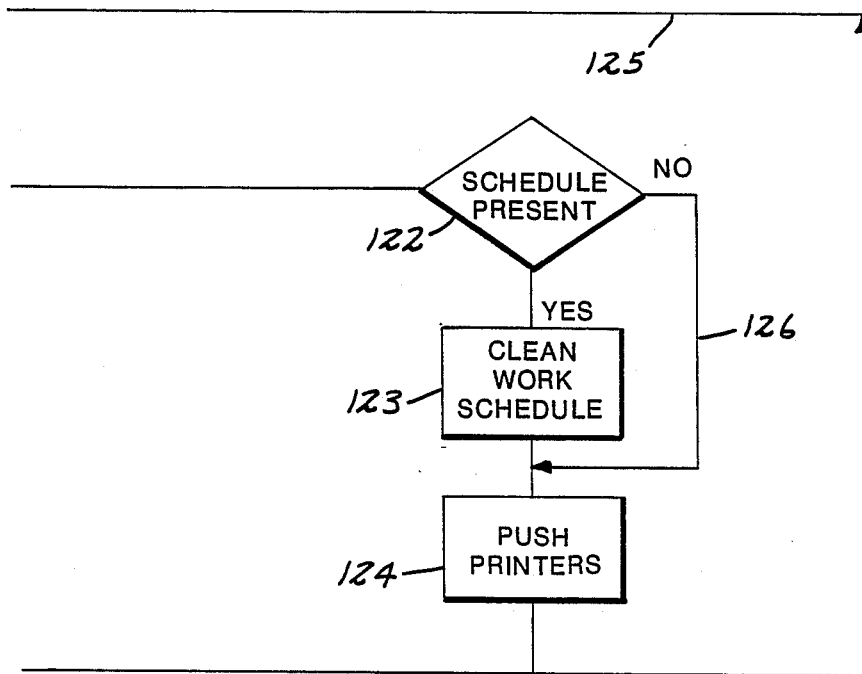

The IDLE routine is shown in flow-chart form in FIGS. 5A and 5B. Generally, the IDLE routine monitors the keyboard 12 of time clock 10 sensing for any input, maintaining in its initial state the prompt "Employee Number?". In a first mode of flow the IDLE routine senses that no keys of keyboard 12 have been pressed, and then proceeds to check whether or not SCHEDULE FILE 54' is present in memory. If the schedule is present, any unused SCHEDULE FILE 54' is cleared (if an employee ending time has expired without the employee ever having timed-in the corresponding record in SCHEDULE FILE 54' is deleted to save memory), the printer is pushed and the routine branches (125) back to the prompt (120). In the alternative, there is a branch (126) around the clean work schedule routine (123).

If a keyboard input is sensed (121), the entry is checked (130) to see if it is the character "M". If it is, the IDLE routine passes control to the routine 112, which will be discussed in more detail below. Otherwise, the entry is checked (131) to see if it is one of the numeric characters 0-9, or in other words a potential employee number. If not, the IDLE routine clears the keyboard (not shown) and branches (125) back to prompt 120. If the entered character is numeric, the routine gets the 8 digit employee number (132), checks to see if the transaction is being cancelled (133) (as will recur throughout the various flow diagrams to be discussed herein, a transaction cancel option is provided and may be effected by depressing the alpha character "C" on keyboard 12 at certain times during the transactions). If the transaction is cancelled, the routine branches (119) back to prompt 120; otherwise, the routine proceeds to 134, at which time the entered employee number is compared against the valid employee numbers held in the EMPLOYEE FILE 50'. If no corresponding employee number is found, the prompt "Invalid Employee Number" is displayed (135) and the routine returns via 125 to prompt 120.

Assuming a valid employee number has been entered, the routine checks (136) for a "I" terminator at the end of the entered employee number string. The "I" terminator designates that an employee time-in transaction is desired. If the termination character is other than "I" the routine passes control to time-out routine 14, and otherwise to decision block 138, which tests RAM memory 44 for the availability of efficient memory to execute a time-in transaction. If memory space is insufficient, the prompt "Can't Time-in Memory Full" is displayed (139) and the routine returns to prompt 120. In this circumstance, the employee would find the manager or supervisor who could take corrective actions via the routine 112 to create sufficient memory for the transaction. Otherwise, control passes to the TIME-IN routine 113, as will be discussed in more detail below.

Figure 6A:
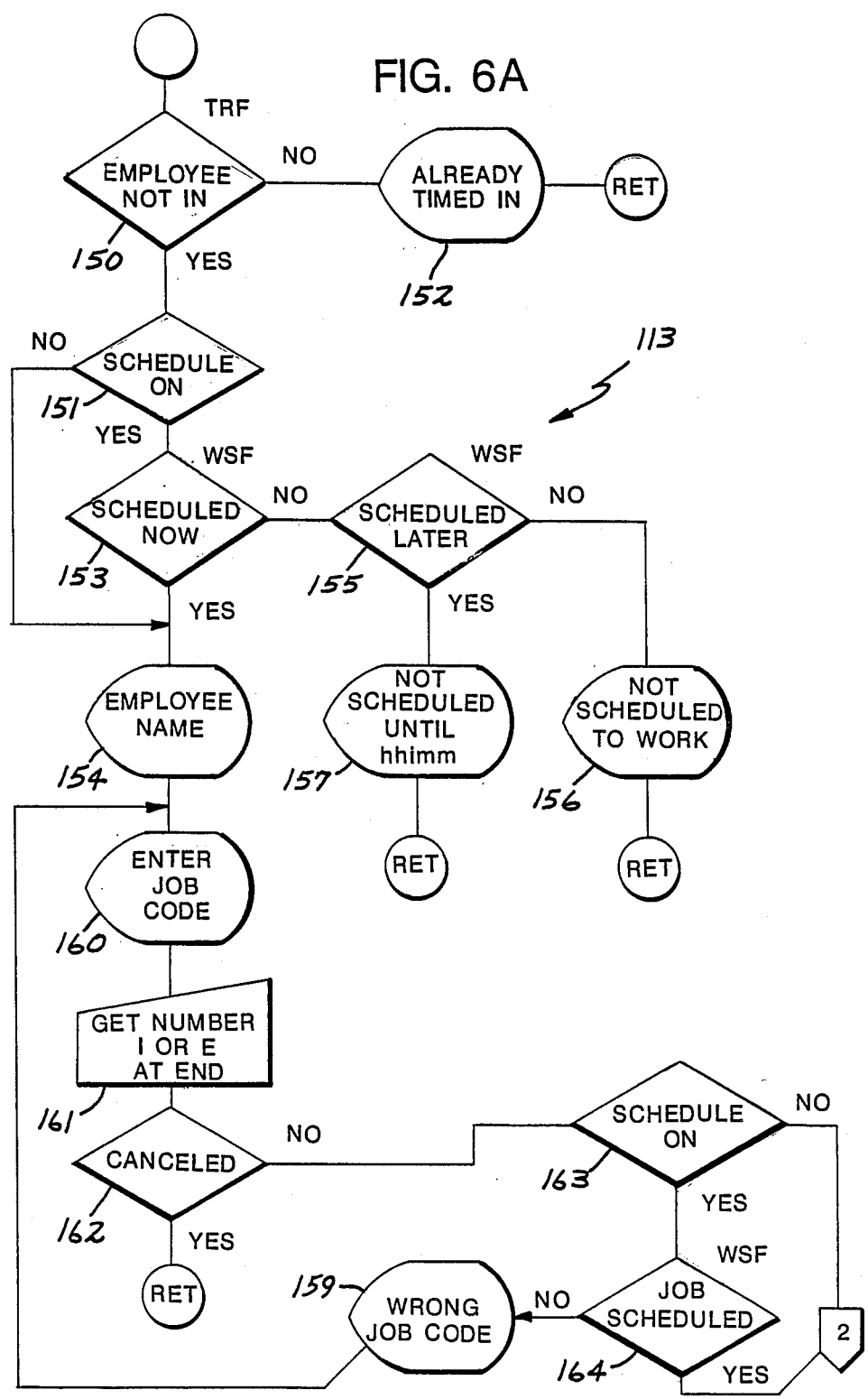
FIGS. 6A and 6B comprise a flow chart of the TIME-IN routine according to the present invention.
Figure 6B:
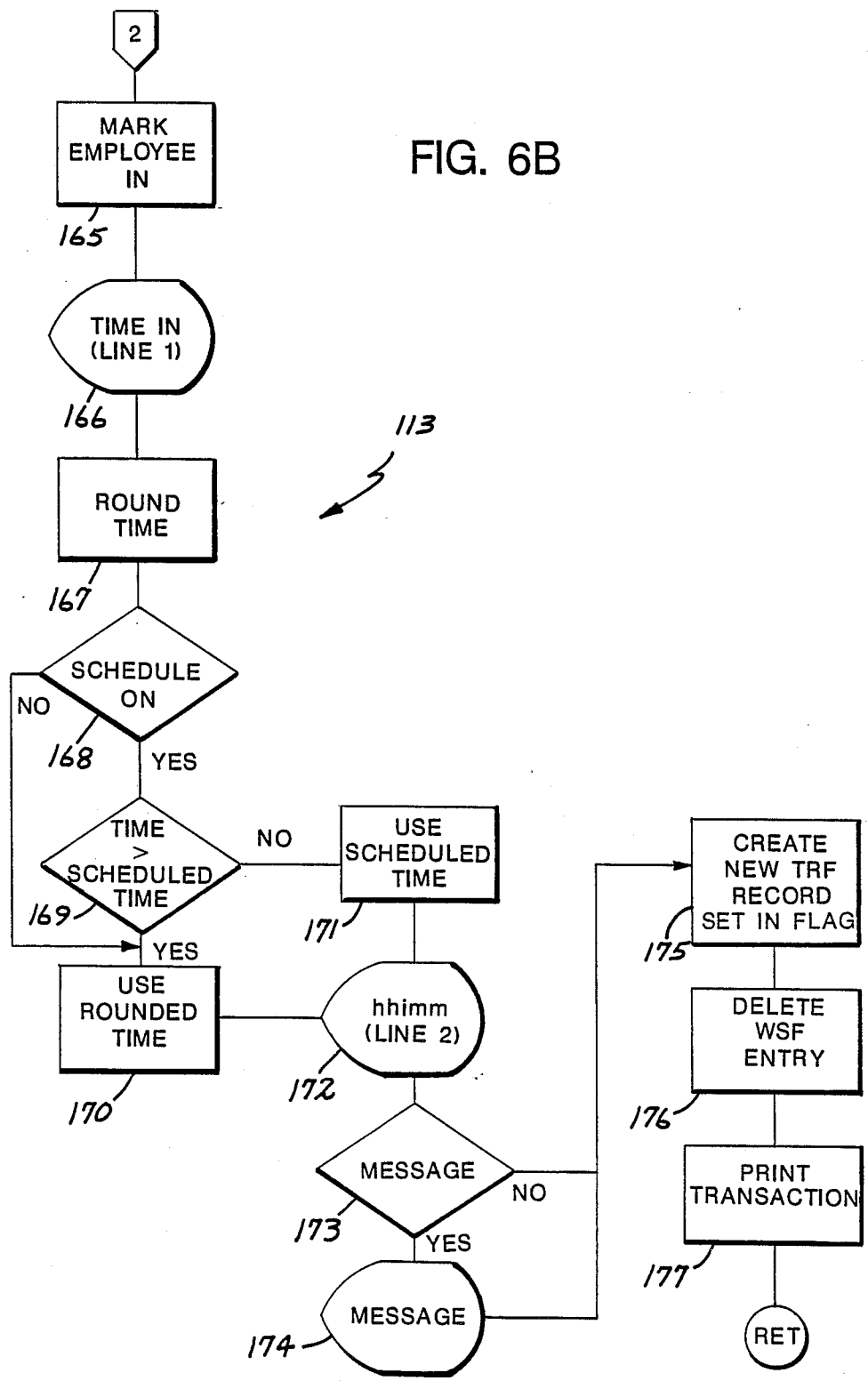

TIME-IN routine 113, as shown in FIGS. 6A and 6B, begins at decision block 150, which determines whether or not the employee seeking to time-in has previously timed-in. Accordingly, the current TIME RECORDS 59 are searched (150) for the presence of a recorded time-in transaction corresponding to the employee number previously entered. If the employee has not yet timed-in, the flow continues to decision block 151; otherwise, the message "Already Timed-in" is displayed (152), and routine 113 returns to the IDLE routine 111 via branch 125.

At decision block 151 it is determined whether or not SCHEDULE FILE 54' is operative in the time clock 10 memory. If it is, the flow continues to the decision block 153, and otherwise around it to prompt 154. The purpose of this aspect of routine 113 is to provide a bypass of the schedule verification subroutine of routine 113 in the case where the SCHEDULE FILE 54' is either inoperative or has not been loaded into time clock 10 for one reason or the other.

In the case where SCHEDULE FILE 54' is operative, flow proceeds to decision block 153, where the current time and date are read from RTC 48, and SCHEDULE FILE 54' is searched for the schedule record corresponding to the employee number and date. If a record is found for the employee, the record is checked for a scheduled time-in. If the scheduled time-in corresponds to the current time, flow proceeds to display 154; otherwise, the schedule is further checked at 155 to determine if the employee is scheduled at all for that day. If not, the message "Not Scheduled to Work" is displayed at 156 and routine 113 returns to IDLE routine 111. If the employee is scheduled to work that day, but not until later, the time in hours and minutes at which the employee is scheduled to work is retrieved and displayed along with the message "Not Scheduled Until hh:mm" (157), after which routine 113 returns to the IDLE routine 111. If the employee is timing in at the scheduled time, or later, the employee name corresponding to the entered employee number is retrieved from EMPLOYEE FILE 50', and displayed at 154, thus providing visual verification for the employee that he has entered the correct employee number.

The flow then continues to prompt 160, which displays "Enter Job Code" on interactive display 14. At block 161, routine 113 retrieves the entered job code (corresponding to the job the employee thinks he or she is scheduled to work) which normally would be terminated with either the alpha character "I" or "E". The terminator entered at 161 is evaluated (162), and if determined to be the letter "C" is interpreted as a cancelation of the transaction, wherein routine 113 returns back to IDLE routine 118. If the terminator is an "I" or "E", the flow continues to decision block 163, which again provides a jump around schedule verification block 164, in the case where the schedule is not on and the verification routine cannot be performed.

At block 164, the job code found in the schedule record is compared against the job code entered at 161. If the job codes correlate, routine 113 continues to block 165; otherwise, the message "Wrong Job Code" is displayed at 159, the program flow goes back to prompt 160, via which the employee may reattempt the entry of a correct job code. Accordingly, this aspect of the system provides a check against employees performing the wrong job, while recording the job performed for payroll preparation. At 165 the employee is marked in a temporary scratch memory location, to be referred to again later for the employee number.

Next, the current time is displayed at interactive display 14 (166), and the actual time-in is rounded (167), preferably to the nearest quarter hour, although it may be rounded to any fraction of an hour desired.

At decision block 168, the presence of SCHEDULE FILE 54' in memory is again checked, and if not present, flow branches around decision block 169 to block 170. If the SCHEDULE FILE 54' is present, the rounded time is compared against the scheduled time at 169. If the rounded time is less than the scheduled time, for instance if the employee has timed in a quarter of an hour early, the scheduled time is selected at 170 to be recorded as the employee's time-in time. If the rounded time is greater that the scheduled time, i.e. the employee has timed in late, the rounded time is selected for entry as the timed-in time at (170).

Next, either the scheduled time or rounded time is displayed (172), to provide employee verification for the time-in transaction. Blocks 173 and 174 provide for the optional display of a message, if desired. A new time record or "certification" is created (175), recording the time-in transaction of the employee, as stored in the current TIME RECORDS FILE 59 in time clock 10 RAM 44. In addition, an "IN" flag is set in the record, to designate that the employee is currently timed-in. Each time record includes the same information as either the TIMECARD FILE 56 or PAY PERIOD FILE 58 records, as discussed above.

The delete work schedule file entry block 176 is optional, and may be employed to delete the corresponding schedule record from the SCHEDULE FILE 54'' to create room in RAM 44 for time records in FILE 59. If it is implemented, however, the validate timeout routine (blocks 203, 204, 205 of FIG. 7A) in the TIME-OUT routine 114 must be bypassed because there remains no schedule record against which to determine the correct time-out time.

A time-in transaction ends with the time clock 10 printing a record or certification (177) of the time-in transaction via printer 18, and control returns to the IDLE routine 118. Preferably, the printed transaction of record includes the employee number, date, job code and time-in time.

Figure 7A:
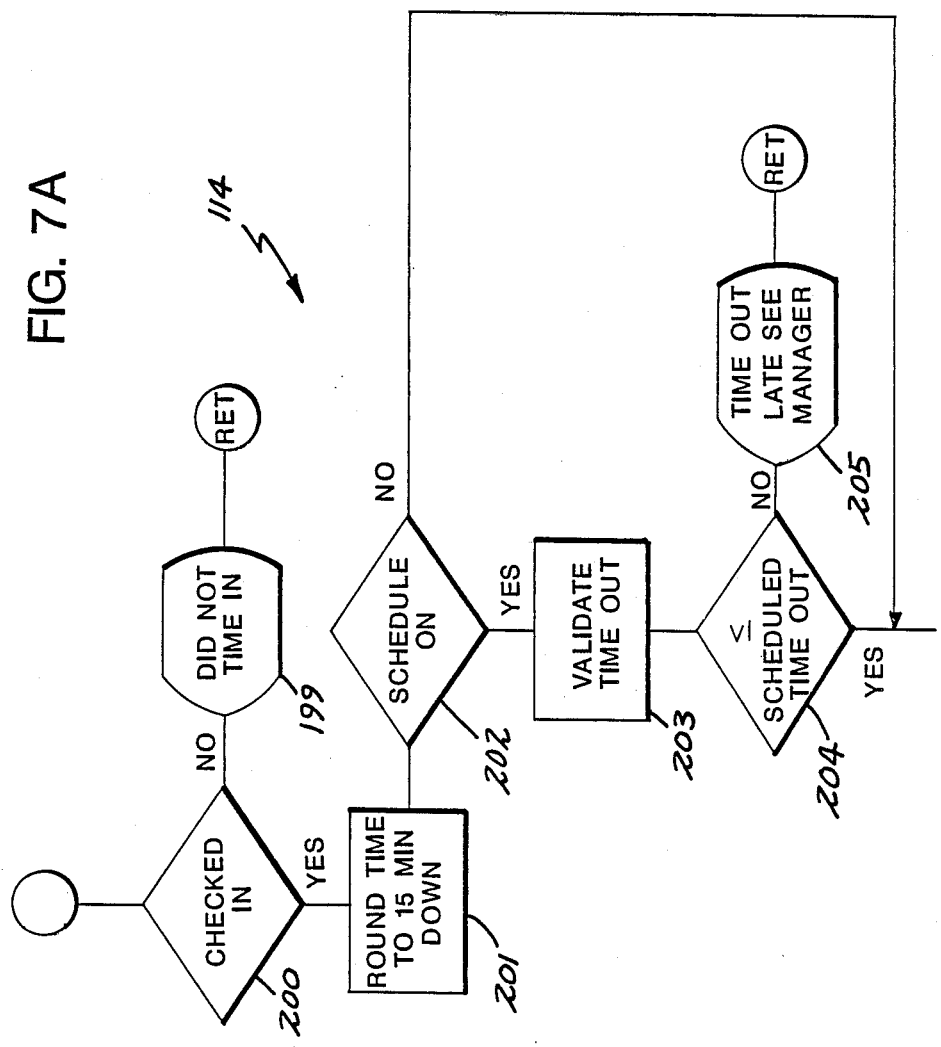
FIGS. 7A and 7B comprise a flow chart of the TIME-OUT routine according to the present invention.
Figure 7B:
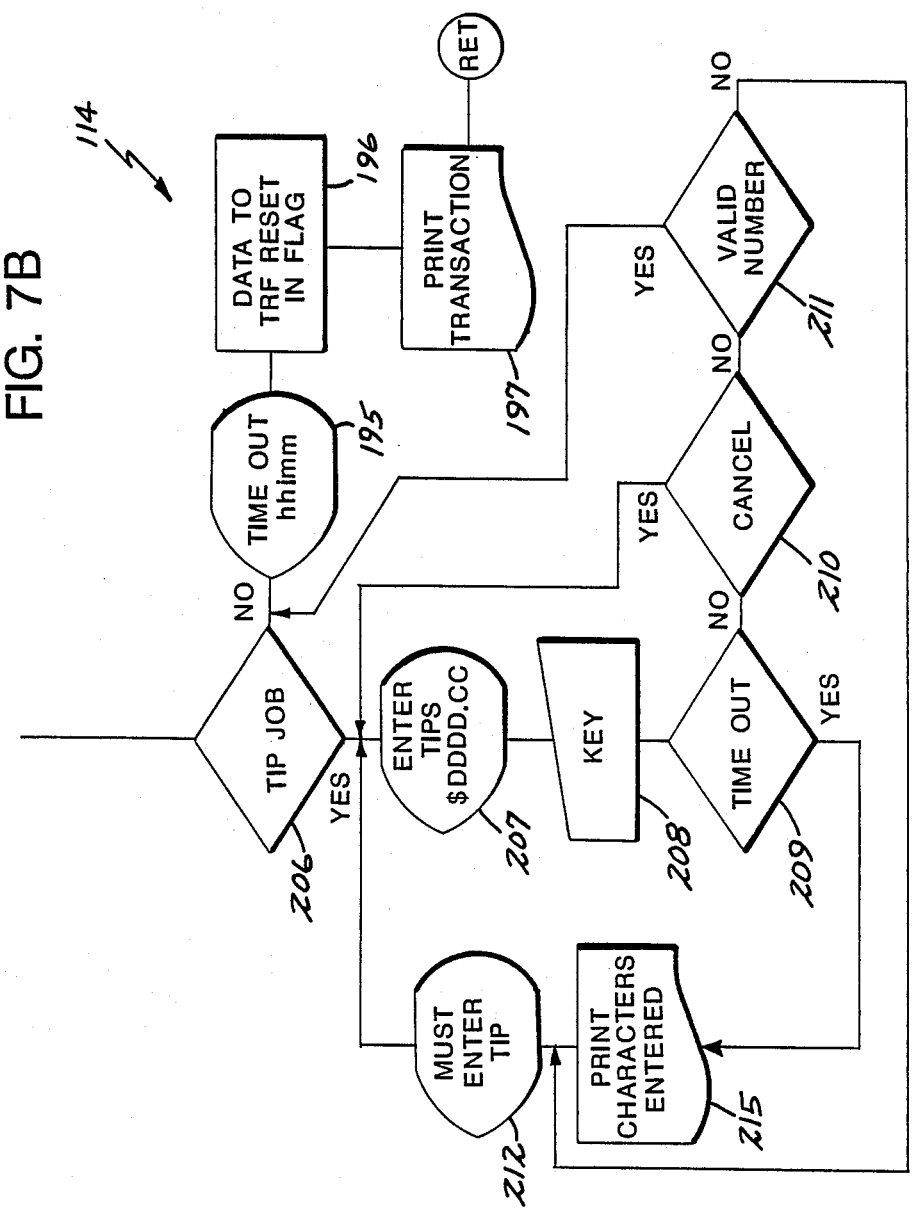

Referring now to FIGS. 7A and 7B, the operation of TIME-OUT routine 114 will be explained. The beginning of routine 114 begins with a check to see whether or not the employee seeking the time-out is previously timed-in. This function is performed at decision block 200, via which the current TIME RECORD FILE 59 is searched for a time record corresponding to the employee seeking to time-out. If the record is found and it indicates that the employee has timed-in via the "IN" flag, the program flows to block 201; otherwise, the message "Did Not Time-in" is displayed at 199 and control is returned to the IDLE routine 118. The current time is then read (201) from RTC 48, and rounded to the nearest 15 minute interval, downwardly. Thus, if an employee times out at 11:35 p.m. the time-out time is rounded down to 11:30 p.m.

At decision block 202, the presence of an operative SCHEDULE FILE 54' is determined, and if present routine 114 flows to block 203; otherwise, there is a branch around to decision block 206.

Next, the time-out time is validated (203), and at decision block 204 the rounded time-out time is compared against the scheduled time-out as provided in the employee's corresponding schedule record in SCHEDULE FILE 54'. If the rounded time-out time is greater than or after, the scheduled time-out time, the message "Time-out Late—See Manager" is displayed (205), and control is returned to IDLE routine 118. In this circumstance, the time-out transaction is effectively aborted, and the employee must see the manager in order to have his time-out transaction completed, as will be discussed in more detail below, with reference to the MANAGER routine.

If the employee is either timing out on time or before, program flows to tip code decision block 206. At this point, routine 114 retrieves the corresponding job code from SCHEDULE FILE 54', and then goes to EMPLOYEE FILE 50' in order to find the employee record corresponding to the employee as indexed by the employee number. Once the employee record has been located, the tip code corresponding to the employee's scheduled job code is determined. If the tip code is 0, i.e. the job is one which does not involve tipping, the flow proceeds to display 208, which displays the rounded time-out in hours and minutes.

If the job is one which involves tips, i.e. the tip code is 1, routine 114 proceeds to display 207, and the prompt "Enter Tips $" is displayed. Keyboard 12 is monitored (208) for the entry of tip information in dollars and cents. If the entry is not made or is not followed by terminator "E" or "C" within a prescribed time period, for instance thirty seconds, flow continues through block 209 to cancel block 210. If entered, the terminator character is evaluated (210), and if "C", i.e. the entry has been cancelled, flow returns to prompt 207. If the terminator is "E" flow proceeds and it is determined whether or not the number entered is within reasonable limits (211), as may be determined by the job performed. If within reasonable limits, flow proceeds to display 208; otherwise, routine 114 branches to prompt "Must Enter Tips" 212 back to prompt 207 after a suitable delay.

If the employee fails to enter tips, or fails to terminate the tip entry within the prescribed time, time-out routine 209 flows to printer routine 215, which prints the characters entered, and then proceeds to the prompt 212, and thereafter to prompt 207.

Once routine 114 reaches display block 195, a rounded time-out time is displayed in hours and minutes on interactive display 14. Thereafter, the rounded time-out time is recorded in the corresponding time record or certification in the CURRENT TIME RECORD FILE 59 (196), completing a employee time-in and time-out transaction certification record. Additionally, the "IN" flag in the time record file is reset, thereby preventing the employee from either timing-in or timing out again on the same day without managerial assistance. Finally, a transaction record is printed (197) and control is returned to IDLE routine 118. Preferably, the printed transaction record includes not only the current day's transaction, but also a record of all transactions to date in the pay period. Preferably the records or certification includes the employee number, work date, time-in time, time-out time, total hours worked (calculated), the job code, total tips if applicable and a status code as may designated vacation time etc. . . . , for each day worked. Thus, at the end of each shift an employee receives an up-to-date "timecard" record.

Figure 5B:
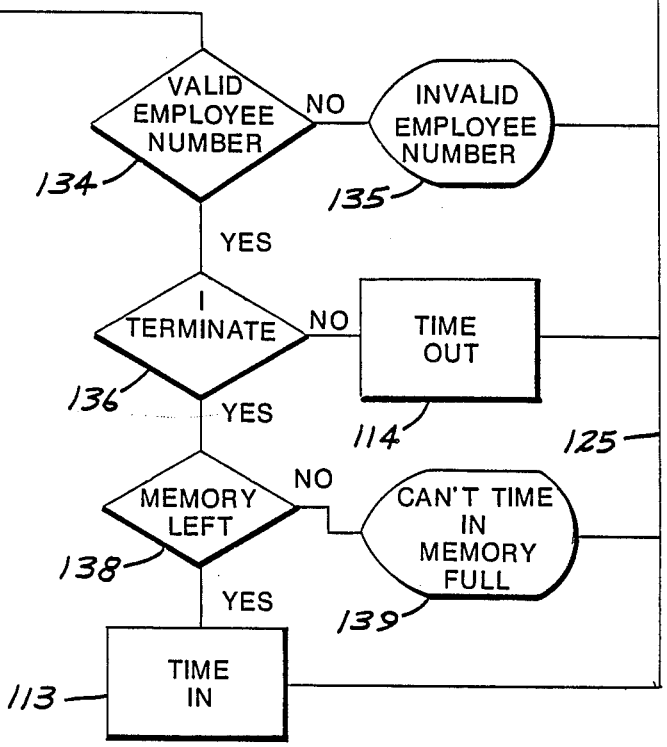
Figure 8:
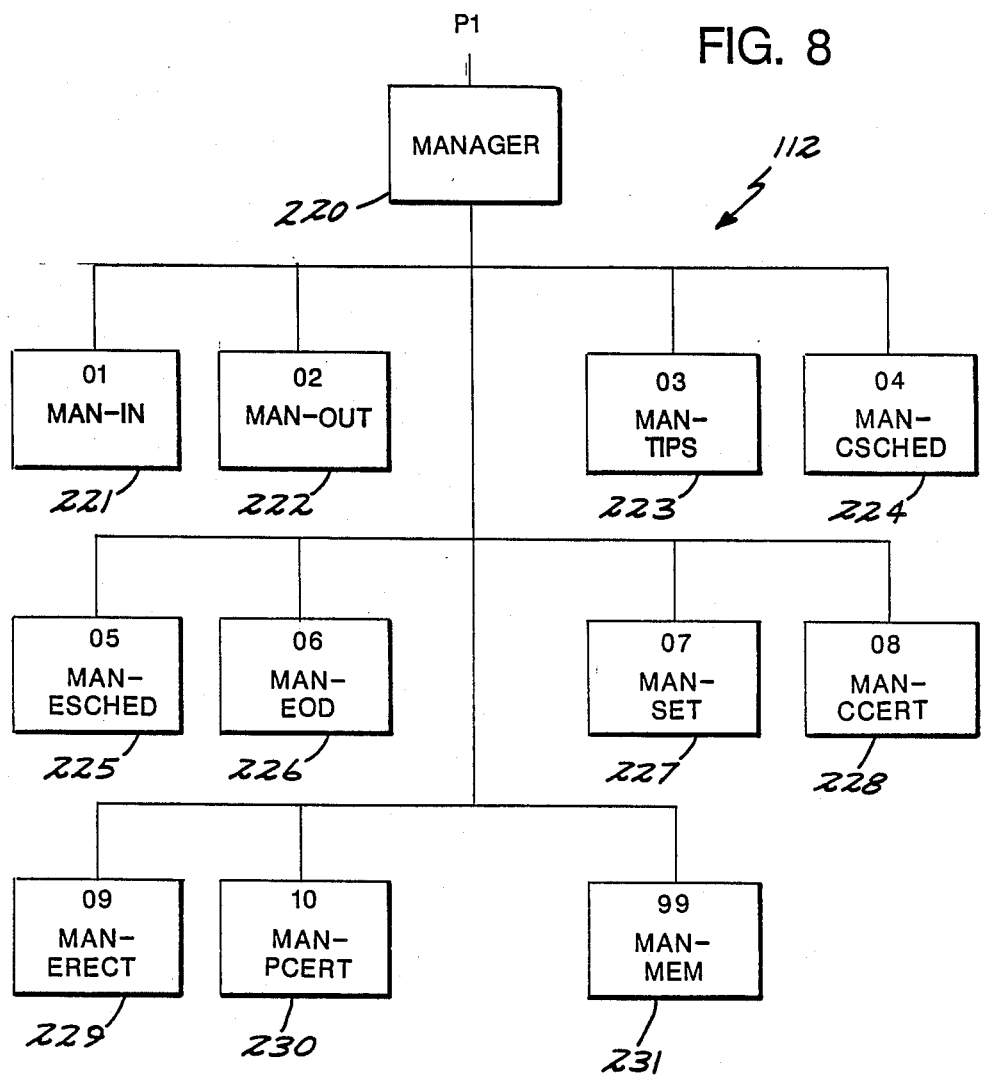
FIG. 8 is a top-down chart of the MANAGER routine according to the present invention.

Referring now to FIG. 8, a top down chart of the MANAGER functions 112 as referred to in FIGS. 4 and 5 will be explained. As shown, 11 different MANAGER functions are provided, as outlined below:

| FUNCTION | DESCRIPTION |
| --- | --- |
| MANAGER (220) | PASSWORD AND MENU |
| MAN-IN (221) | CHANGE EMPLOYEE TIME-IN |
| MAN-OUT (222) | CHANGE EMPLOYEE TIME-OUT |
| MAN-TIPS (223) | CHANGE EMPLOYEE TIPS |
| MAN-CSCHED (224) | CREATE NEW SCHEDULE RECORD IN SCHEDULE FILE |
| MAN-ESCHED (225) | ERASE SCHEDULE RECORD IN SCHEDULE FILE |
| MAN-EOD (226) | END OF DAY PROCEDURE |
| MAN-SET (227) | SET TIME AND DATE |
| MAN-CCERT (228) | CREATE CERTIFICATION |
| MAN-ECERT (229) | ERASE CERTIFICATION |
| MAN-PCERT (230) | PRINT CERTIFICATION |
| MAN-MEM (231) | MEMORY INSPECTION AND |

| FUNCTION | DESCRIPTION |
|---|---|
| | -continued |
| | ALTERATION |

Thus, via the MANAGER functions 112, the manager or supervisor may change an employee's time-in time (221), time-out (222) or tips (223). In addition, a new schedule record may be entered in the SCHEDULE FILE 54' (224) to accommodate last minute schedule changes, or a schedule record may be erased (225).

Also provided in the MANAGER functions 112 is an end of day procedure (226) at which time the accumulated TIME RECORDS 59 may be transferred back to personal computer 20, and an updated EMPLOYEE FILE 50', SCHEDULE FILE 54' and PAY PERIOD FILE 58' may be transferred from personal computer 20 to time clock 10 for the next days operation. MANAGER functions 112 also provide that a time record or certification may be created (228) or erased (229) or printed (230). Finally, a memory inspection and alteration function (231) is provided so that, if need be, RAM 44 of time clock 10 may be inspected and altered. The PASSWORD and MENU routine 220 and the END OF DAY function 226 will be described in detail below. The remaining functions will be described only generally due to their relatively straightforward nature and for the sake of brevity in the drawing.

Figure 9A:
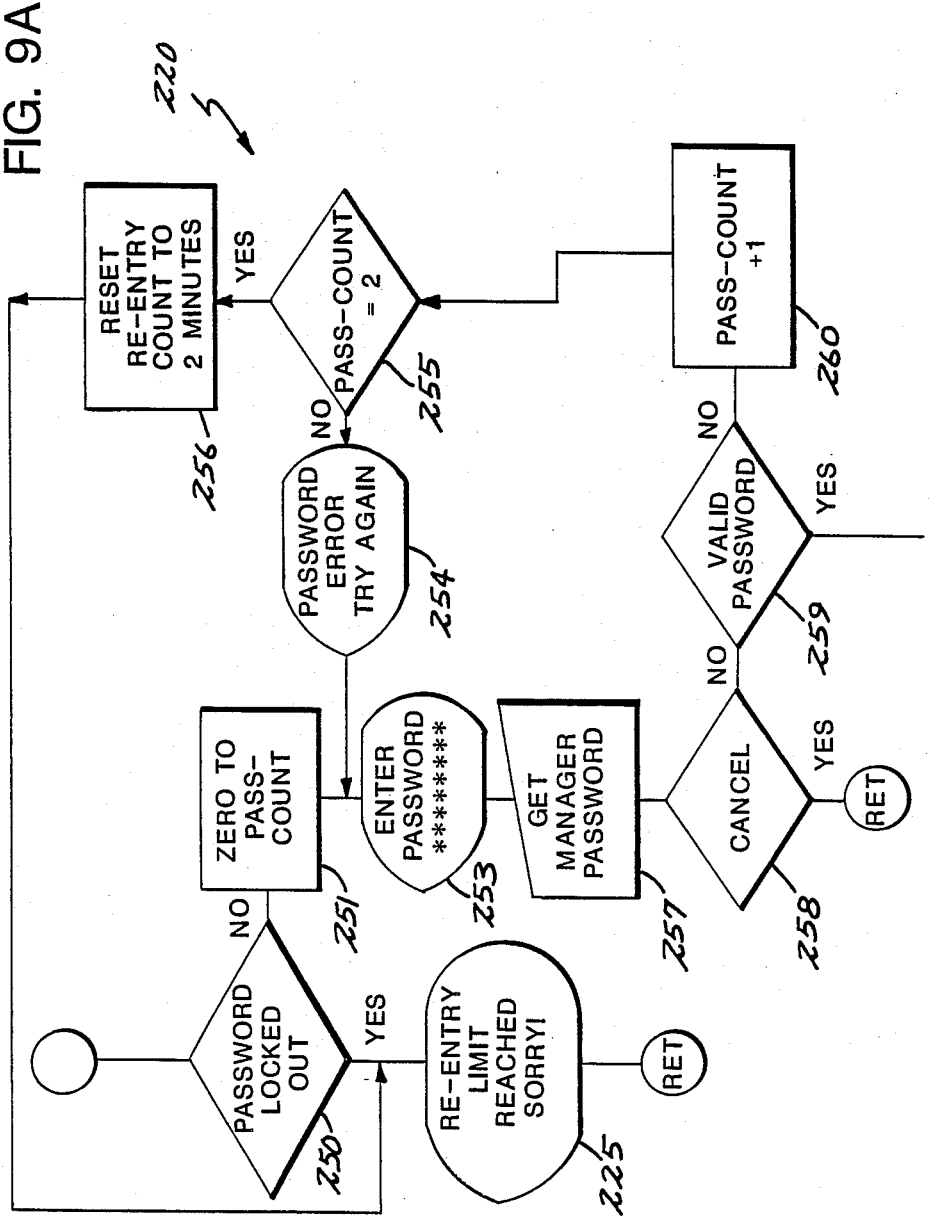
FIGS. 9A and 9B comprise a flow chart of the Menu and Password aspects of the MANAGER routine according to the present invention FIGS. 10A, 10B, 10C and 10D comprise a flow chart of the End-of-Day function for the time clock according to the present invention.
Figure 9B:
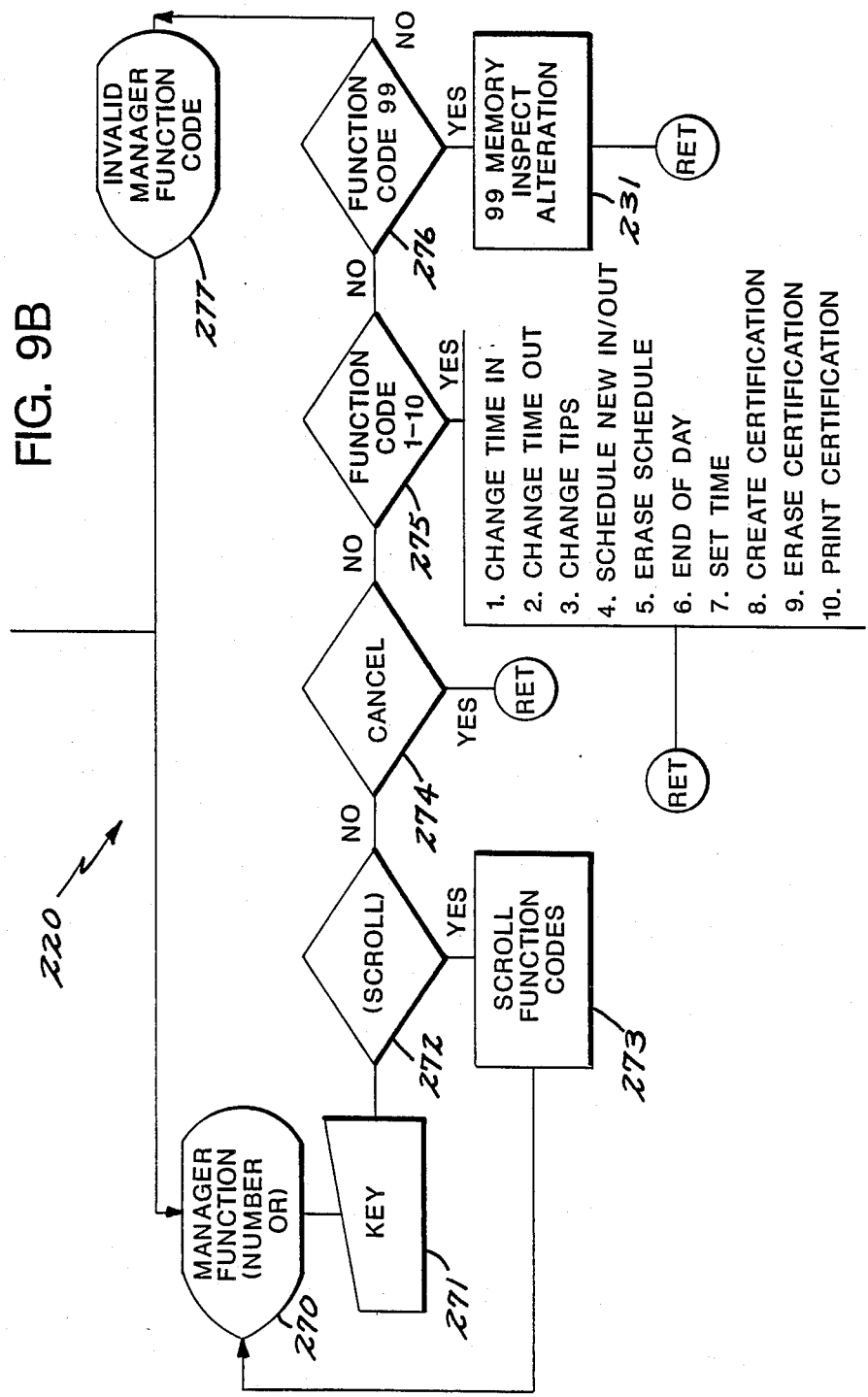

Referring first to FIGS. 9A and 9B there is shown a flow diagram of the MANAGER Password and Menu routine 220. Initially, a re-entry timer is tested (250), and if active or not timed-out, the message "Re-entry Limit Reached Sorry!" is displayed at 225, and control returns to the IDLE routine 118 via branch 134 (FIG. 5). If the re-entry timer is not active, or is timed-out, flow proceeds to block 251, at which the pass-count parameter (number of consecutive entry attempts) is set to zero (0), and the prompt "Enter Password" is displayed (253). The password is retrieved from the keyboard (257), and if not terminated with the cancel code "C" flow continues through decision block 258 to decision block 259. If cancelled, control is returned to the IDLE routine 118.

At decision block 259, the entered password is evaluated to determine whether or not it is a valid password. Valid passwords are maintained in time clock 10 in the first record of EMPLOYEE FILE 50', which is built from the PASSWORD FILE 69 generated by personal computer 20 (see FIG. 1). If the password is not valid, flow continues to block 260, at which point the pass-count parameter is incremented by one. At decision block 255, it is determined whether or not pass-count equals two, i.e. the maximum consecutive allowable attempts have been reached. If not, the message "Password Error, Try Again" is displayed (254) and flow returns to the enter password prompt 253. If two failed attempts have been made, the re-entry timer is set (256), the corresponding message is displayed (225), and control returns to the IDLE 118.

Assuming a valid password has been entered, flow continues to prompt 270, which displays the message "Manager Function". At this point the operator has two options, the first of which is to enter a numeric code of 1–10 (or 99) corresponding to a particular one of the manager functions, or to request that the functions and their corresponding number be scrolled, which may be accomplished by entering a ".". Accordingly, the input is received (271), and evaluated (272) to determine whether or not a scroll has been requested. If a scroll has been requested, the functions are scrolled (273), and flow returns back to prompt 270; otherwise, flow continues cancel decision block 274, which determines whether or not the cancel code "C" has been entered. If the operation has been cancelled, control returns to IDLE routine 118; otherwise, the function code is evaluated (275), which provides a branch to the corresponding function routine. If the function code 99 has been entered, the memory inspection/alteration routine 231 has been selected, and a corresponding branch is executed. It should be understood that the memory inspection/alteration routine 231 would not normally be executed by the manager, and is provided primarily for de-bugging or repair functions. Finally, if the number entered is not a function code, i.e. it is neither in the range of 1–10 or 99, the message "Invalid Manager Function Code" is displayed on interactive display 14, and flow returns to the prompt 270. Accordingly, routine 220 provides for password access to the MANAGER functions, and for selection of a particular function.

MANAGER functions 221–225 and 227–231 will now be briefly explained, followed by a more detailed explanation of the End-Of-Day function 226. The Change Time-In function 221 is provided to permit a manager to alter the recorded time-in in an employee time certification record as maintained in TIME RECORD FILE 59. Of similar nature is the Change Time-Out function 222, which permits a recorded time-out time to be changed. In either case, the routines provide for locating the time records to be changed, and altering either the time-in or time-out time in the record. This function may be performed, for example, in the case where an employee forgets to time-in or time-out at the correct time, and it is desired to alter the record accordingly. Time-In function 221 may optionally provide for the alteration of the job code recorded in the time record, while function 222 may optionally provide for the alteration of the tip entry in a time record.

Change Tips function 223 functions similarly to functions 221 and 222, and provides for entry by the manager into the tips recorded in a time certification record in TIME RECORD FILE 59. Accordingly, if an employee has inadvertently recorded the wrong amount in tips, it may be changed by the manager so as to correct the permanent record.

The Create Schedule function 224 and the Erase Schedule function 225 are provided for creating and erasing (deleting) schedule entries in the schedule records held in the SCHEDULE FILE 54'. Generally, these functions provide the manager access to SCHEDULE FILE 54' in order that same day or last minute schedule changes may be made. As will be explained in more detail below, any schedule changes made via time clock 10, are updated to SCHEDULE FILE 54 via personal computer 20 when end of day processing is performed on personal computer 20.

Set Time function 227 simply provides a means for the manager or supervisor to set the RTC 48 with the correct time and date. This function would be performed in the case where power to time clock 10 has been temporarily lost, time clock 10 has been reset, or to periodically correct the clock if it is running too fast or too slow.

Create Certification (time record) function 228 and Erase Certification function 229 permit the manager to either create or erase a time certification record in TIME RECORD FILE 59. This may be necessary, for example, where an employee has not been scheduled to work and thus cannot time-in or time-out, and the manager accordingly cannot change the time-in or time-out via functions 221 or 222. In essence, therefore, functions 228 and 229 provide an independent means via time clock 10 to create time records.

Print Certification function 230 provides a means via which the manager can cause time clock 10 to print a time-in and time-out transaction record or receipt, either for the manager or for an employee, as the need arises.

Memory Inspection/Alteration function 231 is provided for use only in an extraordinary circumstances as need arises for repair or debug. In essence, function 231 provides that the contents of a memory location in RAM 44 may be reviewed via interactive display 14 or altered via keyboard 12.

Turning now to FIGS. 10A, 10B, 10C and 10D there is shown in detailed flow chart form the End-of-Day function 220. The primary purpose of End-of-Day function 220 is to transfer the current TIME RECORD FILE 59, from time clock 10 to personal computer 20, and correspondenly to download from personal computer 20 the contents of EMPLOYEE FILE 50, SCHEDULE FILE 54 and PAY PERIOD FILE 58 (this transfer will be described in more detail below). As will be explained, End-of-Day function 220 also provides a means for completing any open certifications (time records) left at the end of the day, either inadvertently by an employee who has failed to time-out, or as may be required in the case where the end of day processing is accomplished before all employees have completed work for the day.

Figure 10A:
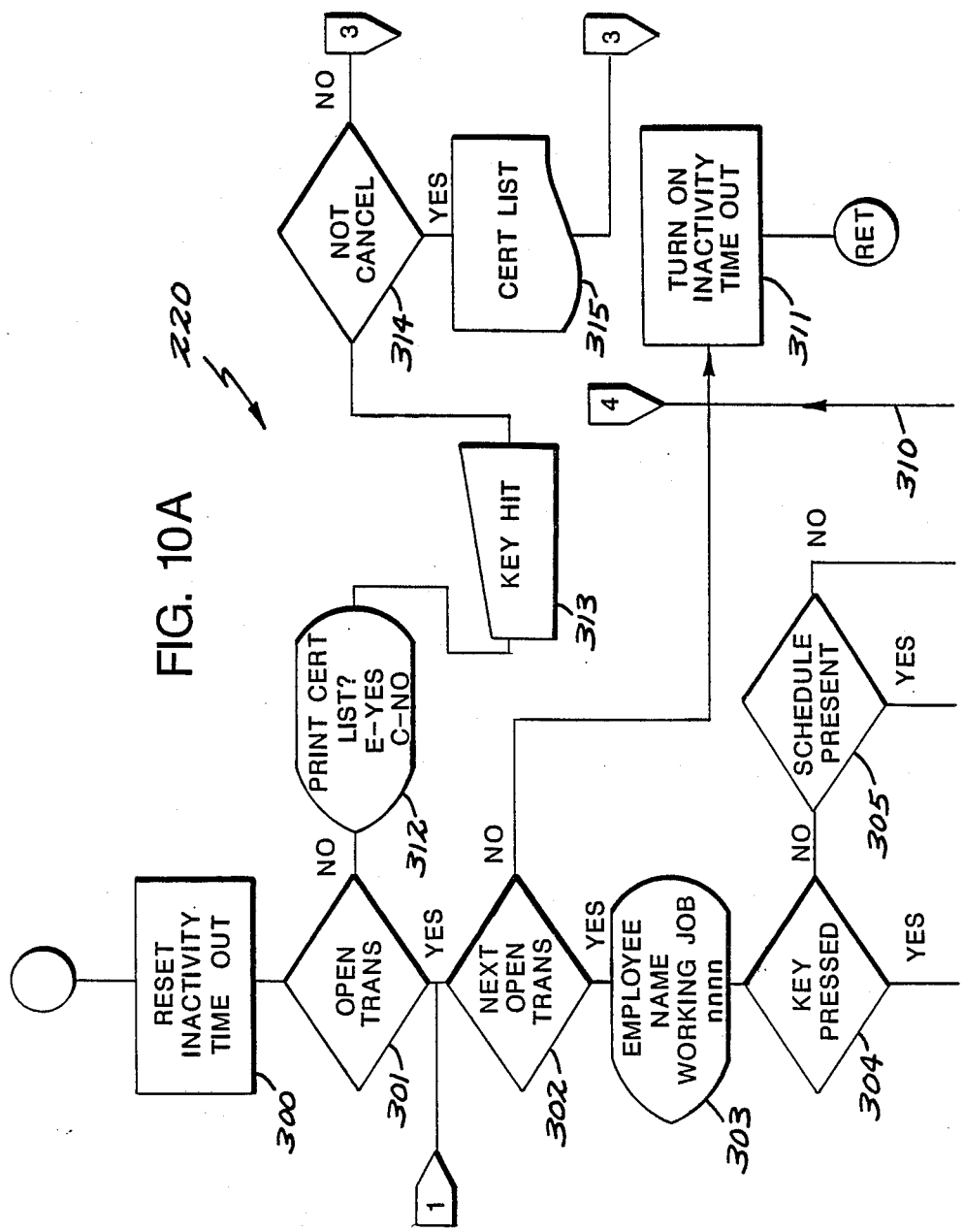
Figures 10B, 10C:
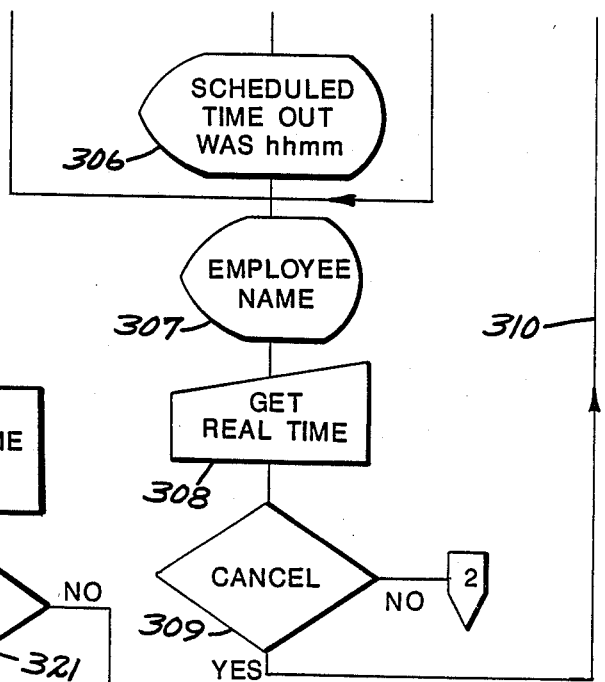
Figure 10D:
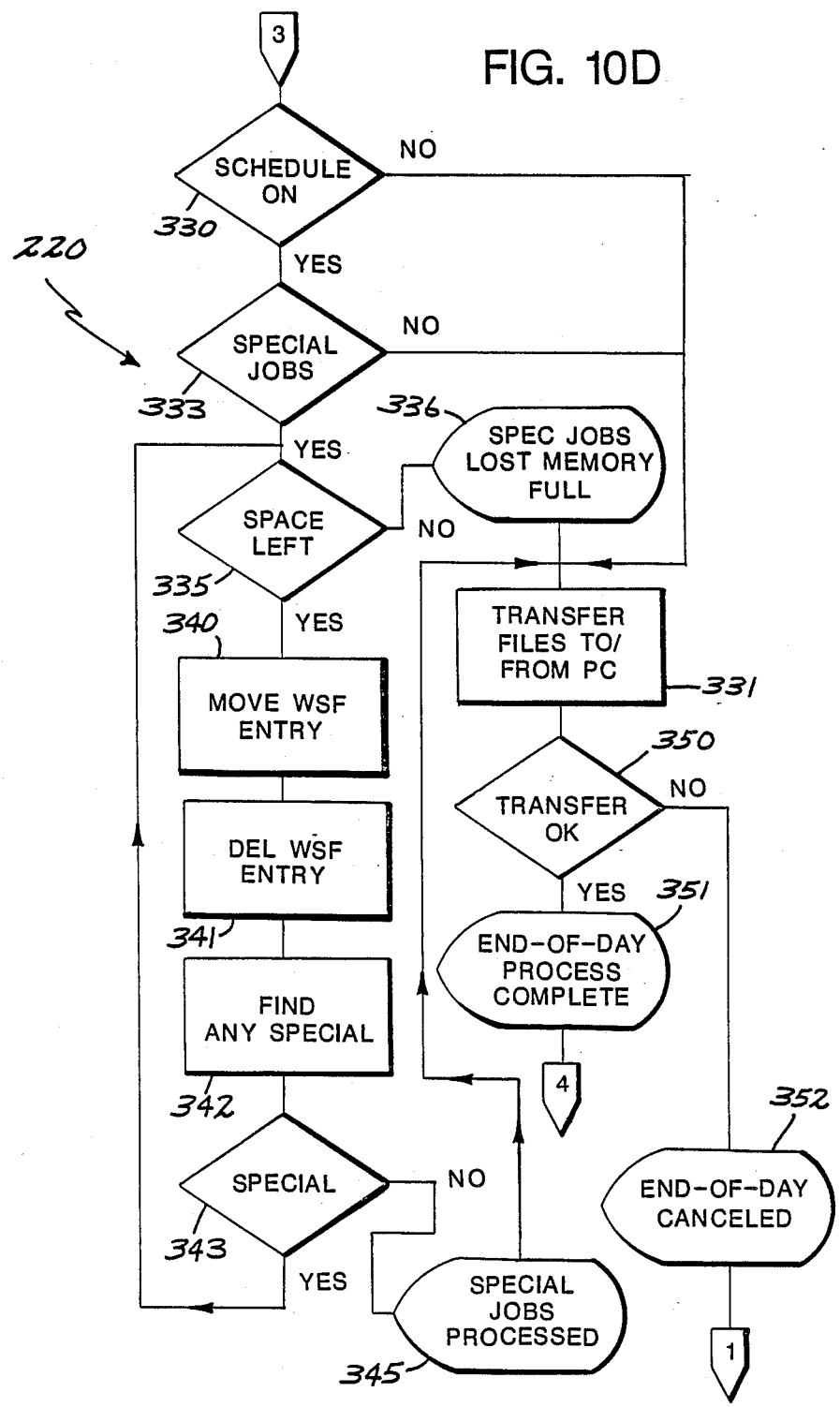
Figure 11A:
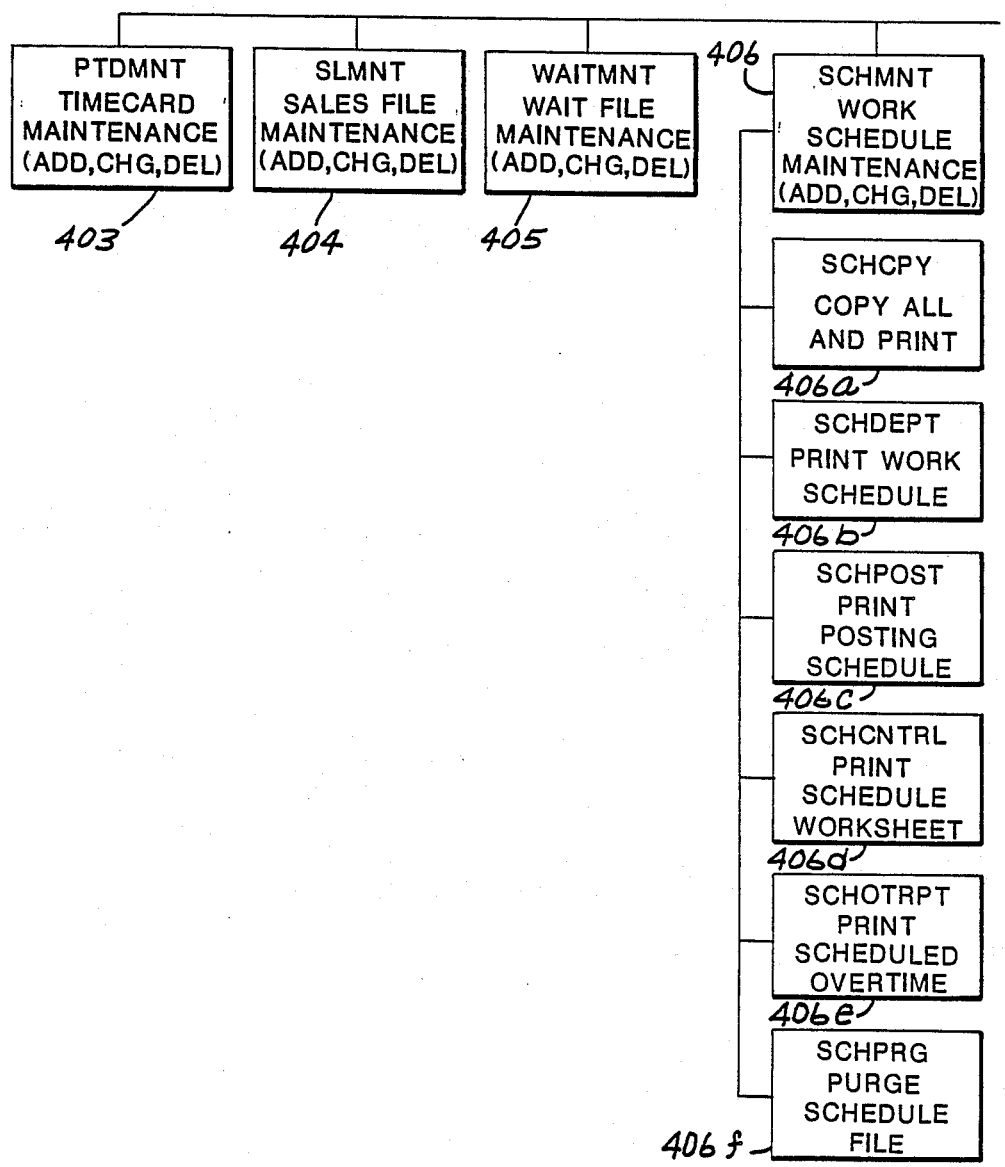
FIGS. 11A, 11B, 11C and 11D comprise a top-down chart of the software operable on the personal computer according to the present invention.
Figure 11B:
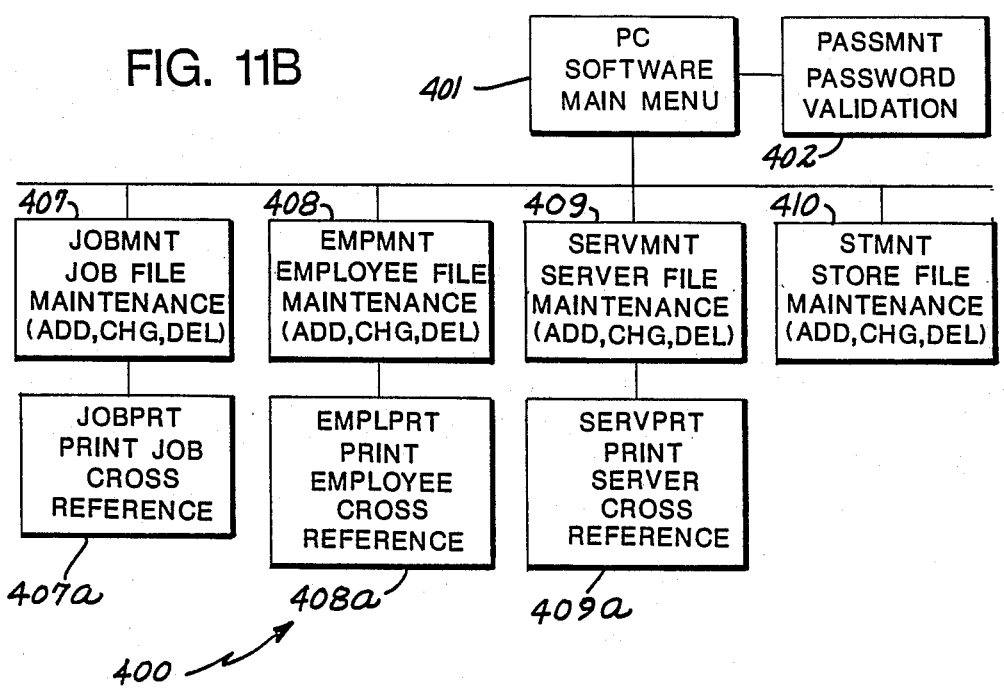
Figure 11C:
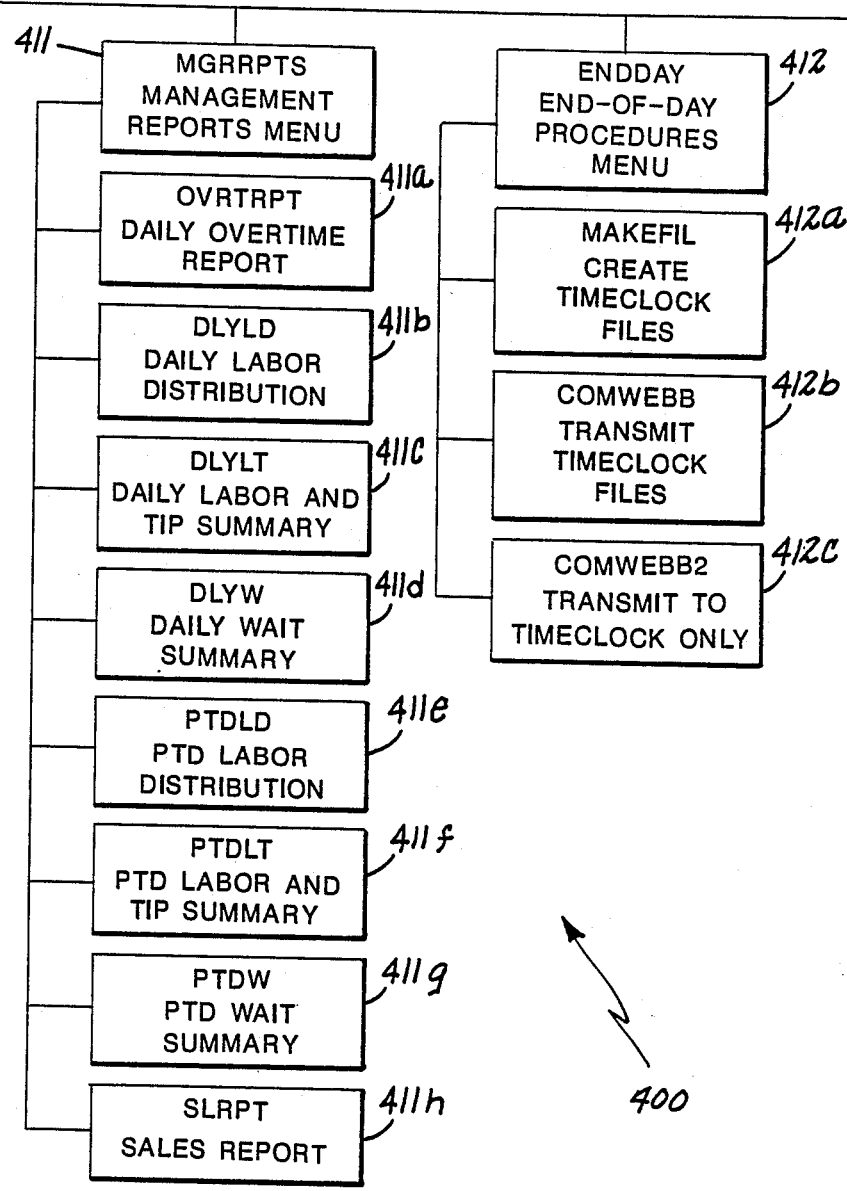
Figure 11D:
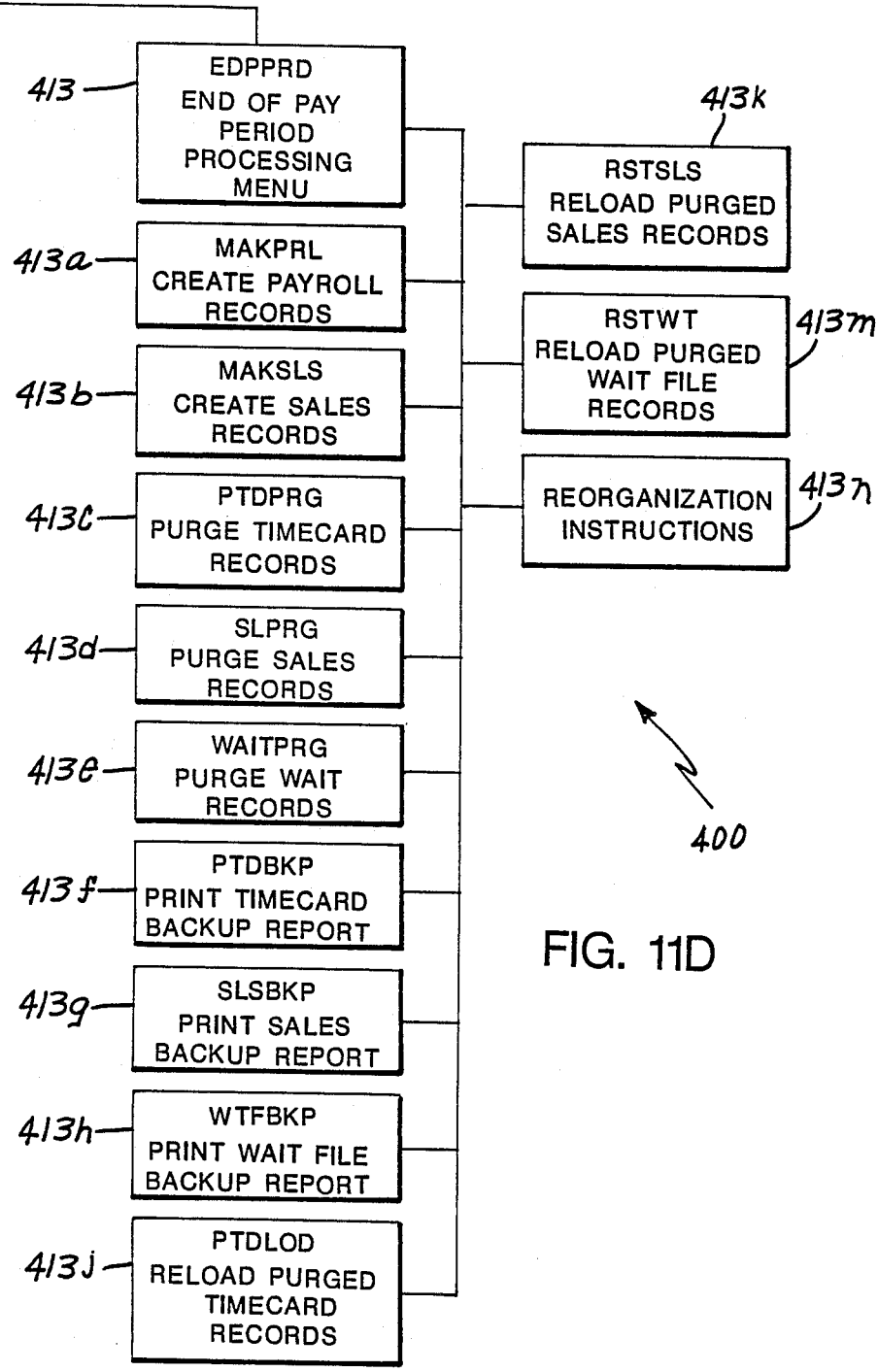

Referring first to FIG. 10A, an inactivity timer is set at block 300. The inactivity timer provides a means for automatically returning from the End-of-Day function routine either at its completion or if a manager abandons the routine for whatever reason before it is completed. Once the inactivity timer has been set (300), the certification records in FILE 58' are searched (301) to determine if any certifications have been left open, i.e. any employees have not yet timed-out. If an open transaction or certification is found, flow continues to decision block 302, and onto display 303 which displays the name of the employee having the open transaction, and the job the employee is working. The manager may then select (304) whether or not he wishes to display the employee's scheduled time-out. If he selects to view the schedule, the flow continues to decision block 305, which determines whether or not SCHEDULE FILE 54' is on or present, and if it is the scheduled time-out is displayed (306); otherwise, flow branches to re-display the employee's name (307). The manager then enters the desired time-out time (308), and the entered string is evaluated (309) for the cancel transaction terminator "C". If the entry is to be cancelled, flow branches (310) to block 311, which turns on the inactivity timer, as described above. Assuming the entry has not been cancelled, flow continues to block 20, at which point routine 220 records the entered time-out in the open certification record.

If the job involved tips, as determined by reference to EMPLOYEE FILE 50', flow continues to prompt 22, which prompts the manager to "Enter Tips" and the tips are retrieved from keyboard 12 (323), and entered into the certification record in TIME RECORD FILE 59 (324). The employee "IN" flag is then reset (325), and a certification or record of the certification is printed (326). Flow then returns to decision block 302, at which time the certification records are once again reviewed to find open transactions. If an open transaction is found, the closing process is again repeated; otherwise, flow proceeds to block 311, and on back to block 300 and decision block 301. With all open transactions closed, flow continues to prompt 312, which displays the message "Print Cert List? E-yes C-no". If a certification list, i.e. a list of all time-in and time-out transactions for the day is desired, such as entered (313) and evaluated (314), causing a certification list to be printed (315). If no certification list is desired, program flow branches around certification list print routine 315 to decision block 330.

It is then determined whether or not the SCHEDULE FILE 54' is operative (330), and if not the flow branches to file transfer routine 231, which will be explained in more detail below. If a schedule is on, flow branches to special jobs decision block 333, at which time SCHEDULE FILE 54' is reviewed for any special jobs, or in other words vacation etc. . . . schedule records, as determined by looking at the special hours code in the schedule records. These schedule records must be processed specially to be converted to time records (certifications) so that payroll is prepared for them. If there are no special jobs, flow branches to transfer routine 331; otherwise, to decision block 335. It is then determined whether or not there is any memory left in RAM 44 (335). If not, the message (336) "Special Jobs Lost, Memory Full" is displayed, and flow proceeds to transfer routine 331; otherwise, any special jobs are processed (340, 341) with a return through decision block 343 until all special jobs have been processed, at which point the message "Special Jobs Processed" is displayed at (345) and flow proceeds to transfer routine 331.

Transfer routine 331, as mentioned above, consists of the transfer of current TIME RECORDS FILE 59, from time clock 10 to personal computer 20, and the corresponding downloading from personal computer 20 of the contents of EMPLOYEE FILE 50, SCHEDULE FILE 54 and PAY PERIOD FILE 58, as will be described below in more detail. However, at this point it is noted that personal computer 20 must be in a communications mode (function 412b) when end-of-day processing is attempted.

Next, (350), it is determined whether or not the transfer was successfully completed. If it was, the message "End-of-Day Process Complete" is displayed, and flow returns to inactivity time-out block 311, which will cause the end of day function to revert to the IDLE routine 118 after a predetermined period. If the transfer was not accomplished, the message "End-of-Day Cancelled" is displayed (352), and flow returns through decision block 302 to in activity block 311. At this point, the manager may determine why the transfer failed, for instance he or she may verify that personal computer 20 was up and loaded with the correct software etc. If a rectifiable problem is found, such problem may be rectified, and the transfer may be reattempted.

Figure 12:
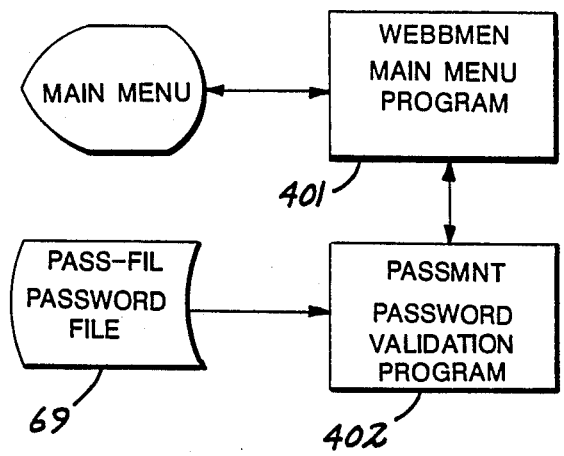
FIGS. 12–63 are diagrammatic illustrations of the various modules and functions of the personal computer software according to the present invention.
Figure 13:
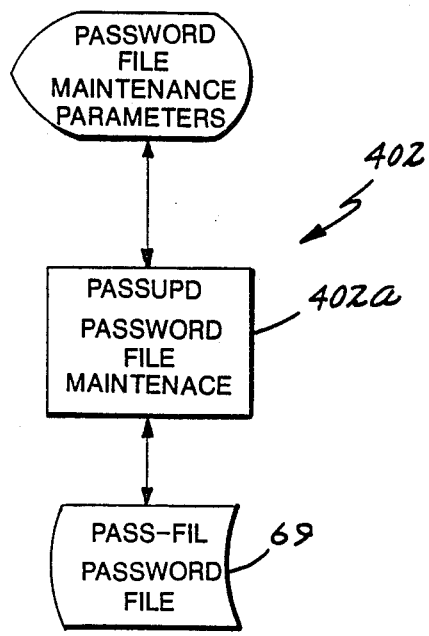

Referring now to FIGS. 11A, 11B, 11C and 11D there is shown a top down chart of the software operative on personal computer 20 to build and maintain files, and to analyze file date and print reports etc. Software 400 is accessed via a Main Menu 401 via which any of the routines or modules 403-413 may be selected. Access to modules 403-413 is restricted via a Password routine 402 which as shown in FIG. 12 is accessed by the Main Menu 401 for validation of passwords as maintained in PASSWORD FILE 69. As shown in FIG. 13, module 402 includes a password update routine 402a, via which the PASSWORD FILE 69 may be updated. Accordingly, module 402 provides for the updating of the PASSWORD FILE 69, and for restricting access to modules 403-413. Many of the modules and functions provided by software 400 are described only briefly (with reference to their essential aspects) for the sake of brevity in the drawing, and because the more detailed aspects and operation can be readily deduced by those skilled in the art.

Figure 14:
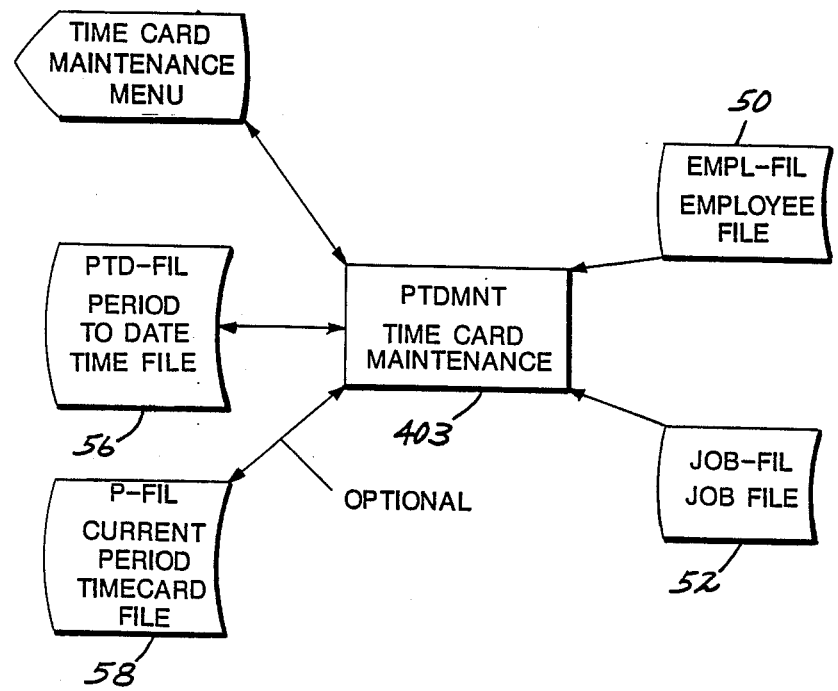

Timecard Maintenance module 403 is shown in FIG. 14. Timecard Maintenance module 403 performs add, change/inquiry and delete maintenance to the PERIOD TO DATE TIMECARD FILE 56 (also herein referred to simply as TIMECARD FILE 56) as necessary to supplement or change records accummulated from time clock 10. It optionally updates the CURRENT PERIOD TIME FILE 58 (also referred to herein simply as PAY PERIOD FILE 58), which would typically be done. In operation, the EMPLOYEE FILE 50 is read to validate the employee number, and the JOB FILE 52 is read to validate the job code.

As mentioned above, the TIMECARD FILE 56 contains detailed time records from the most current update back to the day after the end date of the last purge of the file, and is used to create payroll records (function 413a) as will be described below. The CURRENT PERIOD TIME or PAY PERIOD FILE 58 contains detailed time records for the current pay period only. After the last day of the period the file is initialized (see function 413c below).

Figure 15:
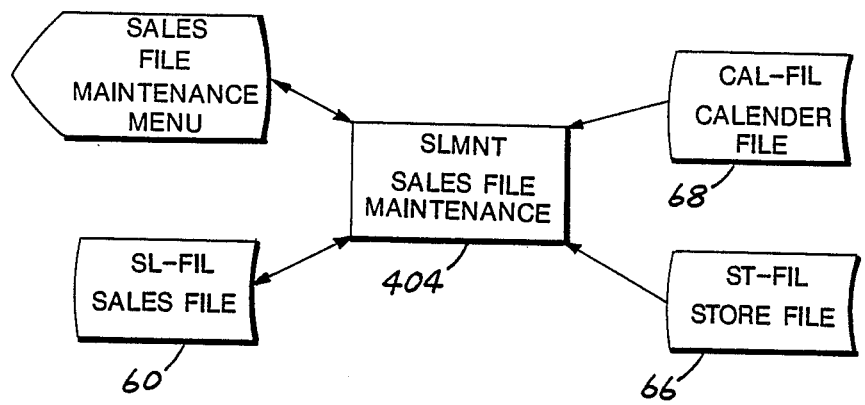

Referring now to FIG. 15, Sales File Maintenance module 404 will be described. Module 404 performs add, change/inquiry and delete maintenance to the SALES FILE 60. STORE FILE 66 is read to validate the store number, to get the category descriptions, and to get the flag settings for sales tax, promo, cover etc. Flag settings of "N" will cause the program to bypass the entry function for those items. CALENDAR FILE 68 is read to edit the date for valid month and day.

Figure 16:
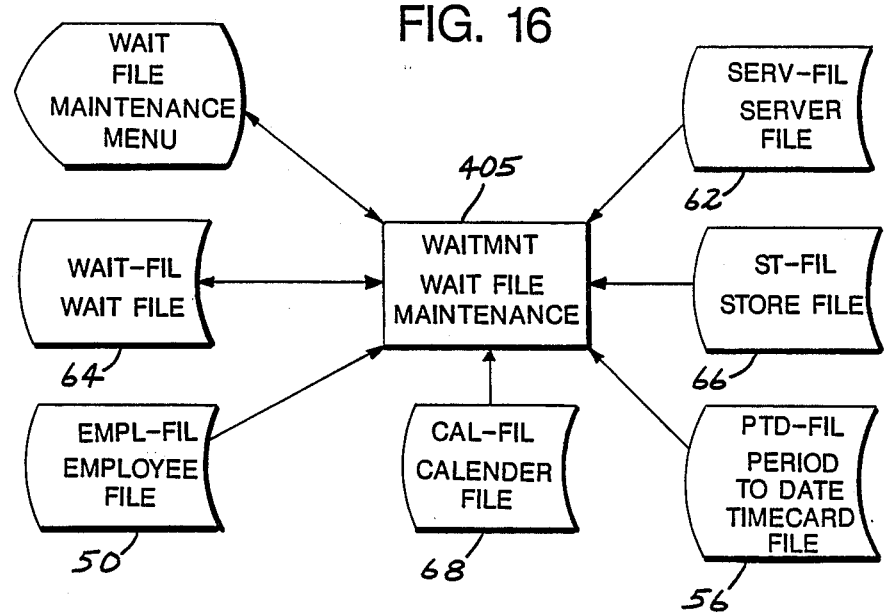

Refer now to FIG. 16, Wait File Maintenance module 405 will be described. Module 405 performs add, change/inquiry and delete maintenance to the WAIT FILE 64. In operation, the EMPLOYEE FILE 50 is read to get the employee name for display after server number entry, while the CALENDAR FILE 68 is read to edit the date for valid month and day. The SERVER FILE 62 is read to validate the server number and to get the employee number, which is the key used to read the WAIT and TIMECARD FILES. The STORE FILE 66 is read, and based on the meal code (B, L, B), the TIMECARD FILE 56 is read to get the total hours to update to the total hours entry.

Figure 17:
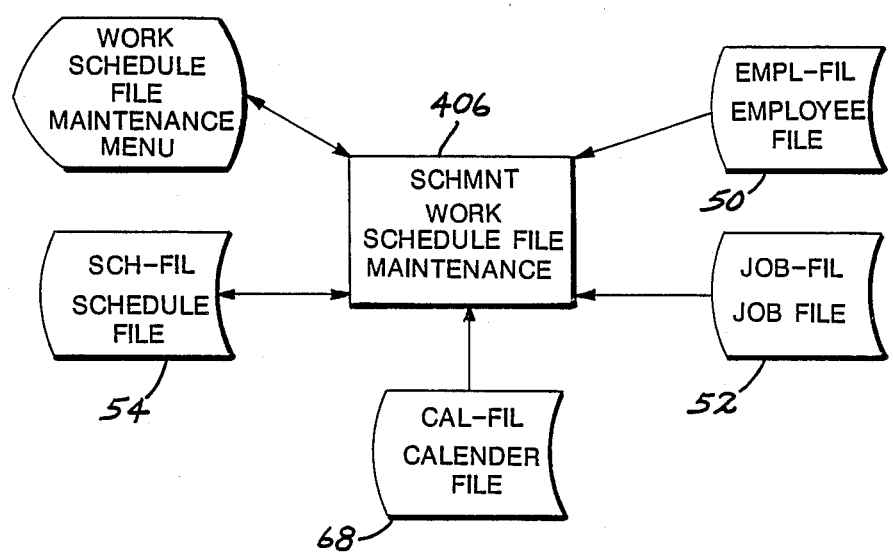

The operation of the Work Schedule Maintenance module 406 will now be described with reference to FIG. 17. Module 406 performs add, change/inquiry and delete maintenance to the SCHEDULE FILE 54. CALENDAR FILE 68 is read to validate the ending date as the seventh calendar day of the week. The EMPLOYEE FILE 50 is read to get the employee name for display, and the JOB FILE 52 is read to validate the EMPLOYEE FILE 50 job codes.

Six additional functions may be called from module 406, including:
Copy All and Print (406a)
Print Work Schedule (406b)
Print Posting Schedule (406c)
Print Schedule Worksheet (406d)
Print Schedule Overtime (406e)
Purge and Print Schedule (406f)

Figure 18:
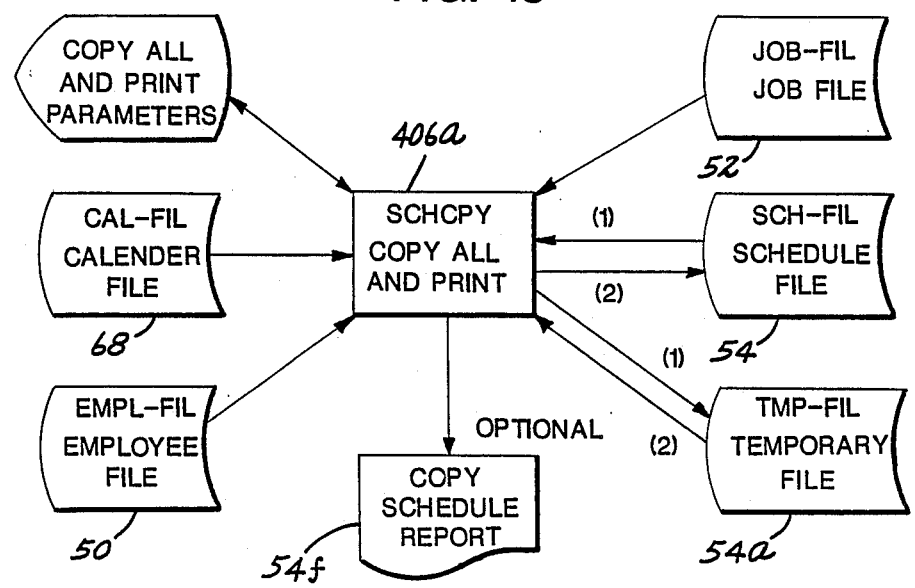
Figure 19:
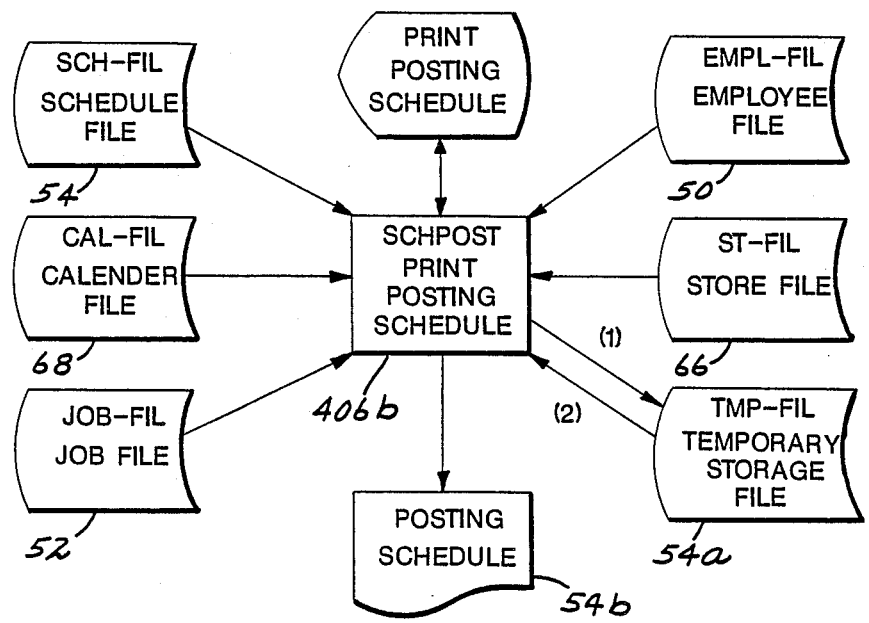
Figure 20:
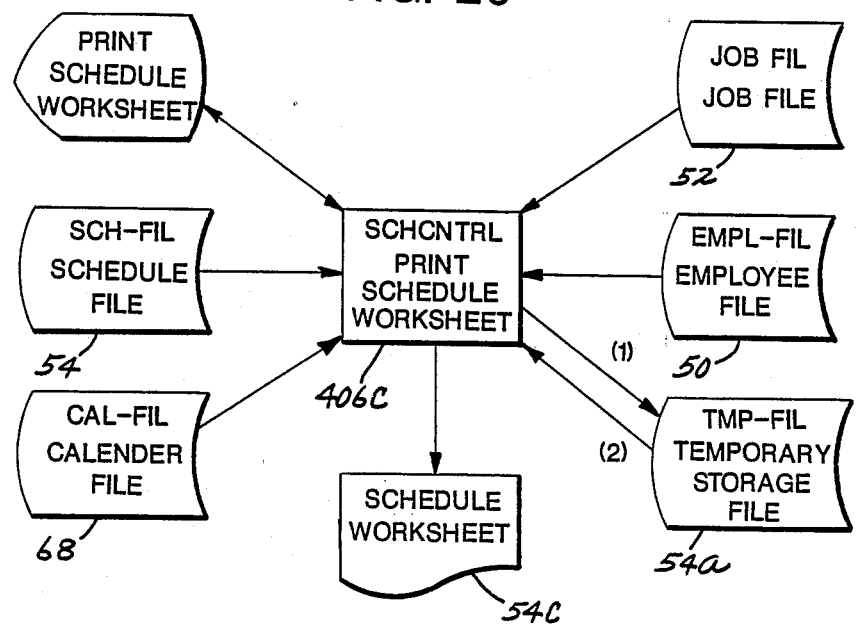

The Copy and Print function 406a, shown in FIG. 18, provides that an old schedule record may be copied and updated to a new week, which new record may be edited etc. . . . In essence this is a quick way to generate a new weeks schedule. Function 406a causes the SCHEDULE FILE 54 to be written to a TEMPORARY WORK FILE 54a. The CALENDAR FILE 68 is then read to validate the new ending date entered by the operator and the EMPLOYEE FILE 50 is read to get the employee name for the copy schedule report 54f. The JOB FILE 52 is read to get the department name for the report. To produce the report, the TEMPORARY FILE 54a is read back in, and new schedule dates are overlayed and the new schedule record is written ten to the SCHEDULE FILE 54. The print posting Schedule function 406b, illustrated in FIG. 19, provides for the printing of a schedule to be posted. The CALENDAR FILE 68 is read to validate the date, and the JOB FILE 52 is read to get the department name for printing. The EMPLOYEE FILE 50 is read to get the employee name for printing, and the STORE FILE 66 is read to get the store name for printing. First, the schedule records from SCHEDULE FILE 54 are written to the TEMPORARY FILE 54a, and then the TEMPORARY FILE 54a is read and the Posting Schedule 54b is printed. Referring to FIG. 20, the Print Schedule Worksheet function 406c is illustrated. The CALENDAR FILE 68 is read to validate the date, while the JOB FILE 52 is read to get the department name for printing. The EMPLOYEE FILE 50 is read to get the employee name for printing. First, the schedule records for the selected week are written from SCHEDULE FILE 54 to TEMPORARY FILE 54a. Next the TEMPORARY FILE 54a is read and the Schedule Worksheet 54c is printed, via which through editing a new schedule may be formulated.

Figure 21:
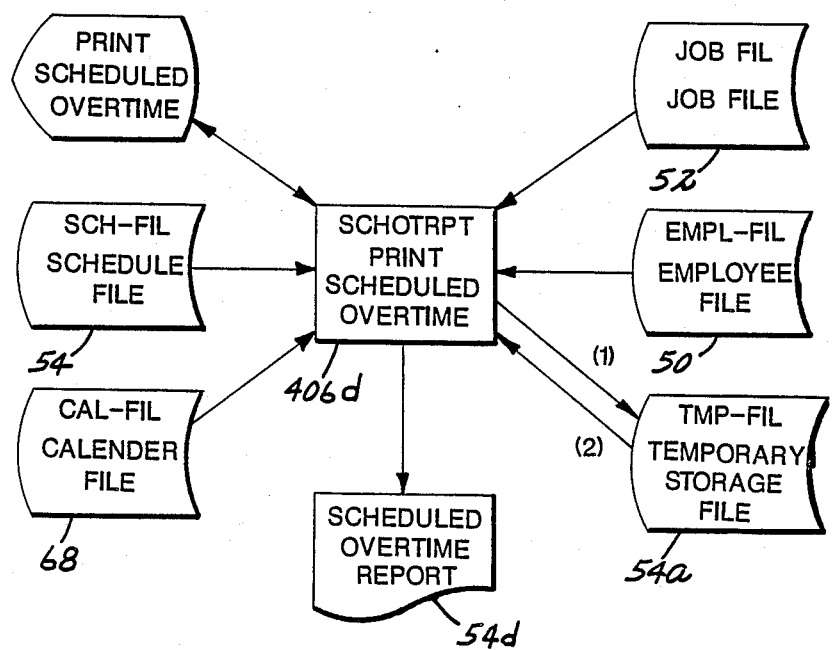

The Print Schedule Overtime function 406d is shown in FIG. 21. The CALENDAR FILE 68 is read to validate the date, and the JOB FILE 52 is read to get the department name for printing. The EMPLOYEE FILE 50 is read to get the employee name for printing. Schedule records for the selected week are written from SCHEDULE FILE 54 to TEMPORARY FILE 54a, and then the TEMPORARY FILE 54a is read and the Scheduled Overtime Report 54d is printed.

Figure 22:
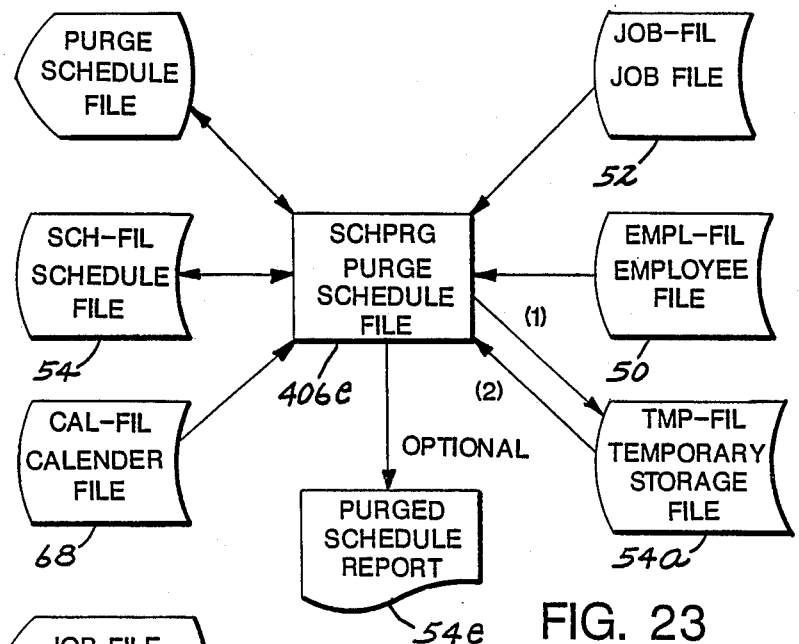

In FIG. 22, the Purge Schedule File function 406e is shown. This function purges the SCHEDULE FILE 54 for the seven day period beginning with the date entered on the terminal. The Purged Schedule Report 54e may be printed as an option. The CALENDAR FILE 68 is read to verify that the period ending date for the purge is the seventh day of the week. The JOB FILE 52 is then read to get the department name, and the EMPLOYEE FILE 50 is read to get the employee name. Again, the SCHEDULE FILE 54 is written to the TEMPORARY FILE 54a, the purge accomplished, the report 54e printed if desired. If a mistake has been made, the TEMPORARY FILE 54a may be written back to the SCHEDULE FILE 54.

Figure 23:
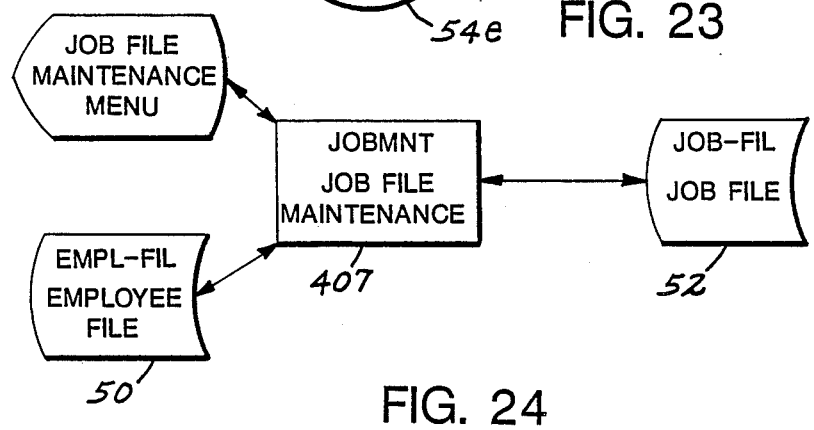
Figure 24:
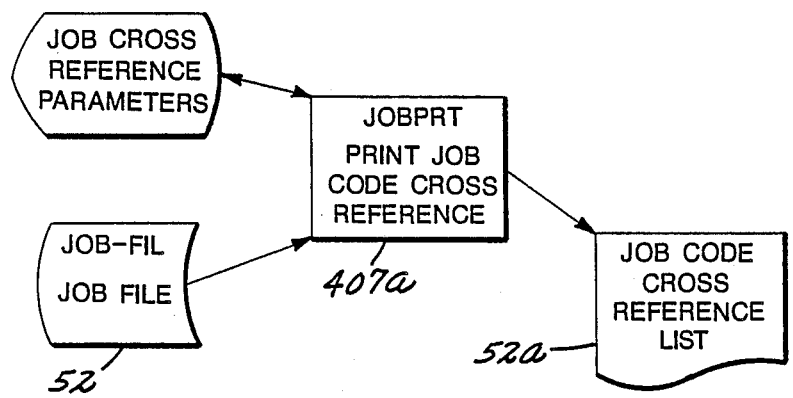

Referring to FIG. 23, the Job File Maintenance module 407 will be described. Module 407 performs add, change/inquiry and delete maintenance to the JOB FILE 52. If a job code or tip code is changed in a record in the JOB FILE 52, those changes are automatically made to the affected records in the EMPLOYEE FILE 50. Job File Maintenance module 407 also includes a print job cross reference function 407a, which is shown in FIG. 24. Function 407a reads the JOB FILE 52 in order to generate job code cross reference list 52a. Preferably, job code start and stop numbers may be entered such that only a portion of a job code reference list can be generated.

Figure 25:
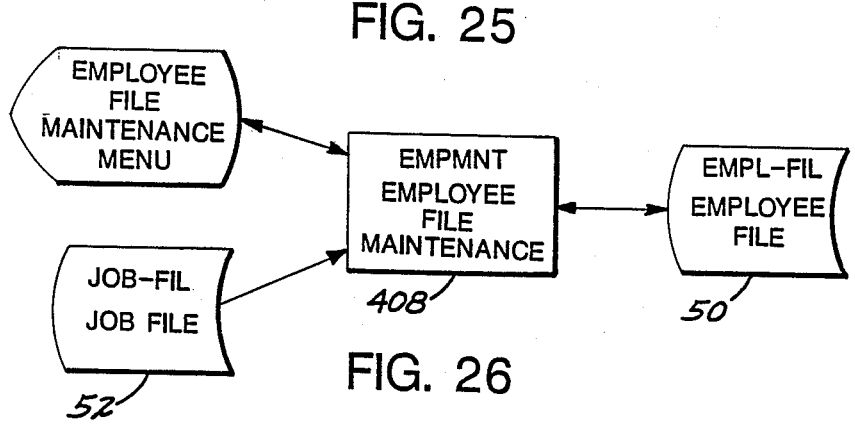
Figure 26:
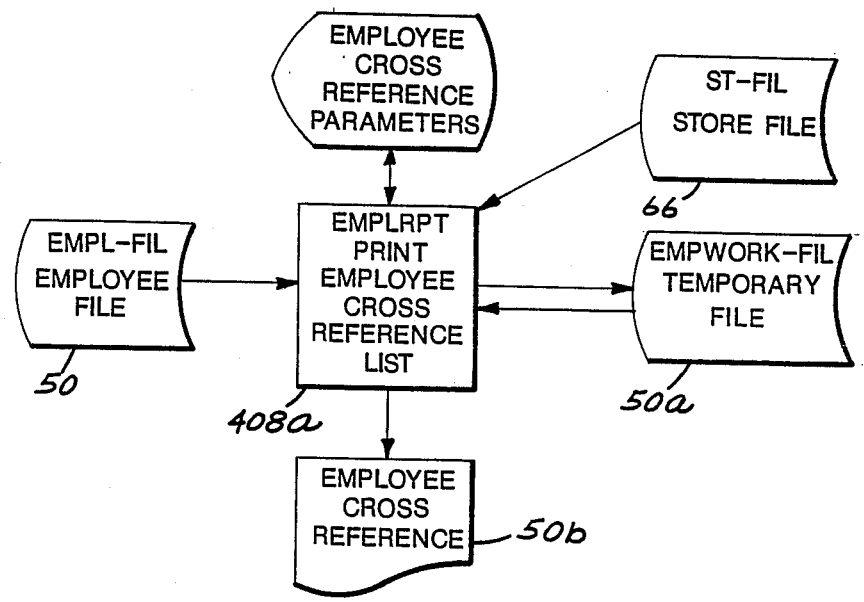

Employee File Maintenance module 408 is shown in FIG. 25. Module 408 performs add, change/inquiry and delete maintenance to records in the EMPLOYEE FILE 50. The JOB FILE 52 is read to get the department name for the display and to get the tip code to move to the EMPLOYEE FILE 50 record. An employee cross reference print function 408a may be called from module 408. As shown in FIG. 26, function 408a calls upon the EMPLOYEE FILE 50 and the STORE FILE 66, to either print reports by employee number, employee name or work codes. If an Employee Cross Reference report 50b is to be generated by work codes, TEMPORARY WORKING FILE 50a is used to explode the employee record by work codes.

Figure 27:
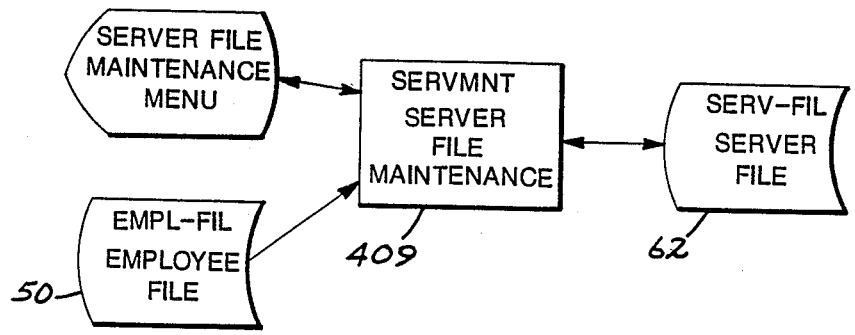
Figure 28:
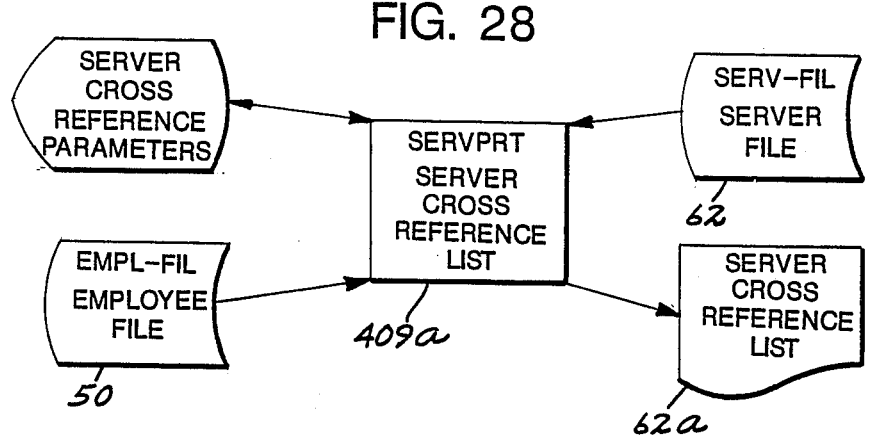
Figure 29:
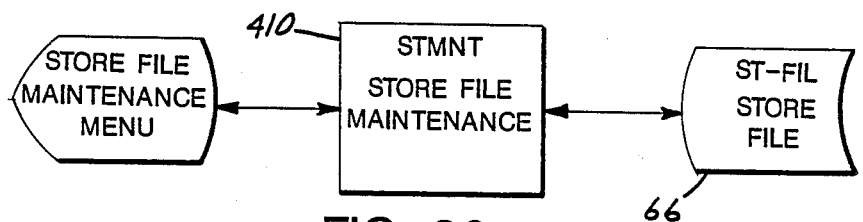

The Server File Maintenance module 409 is shown in FIG. 27. It performs add, change/inquiry and delete maintenance to the SERVER FILE 62. The EMPLOYEE FILE 50 is read to verify the employee number and to display the employee name on the screen for visual verification. A Print Server Cross Reference function 409e is provided as shown in FIG. 28. Function 409e calls on EMPLOYEE FILE 50 and SERVER FILE 62, via which a Server Cross Reference List 62a may be generated by server number or server name. Preferably, the list may be generated in segments, such that server number ranges or alpha character ranges may be specified. In FIG. 29, the Store File Maintenance Module 410 is shown. It performs add, change/inquiry and delete maintenance to the STORE FILE 66 records.

Figure 30:
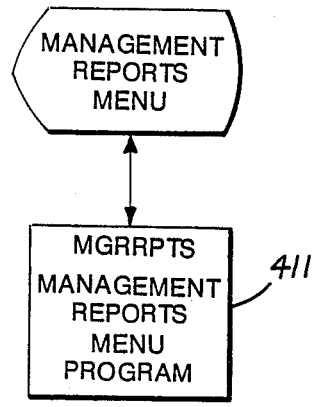
Figure 31:
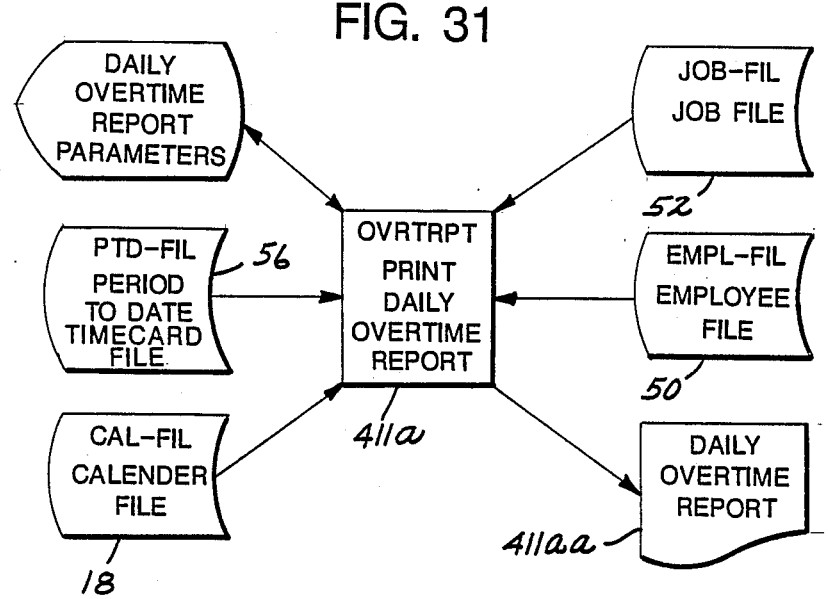

The Management Reports Menu Module 411 is shown in FIG. 30, and provides access to report functions 411a–411h. The particular format of the various reports is not given in detail for the sake of brevity. However, it will be understood that these reports maybe formulated as desired and that averaging or other mathematical manipulations of the data may be provided for. As shown in FIG. 31, the Print Daily Overtime Report 411a function reads the CALENDAR FILE 68 to get the day of week, which is used to determine the maximum number of hours for inclusion on the report. The JOB FILE 52 is read to get the department name for the report, and the EMPLOYEE FILE 50 is read to get the EMPLOYEE NAME for the report. The Daily Overtime Report 411aa is then generated with reference to the TIMECARD FILE 56, totaling the time for each employee in a given time period, and determining whether the total exceeds limits assigned according to the length of the period (i.e. one, two, three days etc. . . . ).

Figure 32:
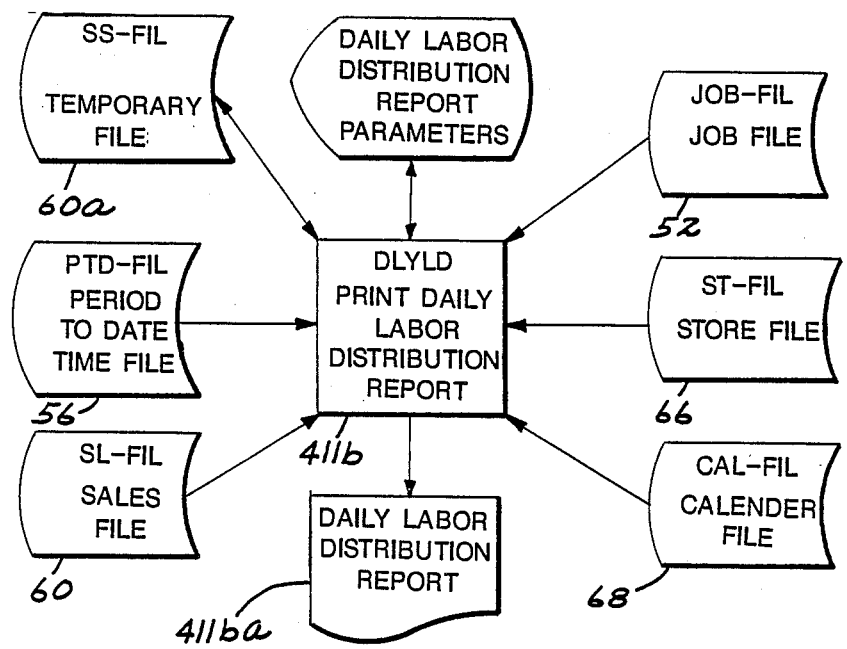

Referring to FIG. 32, a Print Daily Labor Distribution Report function 411b is illustrated. Function 411b reads the JOB FILE 52 to get the department name for printing, while the STORE FILE is read to get the store name and heading for printing. SALES FILE 60 is read to get the store sales dollars for reporting, while the CALENDAR FILE 68 is read to validate the date. The report details are obtained from data in the period to date TIMECARD FILE 56, with the total sales for each store being temporarily written to the TEMPORARY FILE 60a before generation of Labor Distribution Report 411ba.

Figure 33:
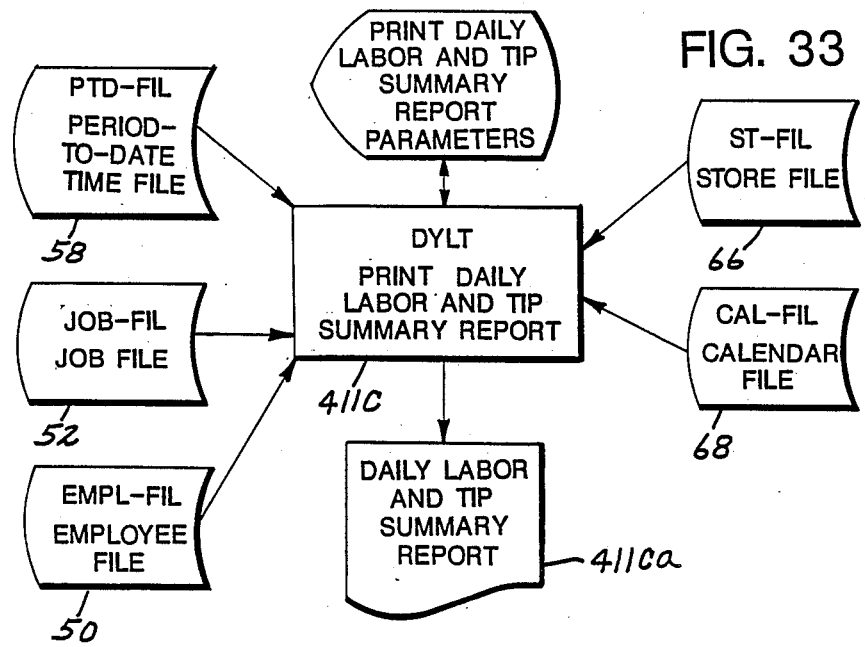

In FIG. 33, the Print Daily Labor and Tip Summary Report function 411c is illustrated. The CALENDAR FILE 68 is read to validate the date, and the JOB FILE 52 is read to get the department name for printing. The EMPLOYEE FILE 50 is read to get the employee name for printing, and then the STORE FILE 66 is read to get the store name for printing. The Daily Labor and Tip Summary Report 411ca is then generated via data obtained from the TIMECARD FILE 56.

Figure 34:
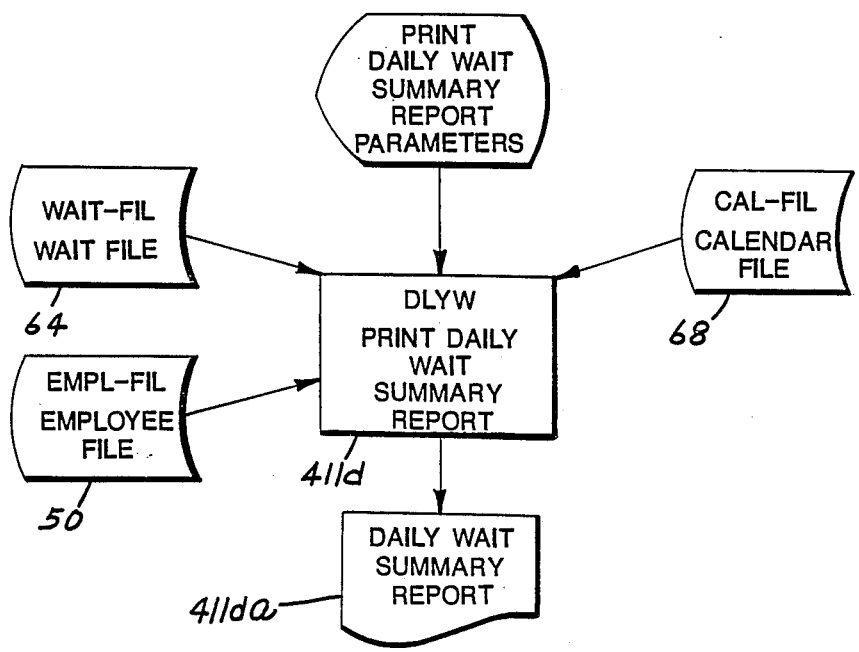
Figure 35:
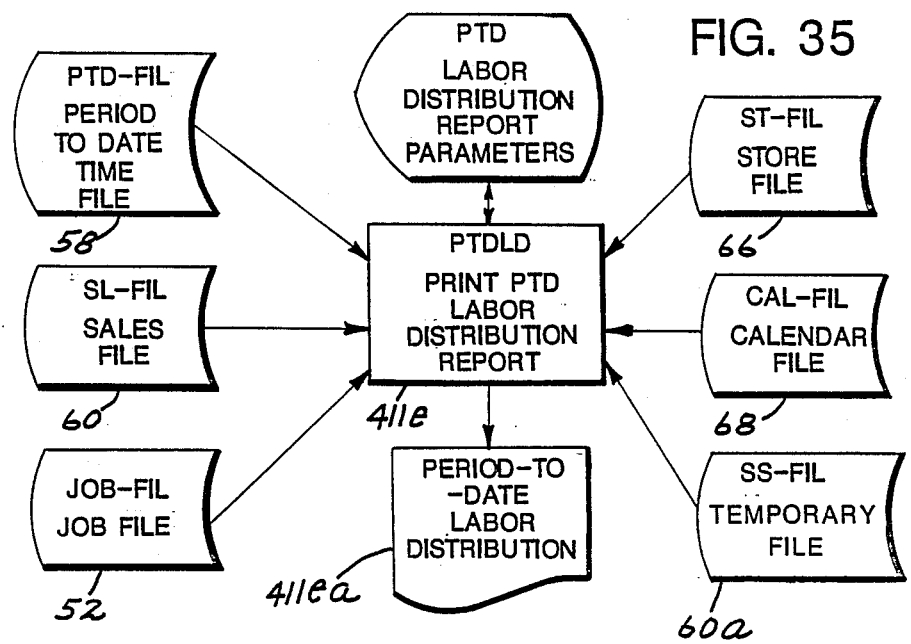

The Print Daily Wait Summary Report function 411d is illustrated in FIG. 34. The Daily Wait Summary Report 411da is generated via data obtained from the WAIT FILE 64, with the CALENDAR FILE 68 and EMPLOYEE FILE 50 read to validate the date and retrieve the employee name for printing respectively. Referring to FIG. 35, the Print Period To Date (PTD) Labor Distribution Report function 411e is shown. The CALENDAR FILE 68 and JOB FILE 52 are read to validate the date and to retrieve the department name for printing, respectively. STORE FILE 66 is read to get the store name and department number range. The SALES FILE 60 is read to get the store sales dollars for reporting. The total sales for each store are temporarily written to the TEMPORARY FILE 60a, with the report detail being obtained from the TIMECARD FILE 56 for Labor Distribution Report 411ea.

Figure 36:
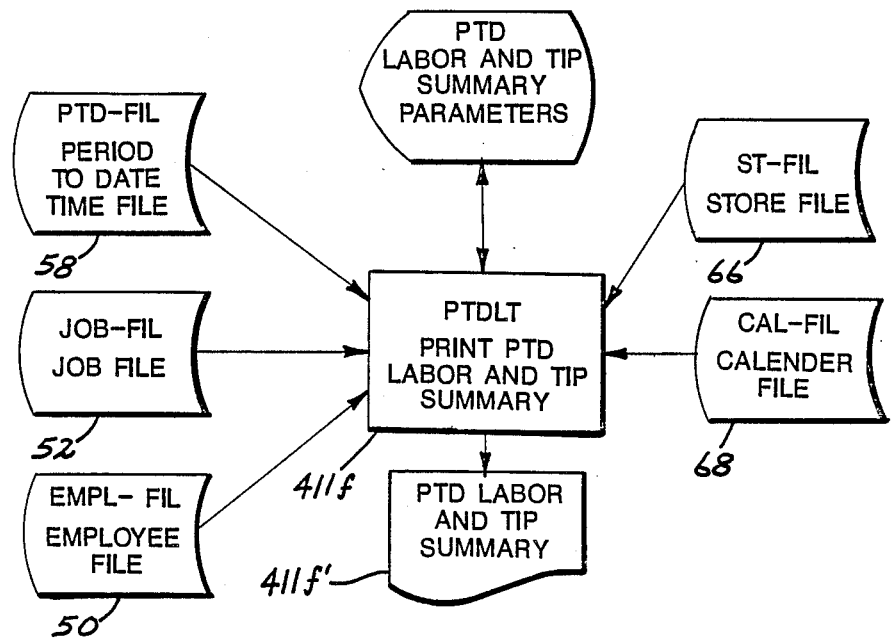

The Print Period To Date (PTD) Labor and Tip Summary function 411f is shown in FIG. 36. CALENDAR FILE 68 and the JOB FILE 52 are read to validate the date and to retrieve the department name for printing, respectively. The EMPLOYEE FILE 50 and the STORE FILE 66 are read to get the employee name and the store name for printing, respectively. The report detail is obtained from TIMECARD FILE 56, in order to generate PTD Labor and Tip Summary Report 411fa.

Figure 37:
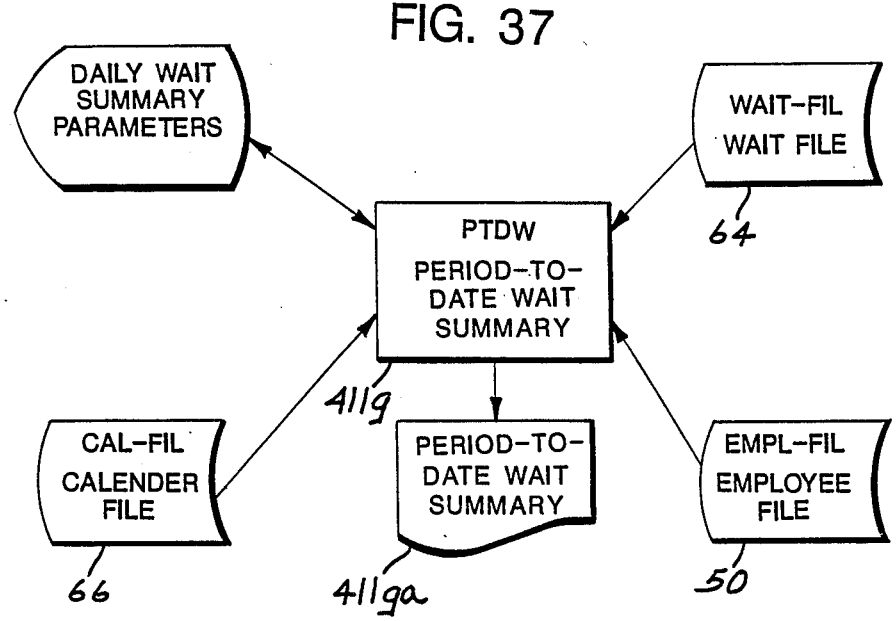

Referring to FIG. 37, the Print PERIOD TO DATE Summary function 411g is shown. CALENDAR FILE 66 and the EMPLOYEE FILE 50 are read to validate the date and to get the employee name for printing, respectively. The PERIOD TO DATE Wait Summary Report 411ga is then generated from the information held in WAIT FILE 64.

Figure 38:
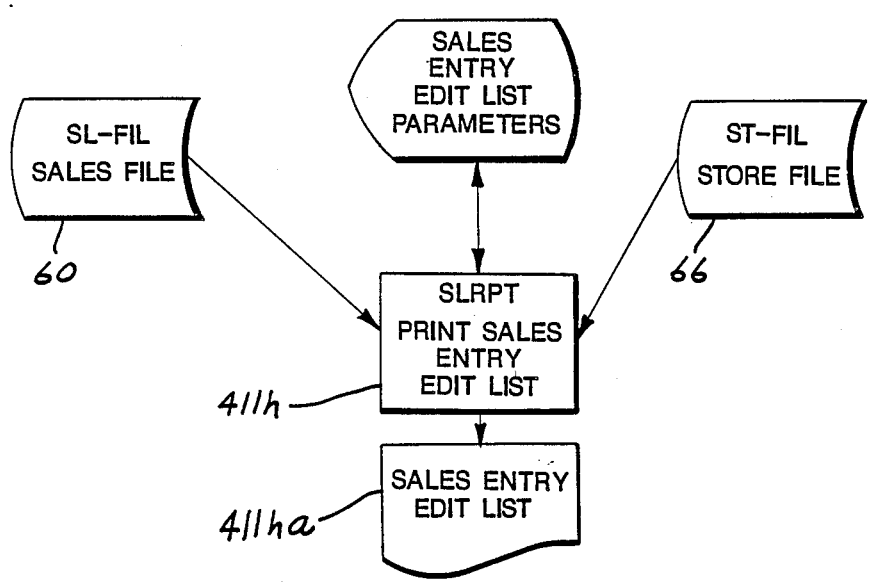

Referring now to FIG. 38, the Sales Report function 411h is shown. STORE FILE 66 is read to get the store name, the headings and subheadings for printing, while the Sales Report 411ha is generated from data obtained from SALES FILE 60.

Figure 39:
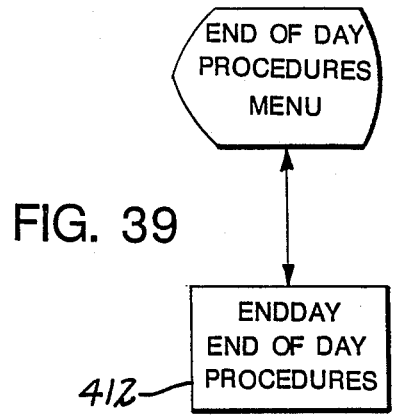
Figure 40:
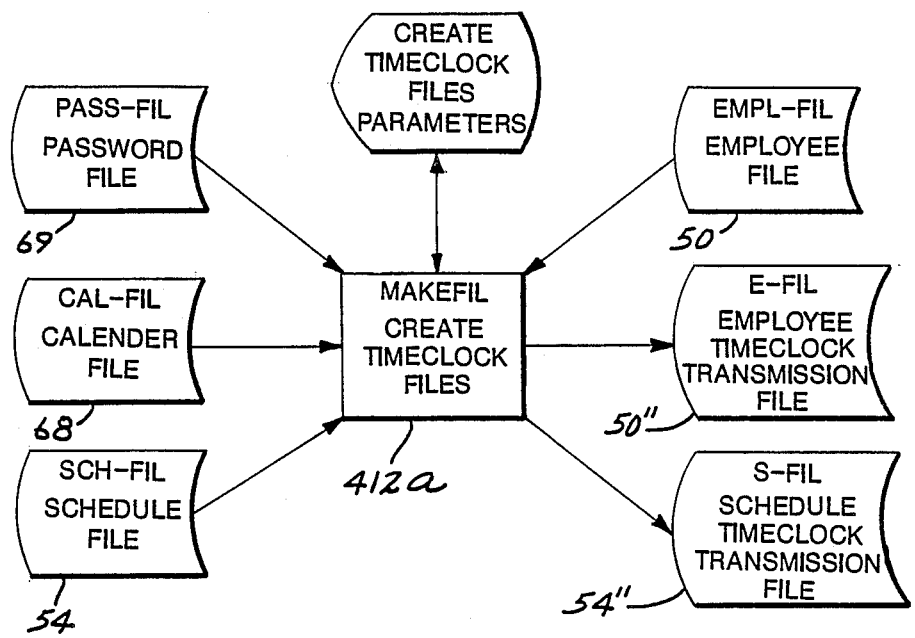

End-of-Day Procedures Menu module 412 is shown in FIG. 39. Module 412 provides access to functions 412a, 412b and 412c. In FIG. 40, the Create Time Clock Files 412a function is shown. The SCHEDULE FILE 54 is read and reformatted in sequential form to become the SCHEDULE TIME CLOCK TRANSMISSION FILE 54″, Preferably, only the current weeks schedule records are reformatted into FILE 54″, to minimize memory requirements in time clock 10. EMPLOYEE FILE 50 is also converted to the sequential EMPLOYEE TIME CLOCK TRANSMISSION FILE 50″. The PASSWORD FILE 69 is read to get the manager's password for transmission as the first record in the EMPLOYEE TIME CLOCK TRANSMISSION FILE 50". The CALENDAR FILE 68 is read to validate the date. As will be explained below, these sequential files must be prepared daily, to be sent to time clock 10 via the RS232 interface.

Figure 41:
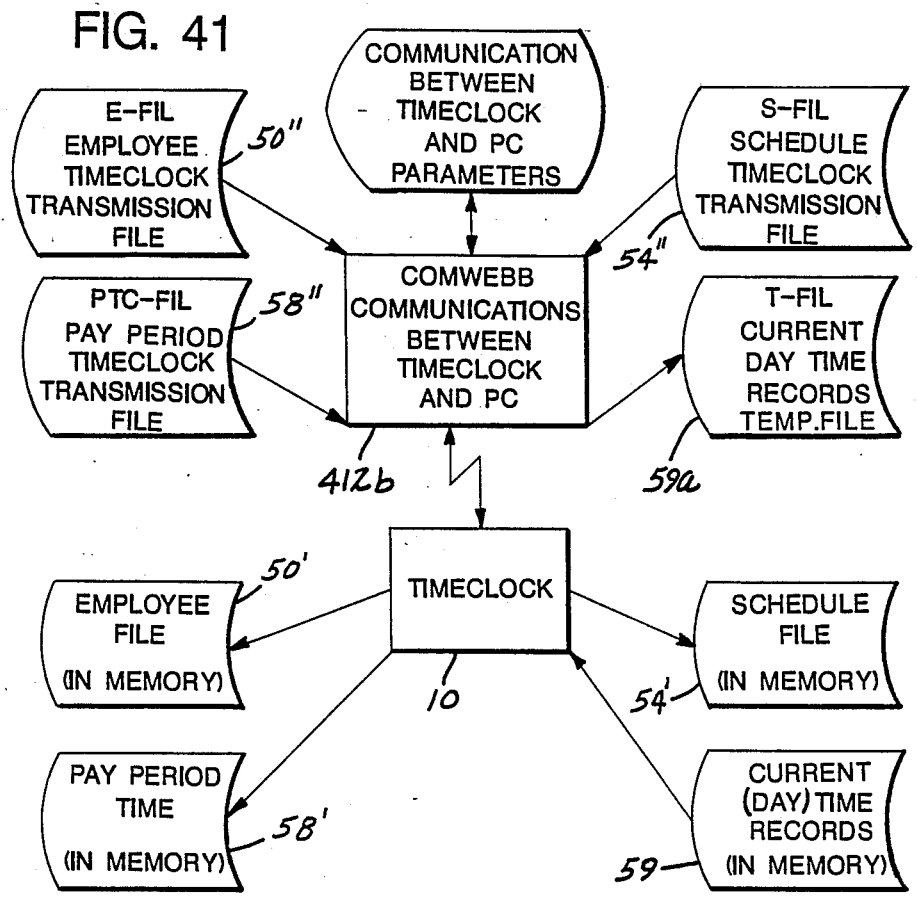
Figure 42:
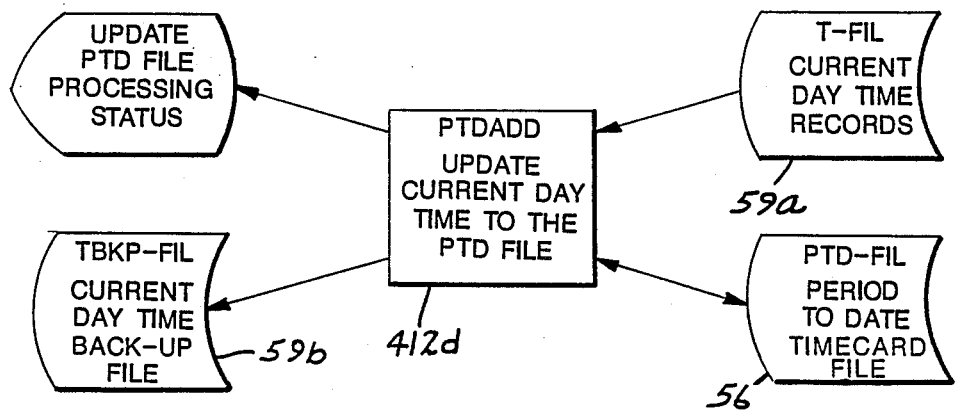
Figure 43:
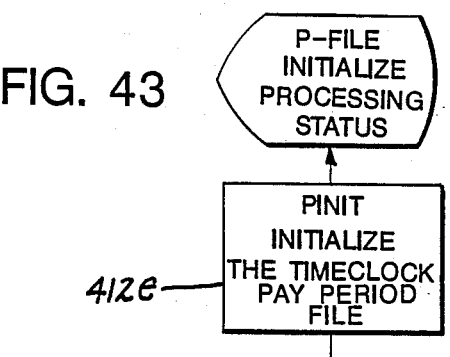
Figure 44:
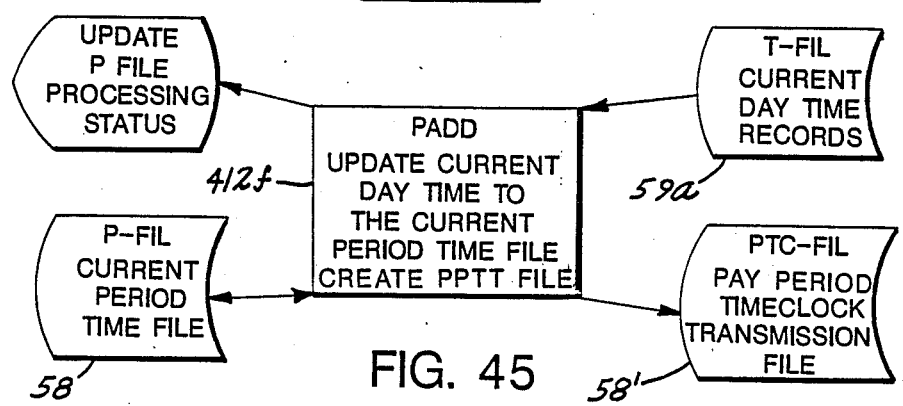

Referring now to FIG. 41, the communications or Transmit Time Clock Files function 412*b* is described. Generally speaking, function 412*b* provides communication between personal computer 20 and time clock 10 (master-slave, respectively) in order to retrieve the CURRENT (DAY) TIME RECORDS FILE 59 from RAM 44 time clock 10, to send files, and to reset pointers (etc. . . . ) in the time clock 10. As described below in the "Operations" section herein, function 412*b* does not "activate" for communication until time clock 10 reaches its End-of-Day communications function. Once active, FILE 59 records are retrieved and are temporarily maintained in the temporary current day time records TEMPORARY FILE 59*a*. Next, as shown in FIGS. 42 and 44, the current day time records from TEMPORARY FILE 59*a* are updated to the CURRENT PERIOD TIME FILE 58 and TIMECARD FILE 56 via functions 412*f* and 412*d*, respectively. Once the updates are made, function 412*f* also creates the PAY PERIOD TIME CLOCK TRANSMISSION FILE 58" (equivalent to PAY PERIOD FILE 58' ), which is a sequential file containing the contents of PAY PERIOD 58. At this point it is again noted that all personal computer 20 files are maintained on disk.

Finally, as shown in FIG. 41, the Transmit To Time Clock function 412*b* sends the EMPLOYEE TIME CLOCK TRANSMISSION FILE 50", SCHEDULE TIME CLOCK TRANSMISSION FILE 54" and the PAY PERIOD TIME CLOCK TRANSMISSION FILE 58" to the time clock 10. Also, function 41 resets the pointers in the time clock 10 CURRENT PAY TIME RECORDS FILE 59 to "initialize" it. Consequently, time clock 10 holds in memory an updated EMPLOYEE FILE 50', a PAY PERIOD FILE 58' and SCHEDULE FILE 54', which are the RAM 44 stored counterparts to FILES 50", 58" and 54", respectively.

Function 412*b* also provides for the purging of or erasing of the contents of PAY PERIOD FILE 58' at the end of each pay period, by calling Initialize function 412*e*. To do so, a terminal prompt inquires as the function is first executed (via the MAIN MENU) whether or not the pay period is at an end. If so indicated by the operator, a purged FILE 58" is sent to time clock 10 to start a new pay period.

Figure 45:
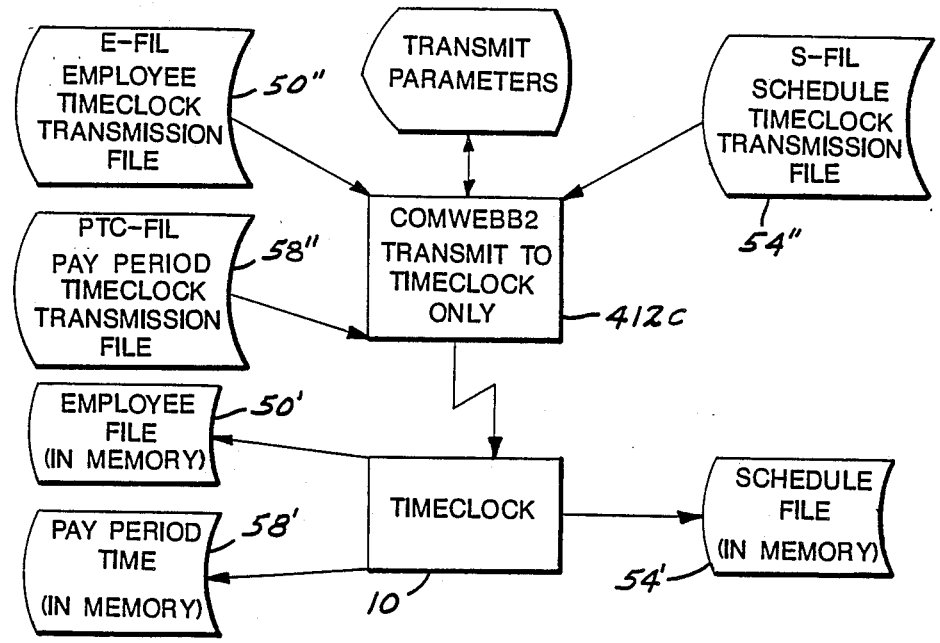

Referring now to FIG. 45, the Transmit to Time Clock only function 412*c* is illustrated. This function is used only in special circumstances such as system start-up, and only assembles and transmits FILES 50", 54" and 58" to the time clock 10. It does not receive records from the time clock 10 and performs no updating.

Figure 46:
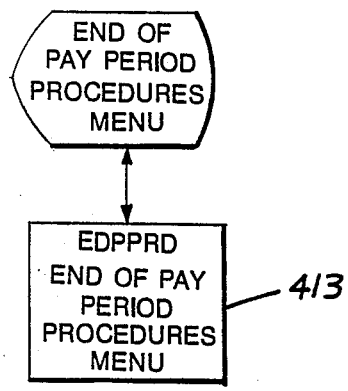
Figure 47:
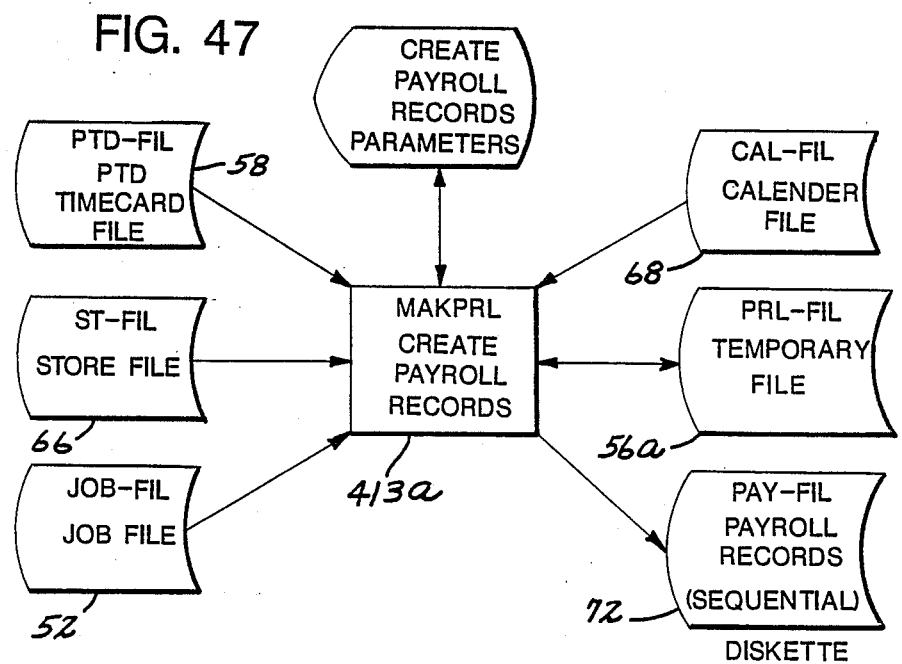

Referring to FIG. 46, the End-of-Pay Period Procedures Menu module 413 is shown. Module 413 may call any one of processing functions 413*a*–413*h*. Referring to FIG. 47, Create Payroll Records function 413*a* is shown. The CALENDAR FILE 68 is read to validate the date, while the JOB FILE 52 is read to get the job rate per hour. The STORE FILE 66 is read to get the department numbers and store number. The PERIOD TO DATE TIMECARD FILE 56 records are then read in, called according to date range and written to the TEMPORARY FILE 56*a*. The selected records are then written to the SEQUENTIAL DISKETTE FILE 72, for later processing by a payroll computer system, for example as provided for an IBM ® System 34.

Figure 48:
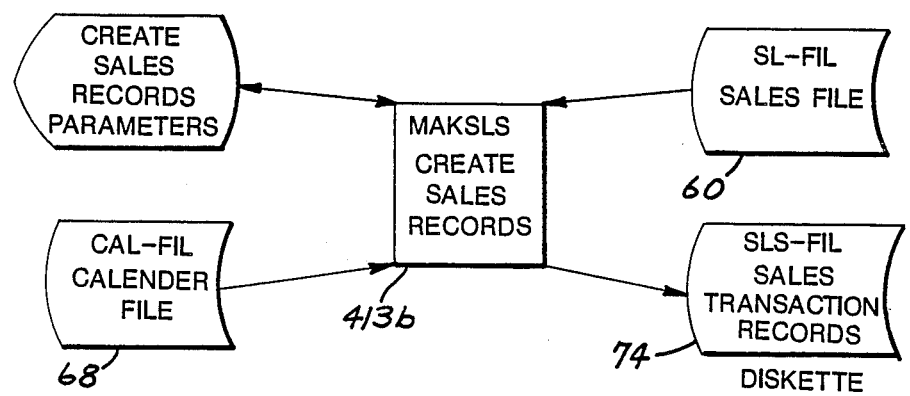

The Create Sales Records function 413*b* is illustrated in FIG. 48. The CALENDAR FILE 68 is read to validate the date and the SALES FILE 60 is read and written to the SEQUENTIAL DISKETTE FILE 74, for later processing by a sales analysis program for example as provided for an IBM ® system 34.

Figure 49:
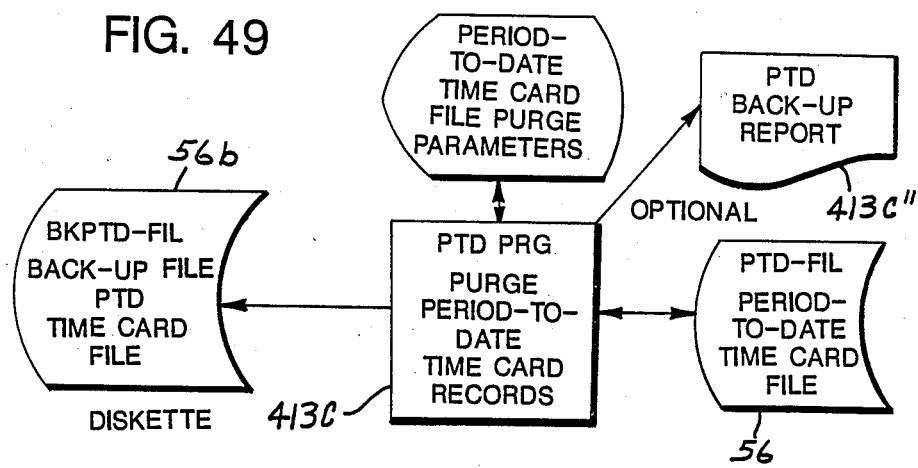

Referring to FIG. 49, the Purge Period to Date Timecard Records function 413*c* is illustrated. The TIMECARD FILE 56 records are read, checked for correct date range, and written to a Backup PTD Timecard File diskette 56*b*. The records are then deleted from the PERIOD TO DATE FILE 58. Optionally, a PTD Backup Report 413*c*' may be printed.

Figure 50:
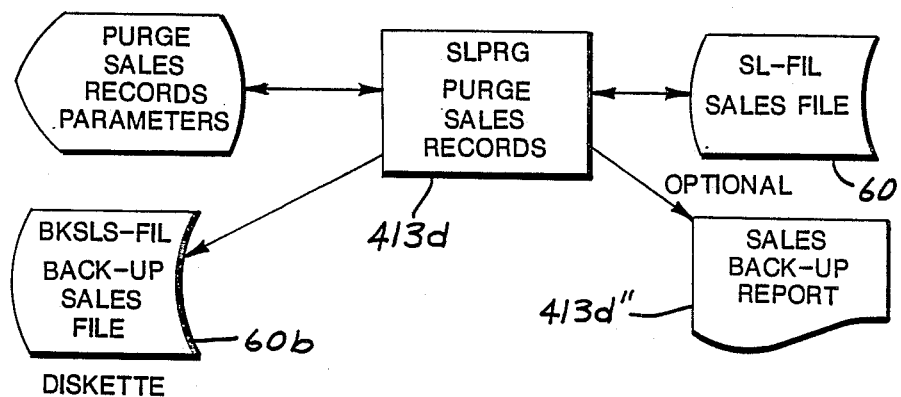

The purge sales records function 413*d* is illustrated in FIG. 50. The records in SALES FILE 60 are read, checked for the correct date range, and written to the Backup Sales File diskette 60*b*. Then, the records are deleted from the SALES FILE 60. A sales backup report 413*d*' may be printed as an option.

Figure 51:
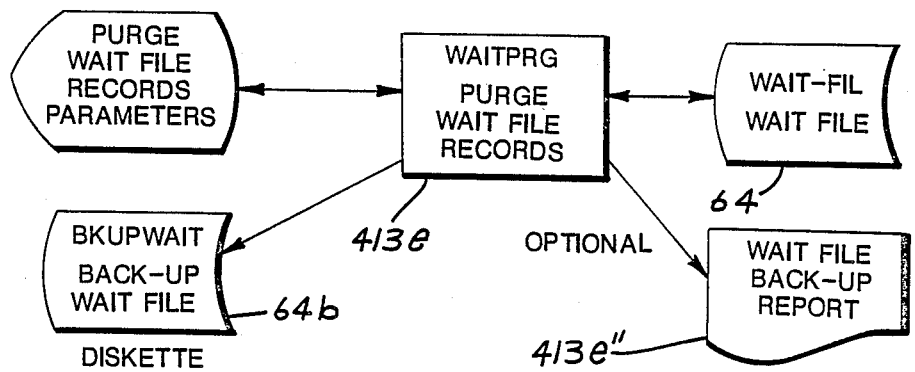

Referring to FIG. 51, the Purge Wait File Records function 413*e* is illustrated. The WAIT FILE RECORDS 64 are read, checked for the correct date range, and written to the Backup Wait File diskette 64*b*, before being deleted from the WAIT FILE 64. Again, an optional backup report 413*e*' may be printed if desired.

Figure 52:
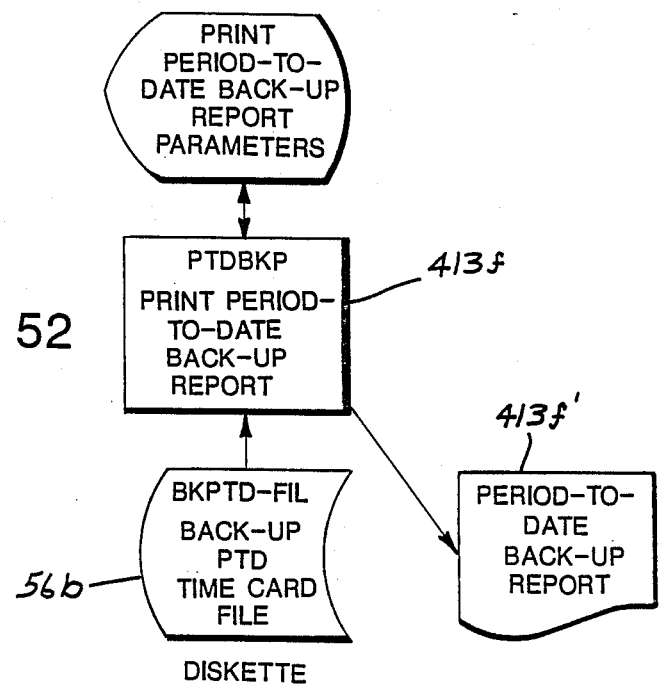

In FIG. 52 there is shown the Print Period to Date Backup Report function 413*f*. Function 413*f* reads the Period to Date Timecard Backup File 56*b* from the diskette and prints the Period to Date Backup Report 413*f*'.

Figure 53:
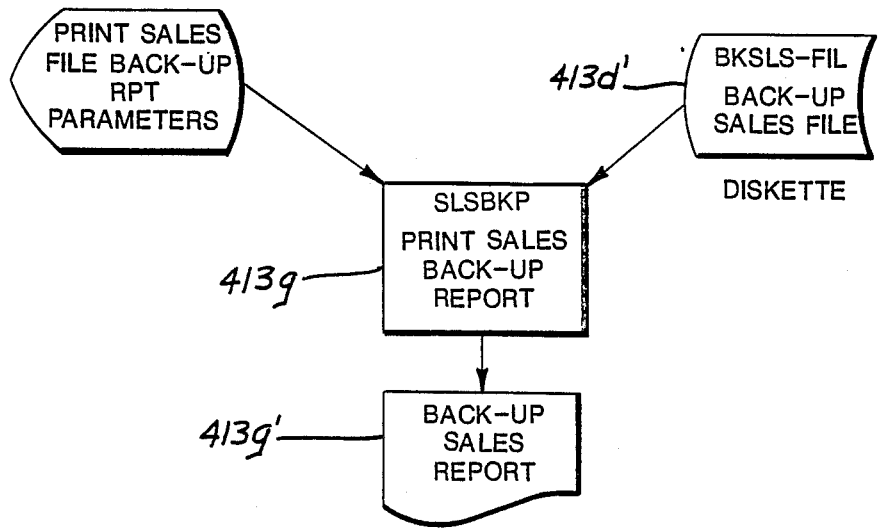

Referring now to FIG. 53, there is shown the Print Sales Backup Report function 413*g*. This function causes the Backup Sales File diskette 60*b* to be read and a Sales Backup Report 413*g*' to be printed.

Figure 54:
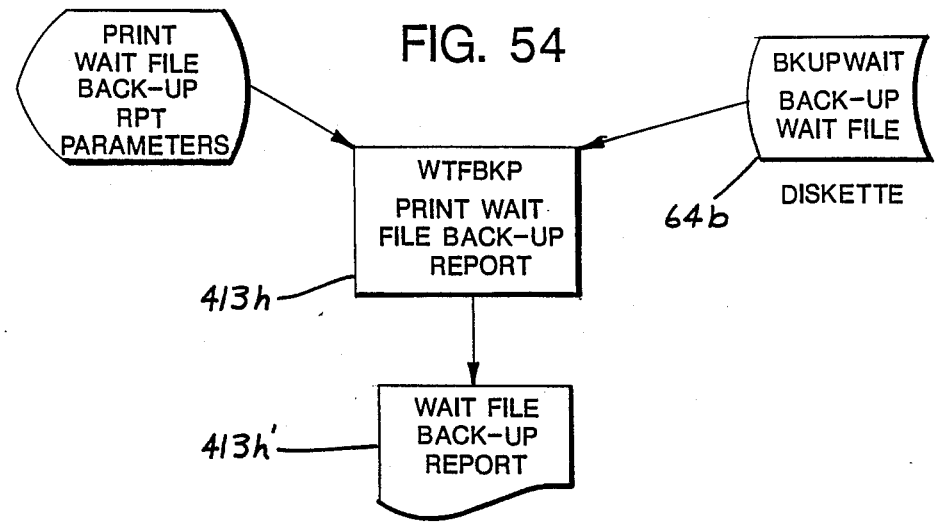

The Print Wait File Backup Report function 413*h* is shown in FIG. 54. Function 413*h* causes the Backup Wait File diskette 64*b* to be read in order to print the Wait File Backup Report 413*h*'.

Figure 55:
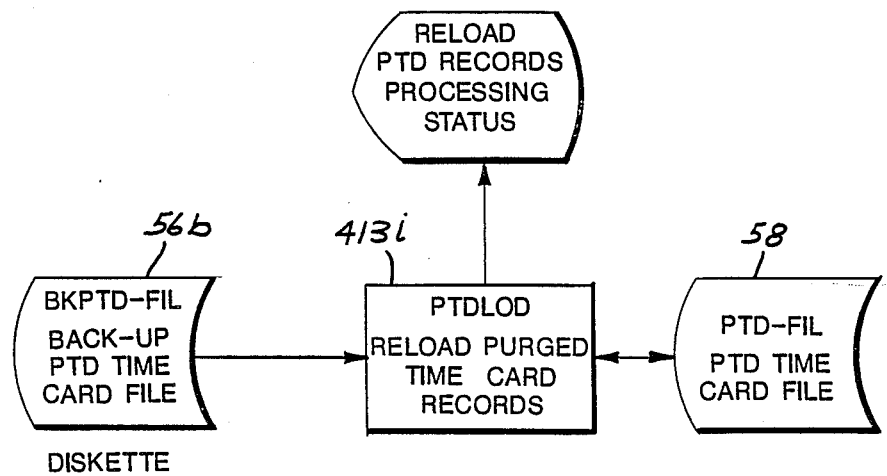

In FIG. 55, the Reload Purged Timecard Records function 413*j* is shown. Function 413*j* causes all records from the Backup Period to Date Timecard File diskette 56*b* to be written to the TIMECARD FILE 56*b*. If a matching record is found in the TIMECARD FILE 56 the record is deleted and the record from the File 56*b* is written in place of it. If a matching record is not found, the File 56*b* record is simply written to the TIMECARD FILE 56.

Figure 56:
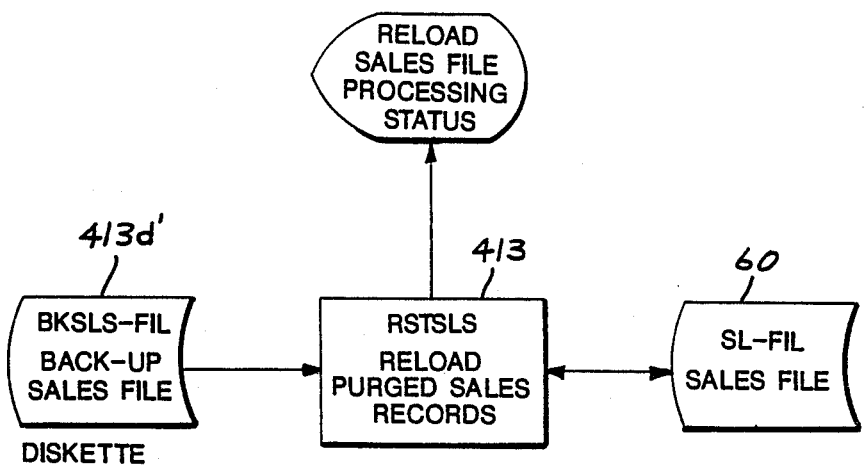

The Reload Purged Sales Record function 413*k* is shown in FIG. 56. Function 413*k* causes all records from the Sales File Backup diskette 60*b* to be written to the SALES FILE 60. If a duplicate record is found in SALES FILE 60, the original sales file record is deleted and the backup record written thereover.

Figure 57:
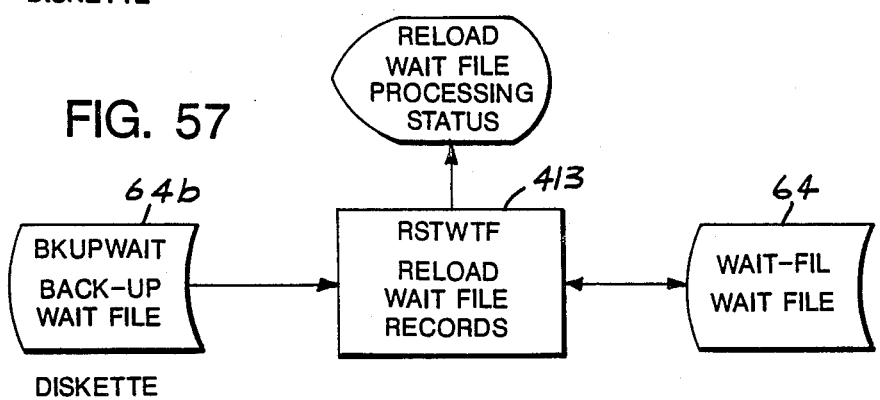

In FIG. 57 the Reload Wait File Records function 413*m* is illustrated. Function 413*m* causes the diskette Backup Wait File 64*b* to be written to the WAIT FILE 64. If a duplicate record is found the original wait file record is deleted.

Figure 58:
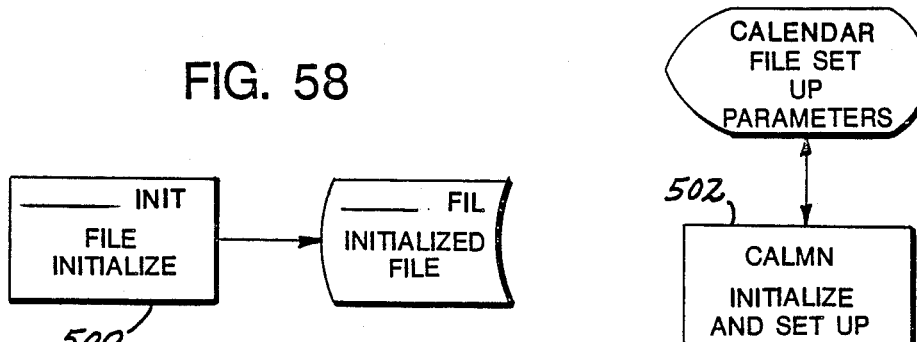
Figure 59:
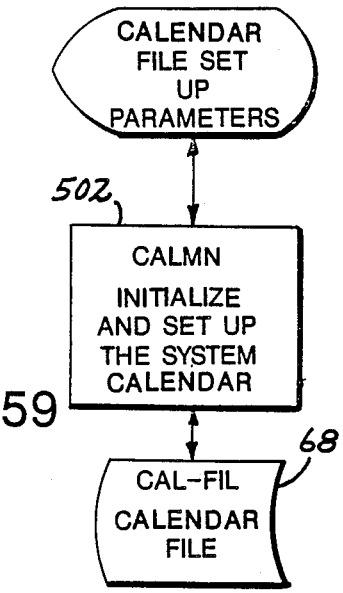
Figure 60:
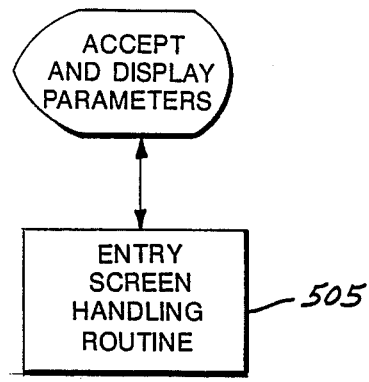
Figure 61:
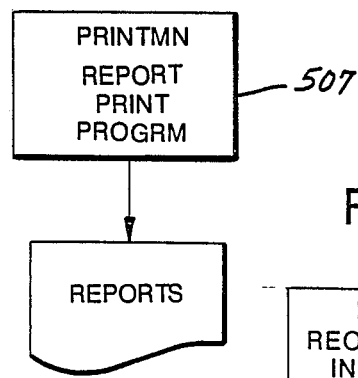
Figure 63:
Figure 62:
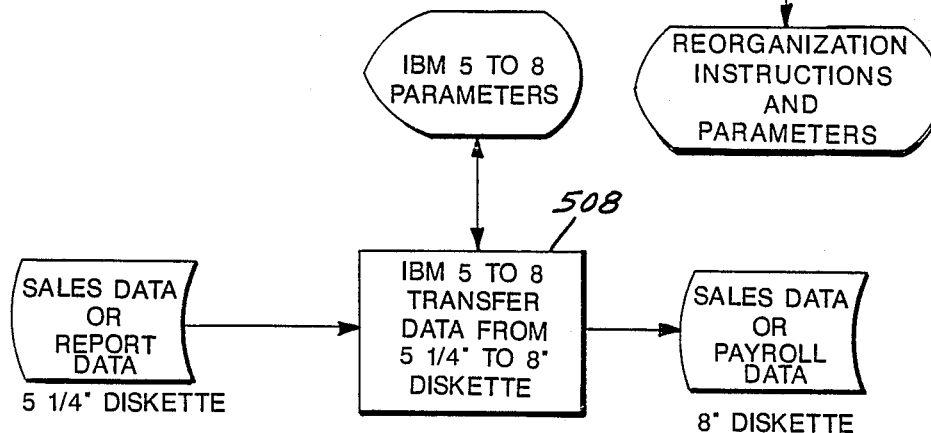

Several other miscellaneous files are shown in FIGS. 58–62. In FIG. 58, the File Initialize function 500 is shown. Initialize function 500 may be called to initialize any of the various files, for instance the EMPLOYEE FILE 50, JOB FILE 52 etc. In FIG. 59 there is shown the special Initialize and Setup the System Calendar function 502, which is provided to build the CALEN- DAR FILE 68. A calendar start date is entered by the operator and function 502 builds one calendar file record for each day for 550 days. This function need only be called once every year or so in order to keep the CALENDAR FILE 68 current. In FIG. 60 there is shown the Entry Screen Handling Routine 505, which provides for the accepting the displaying of input fields throughout the system software 400. In FIG. 61 there is shown the Report Print Program 507, which is called by all the programs that send output to the printer 24. Program 507 controls line spacing, line counting, page numbering and report heading printing. In FIG. 62, there is shown the special function 508, which provides for the transfer of data from 5¼" to 8" diskettes. This function is implemented in order to convert the files created by Payroll Records function 413a and Creates Sales Records function 413d from 5¼" diskette format to 8" diskette format. Finally, in FIG. 63, there is shown the Reorganization routine, which may be used to reorganize or reformat the various dynamic files of the system as need be.

Operation

A brief overview of the operation of the system of the present invention will now be given. As indicated above, the operation of the system of the present invention must begin with the building of the various personal computer 20 files. As will be discussed below, there are only a few files which absolutely must be assembled prior to operation of the time clock 10. However, it is preferable that the EMPLOYEE FILE 50, JOB FILE 52, SCHEDULE FILE 54, STORE FILE 66, CALENDAR FILE 68 and PASSWORD FILE 69 are all assembled or initialized with employee, job schedule, store, calendar and password data before operation of time clock 10. Since the SALES FILE 60, SERVER FILE 62 and WAIT FILE 64 are used only for the purposes of analysis and reports, the building and maintenance of these files is completely optional with respect to operating time clock 10.

Thus, it is preferable to build the EMPLOYEE FILE 50, JOB FILE 52, STORE FILE 66, CALENDAR FILE 68 and PASSWORD FILE 69 as an initial matter in the utilization of the system. It is presumed, of course, that all of the files maintained via personal computer 20 are at least initialized, i.e. created but not necessarily loaded with information, at the outset. As discussed above, SCHEDULE FILE 54 is preferably prepared with at least one schedule record for each employee to be working during the week the time clock 10 is utilized. Thus, with SCHEDULE FILE 54, EMPLOYEE FILE 50 and PASSWORD FILE 69 loaded, personal computer 20 is prepared to download to time clock 10 a full set of records for utilization thereby.

The system of the present invention is designed such that one transfer of records between the personal computer 20 and time clock 10 occurs each day, preferably at the end of each day. In practice, personal computer 20 would be kept in the manager's or supervisor's office. Sometime near the end of the working day, or just prior to the end of day processing on time clock 10, software 400 is loaded into personal computer 20, and the Create Time Clock Files function 412a is executed. As mentioned above, this function generates the TIME-CLOCK TRANSMISSION EMPLOYEE FILE 50" and SCHEDULE TIME CLOCK TRANSMISSION FILE 54" from EMPLOYEE FILE 50 and SCHEDULE FILE 54 as described above for transmission to TIME CLOCK 10. Next, the Transmit Time Clock Files function 412b is executed. However, personal computer 20 will not retrieve from or transmit files to time clock 10, or in other words operates in a stand-by mode, until the End-of-Day routine 220 is executed via the MANAGER functions on time clock 10.

When the End-of-Day routine 220 is executed on time clock 10, the Transmit Time Clock Files function 412b (communications between time clock and personal computer) becomes active, performing the following tasks. First of all, the CURRENT TIME RECORDS FILE 59 is retrieved from time clock 10. That file, as described above, is then used to automatically update the TIMECARD FILE 56 and PAY PERIOD FILE 58. The PAY PERIOD FILE 58 is then converted to the SEQUENTIAL TIME CLOCK TRANSMISSION FILE 58" and transmitted to time clock 10, along with EMPLOYEE FILE 50" and SCHEDULE FILE 54". Thus, once this process has been completed, time clock 10 includes the most current EMPLOYEE FILE 50', SCHEDULE FILE 54', and an updated PAY PERIOD FILE 58'. The CURRENT TIME RECORDS FILE 59 is also initialized. In this manner, the TIME CARD FILE 56 and PAY PERIOD FILE 58 are updated on a day to day basis, recording time records. At the end of each pay period, the PAY PERIOD FILE 58' is purged by function 412e (after its contents have been updated to the TIMECARD FILE 56) so that it starts a new pay period in an initialized condition.

At the end of each pay period, various pay period processing provided by module 413 may be executed. For instance, function 413a would be used to create payroll records on an 8" diskette in a format compatable with a further payroll check generating computer system. In addition, the Sales File Transaction Records 74 may be prepared via function 413b, and the PERIOD TO DATE TIMECARD FILE 56 may be backed up and purged if desired, although this is not essential. In addition, sales or wait records may be purged (functions 413d, 413e), and the various other backup reports may be generated if desired.

In addition to the scheduling, timekeeping and payroll functions as described above, the system may of course also be operated in order to maintain or analyze financial data relating to sales with respect to either individual employees or stores, as described in more detail above. Much of the information recorded in (i.e. inputted to) the SALES FILE 60 and WAIT FILE 64 is of course collected from cash register records, service checks and other receipts or records. Optionally, much of this sales information may be acquired directly from the various cash registers 30 in the system, which as mentioned above may communicate with personal computer via an RS 232 interface. Cash registers 30 are preferably computer driven, and include record keeping functions, so that sales could be recorded by server number, and so that sales may be entered and broken down by category descriptions (i.e. food, wine, beer etc. ...).

Moreover, the financial data may be reported or analyzed with reference to the TIMECARD FILE 56 records so that productivity analysis may be accomplished, for example by labor distribution reports or individual sales reports with that produce sales/hour worked etc. ..., as described more fully above.

Although it is preferable to operate the system of the present invention using most of its files, it is possible to utilize it at a lower level, which is the minimum required to enable time clock 10 to operate, performing time-in and time-out transactions and accummulating CURRENT TIME RECORDS 59. At this lower level, there is only one file which must be downloaded from personal computer 20 to time clock 10. That file is the EMPLOYEE FILE 50', which as indicated above contains a record corresponding to each employee, and in particular the employee numbers, employee names and the valid job codes and corresponding tip codes for each employee. In addition, EMPLOYEE FILE 50' also includes the manager password. Thus, the initialized (upon power reset) time clock 10, loaded with EMPLOYEE FILE 50', may operate to record time-in and time-out transactions in CURRENT TIME RECORDS FILE 59. This is possible because, as described above, the time-in and time-out routines 113 and 114, respectively, include conditional jumps which branch around those aspects of the routines which make reference to SCHEDULE FILE 54'. In addition, the absence of records in PAY PERIOD FILE 58' will not interrupt the operation of the TIME CLOCK 10, but will only result in the absence from any certification printout of those transactions which may have occurred on previous days in the current pay period. It shall be understood, however, that TIME CLOCK 10 is preferably operated with all three files 50', 54' and 58' intact.

Similarly with respect to personal computer 20, there are only two files which are absolutely necessary to get time clock 10 up and running. Those files are the EMPLOYEE FILE 50 and the PASSWORD FILE 69, which must be present and properly maintained in order to assemble the EMPLOYEE TIME CLOCK TRANSMISSION FILE 50" for transmission to TIME CLOCK 10. However, as described above, the Employee File Maintenance module 408 does call upon the JOB FILE 52 in the process of compiling and maintaining the EMPLOYEE FILE 50. Moreover, it is important that the SCHEDULE FILE 54, TIMECARD FILE 56 and PAY PERIOD FILE 58 be at least initialized, although without data, so that the Create Time Clock Files function 412a and Transmit Time Clock Function 412b do not "bomb" or handup when the files are referenced.

Thus, it will be seen that the present invention provides a comprehensive scheduling, timekeeping, payroll record preparation, sales analysis and reporting system. Although the invention is illustrated only in its preferred form, those skilled in the art will recognize that many modifications or changes may be made without departing from the spirit and scope of the invention as set forth in the claims appended hereto.

What is claimed is:

1. A system of time keeping for hourly employees wherein a plurality of said hourly employees time-in and time-out at a central time clock location when beginning and ending a workshift respectively, a time clock computer located at said location and including input means for entering commands and data, output printer means for printing time certification receipts for an employee, output display means for displaying information to an employee, clock means for maintaining the current time and date and memory means for holding digital data indicative of valid employee codes, the employee name associated with each of said employee codes, valid job codes correlated with employee codes and indicative of what job an employee is scheduled to perform on a work shift and if the job involves the receipt of tips, daily time records of time-in and time-out transactions made by employees at the beginning and end of a work shift and period-to-date time records of period-to-date time-in and time-out transactions recorded by the time clock during a predetermined pay period, said system further including software means operative in said time clock computer for controlling a time-in or time-out transaction, said software means comprising:

(a) means for monitoring said input means to detect and interpret the entry of an employee code and a transaction code by an employee;

(b) means for checking an entered employee code against said valid employee codes;

(c) means for rejecting invalid employee codes and causing said display means to display a message indicative thereof:

(d) means for dating time-in and time-out transactions recorded in daily time records with the current date obtained from said clock means;

(e) time-in routine means responsive to a time-in transaction code for performing the steps of:

(i) checking the entered employee code to determine if the employee has a current time-in transaction recorded in a daily time record and aborting the time-in transaction if the employee is currently timed-in;

(ii) reading the current time from said clock means to provide a time-in time;

(iii) retrieving the employee's name associated with said employee code and displaying said name through said display means;

(iv) creating a daily time record for the employee timing in and recording in said daily time record said time-in time;

(v) storing said daily time record in said memory means; and (f) time-out routine means responsive to a time-out transaction code for performing the steps of:

(i) checking for a corresponding daily time-in transaction in a daily time record for the employee and aborting the time-out transaction if there is no daily time record indicating the employee has timed-in;

(ii) reading the current time from said clock means to provide a time-out time;

(iii) recording said time-out time in the daily time record of the employees created when said employee timed-in; and (iv) determining whether the job the employee is timing-out for involved tips as indicated in said job code data;

(v) prompting the employee to enter the amount of tips received during the time they were working if it is determined that the job worked involved tips;

(vi) recording the entered amount in the employee's daily time record;

(vii) printing with said printer means a certification receipt for the employee timing out, said receipt including a record of the time-in and time-out times recorded in the daily time record and the time-in and time-out times recorded in the period-to-date record for the employee timing out, the date of said time-in and time-out transactions in said records also being indicated on said receipt so that said printed certification receipt provides a period-to-date summary of time transactions for the employee; and (g) said system further including communication means for transferring at least said daily time records in digital form to a payroll computer.

2. A system of time keeping for hourly employees wherein a plurality of said hourly employees time-in and time-out at a central time clock location when beginning and ending a workshift respectively, a time clock computer located at said location and including input means for entering commands and data, output printer means for printing time certification receipts for an employee, output display means for displaying information to an employee, clock means for maintaining the current time and date and memory means for holding digital data indicative of valid employee codes, the employee name associated with each of said employee codes, the scheduled times for scheduled employees, daily time records of time-in and time-out transactions made by employees at the beginning and end of a work shift and period-to date time records of period-to-date time-in and time-out transactions recorded by the time clock during a predetermined pay period, said system further including software means operative in said time clock computer for controlling a time-in or time-out transaction, said software means comprising:

(a) means for monitoring said input, means to detect and interpret the entry of an employee code and a transaction code by an employee;

(b) means for checking an entered employee code against said valid employee codes;

(c) means for rejecting invalid employee codes and causing said display means to display a message indicative thereof;

(d) means for dating time-in and time-out transactions recorded in daily time records with the current date obtained from said clock means;

(e) time-in routine means responsive to a time-in transaction code for performing the steps of:

(i) checking the entered employee code to determine if the employee has a current time-in transaction recorded in a daily time record and aborting the time-in transaction if the employee is currently timed-in;

(ii) reading the current time from said clock means to provide a time-in time;

(iii) retrieving the employee's name associated with said employee code and displaying said name through said display means;

(iv) verifying that an employee attempting to perform a time-in transaction is scheduled to work at said time-in time; and (v) aborting said time-in transaction if the employee is not scheduled to work;

(vi) creating a daily time record for the employee timing in and recording in said daily time record said time-in time; and (vii) storing said daily time record in said memory means; and (f) time-out routine means responsive to a time-out transaction code for performing the steps of:

(i) checking for a corresponding daily time-in transaction in a daily time record for the employee and aborting the time-out transaction if there is no daily time record indicating the employee has timed-in;

(ii) reading the current time from said clock means to provide a time-out time;

(iii) recording said time-out time in the daily time record of the employee created when said employee timed-in; and (iv) printing with said printer means a certification receipt for the employee timing out, said receipt including a record of the time-in and time-out times recorded in the daily time record and the time-in and time-out times recorded in the period-to-date record for the employee timing out, the date of said time-in and time-out transactions in said records also being indicated on said receipt so that said printed certification receipt provides a period-to-date summary of time transactions for the employee; and (g) said system further including communication means for transferring at least said daily time records in digital form to a payroll computer.

3. The cardless system according to claim 2 further including:

a scheduling computer remote from said time clock computer;

communication means connected between said scheduling computer and said time clock computer for transferring data therebetween;

schedule software means operative in said scheduling computer for generating employee work schedules specifying the times each employee is scheduled to work in digital schedule data form in response to user instructions;

communications software means operative in said time clock computer and said scheduling computer for coordinating the transfer of said schedule data from said scheduling computer to said time clock memory means through said communication means, said communications software means including means operative in said scheduling computer for receiving a transfer of daily time records from said time clock computer via said communication means;

time record file analysis software means operative on said scheduling computer to provide a report in digital data form indicative of the total hours worked by each employee as recorded by said time clock whereby payroll may be prepared from said report.

4. The cardless system according to claim 3 wherein said scheduling computer further includes productivity analysis software means operative on said scheduling computer to provide a report indicative of employee productivity as measured by comparing hours worked against a unit of worked performed, said productivity analysis software means including:

(a) data entry means for receiving data indicative of the units of work performed by individual employees during a predetermined period of time and assembling a performance file including a record for each employee; and (b) analysis means for comparing the time worked indicated in the time records for an employee during said predetermined period of time against the corresponding performance file for an employee and generating a report indicative of the units of work per hour worked for each individual employee.

5. A system of time keeping for hourly employees wherein a plurality of said hourly employees time-in and time-out at a central time clock location when beginning and ending a workshift respectively, a time clock computer located at said location and including input means for entering commands and data, output printer means for printing time certification receipts for an employee, output display means for displaying information to an employee, clock means for maintaining the current time and date and memory means for holding digital data indicative of valid employee codes, the employee name associated with each of said employee codes, valid job codes indicative of what job an employee is scheduled to perform on a work shift, daily time records of time-in and time-out transactions made by employees at the beginning and end of a work shift and period-to-date time records of period-to-date time-in and time-out transactions recorded by the time clock during a predetermined pay period, said system further including software means operative in said time clock computer for controlling a time-in or time-out transaction, said software means comprising:

(a) means for monitoring said input means to detect and interpret the entry of an employee code and a transaction code by an employee;

(b) means for checking an entered employee code against said valid employee codes;

(c) means for rejecting invalid employee codes and causing said display means to display a message indicative thereof;

(d) means for dating time-in and time-out transactions recorded in daily time records with the current date obtained from said clock means;

(e) time-in routine means responsive to a time-in transaction code for performing the steps of:
  (i) checking the entered employee code to determine if the employee has a current time-in transaction recorded in a daily time record and aborting the time-in transaction if the employee is currently timed-in;
  (ii) reading the current time from said clock means to provide a time-in time;
  (iii) retrieving the employee's name associated with said employee code and displaying said name through said display means;
  (iv) prompting with said display means for a job code indicative of the job to be performed by the employee;
  (v) getting a job code entered through said keyboard means by the employee;
  (vi) comparing the entered job code against the valid job code associated with the scheduled job and indicating a discrepancy to the employee if the codes do not match;
  (vii) creating a daily time record for the employee timing in and recording in said daily time record said time-in time;
  (viii) storing said daily time record in said memory means; and (f) time-out routine means responsive to a time-out transaction code for performing the steps of:
  (i) checking for a corresponding daily time-in transaction in a daily time record for the employee and aborting the time-out transaction if there is no daily time record indicating the employee has timed-in;
  (ii) reading the current time from said clock means to provide a time-out time;
  (iii) recording said time-out time in the daily time record of the employee created when said employee timed-in; and
  (iv) printing with said printer means a certification receipt for the employee timing out, said receipt including a record of the time-in and time-out times recorded in the daily time record and the time-in and time-out times recorded in the period-to-date record for the employee timing out, the date of said time-in and time-out transactions in said records also being indicated on said receipt so that said printed certification receipt provides a period-to-date summary of time transactions for the employee; and (g) said system further including communication means for transferring at least said daily time records in digital form to a payroll computer.

6. A system of time keeping for hourly employees wherein a plurality of said hourly employees time-in and time-out at a central time clock location when beginning and ending a workshift respectively, a time clock computer located at said location and including input means for entering commands and data, output printer means for printing time certification receipts for an employee, output display means for displaying information to an employee, clock means for maintaining the current time and date and storage means for holding valid job codes correlated with employee codes and indicative of what job an employee is scheduled to perform on a work shift and if the job involves the receipt of tips, daily time records of time-in and time-out transactions made by employees at the beginning and end of a work shift and period-to-date time records of period-to-date time-in and time-out transactions recorded by the time clock during a predetermined pay period, said time clock computer further including:

(a) means for monitoring said input means to detect and interpret the entry of an employee code and a transaction code by an employee;

(b) means for dating time-in and time-out transactions recorded in daily time records with the current date obtained from said clock means;

(c) time-in means responsive to a time-in transaction code for performing the steps of:
  (i) reading the current time from said clock means to provide a time-in time;
  (ii) creating a daily time record for the employee timing in and recording in a daily time record for the employee said time-in time;
  (iii) storing said daily time record in said storage means; and (d) time-out means responsive to a time-out transaction code for performing the steps of:
  (i) reading the current time from said clock means to provide a time-out time;
  (ii) recording said time-out time in the daily time record of the employee;
  (iii) determining whether the job the employee is timing out for involved tips as indicated in said job code data;
  (iv) prompting the employee to enter the amount of tips received during the time they were working if it is determined that the job worked involved tips; and
  (v) recording the entered amount in the employee's daily time record; and (e) said time clock computer further including means for causing said printer means to print a certification receipt for the employee timing out, said receipt including a record of the time-in and time-out times recorded in the daily time record and/or the time-in and time-out times recorded in the period-to-date record for the employee timing out, the date of said time-in and time-out transactions in said records also being indicated on said receipt so that said printed certification receipt provides a receipt of time transactions for the employee; and (f) said system further including communication means for transferring at least said daily time records from said storage means to a payroll computer.

7. A system of time keeping for hourly employees wherein a plurality of said hourly employees time-in and time-out at a central time clock location when beginning and ending a workshift respectively, a time clock computer located at said location and including input means for entering commands and data, output printer means for printing time certification receipts for an employee, output display means for displaying information to an employee, clock means for maintaining the current time and date and storage means for holding the scheduled times for scheduled employees, daily time records of time-in and time-out transactions made by employees at the beginning and end of a work shift and period-to-date time records of period-to-date time-in and time-out transactions recorded by the time clock during a predetermined pay period, said time clock computer further including:

(a) means for monitoring said input means to detect and interpret the entry of an employee code and a transaction code by an employee;

(b) means for dating time-in and time-out transactions recorded in daily time records with the current date obtained from said clock means;

(c) time-in means responsive to a time-in transaction code for performing the steps of:
   (i) reading the current time from said clock means to provide a time-in time;
   (ii) verifying that an employee attempting to perform a time-in transaction is scheduled to begin work at said time-in time;
   (iii) preventing said time-in transaction if the employee is not scheduled to begin work at said time-in time;
   (iv) creating a daily time record for the employee timing in and recording in a daily time record for the employee said time-in time;
   (v) storing said daily time record in said storage means; and (d) time-out means responsive to a time-out transaction code for performing the steps of:
   (i) reading the current time from said clock means to provide a time-out time;
   (ii) recording said time-out time in the daily time record of the employee;

(e) said time clock computer further including means for causing said printer means to print a certification receipt for the employee timing out, said receipt including a record of the time-in and time-out times recorded in the daily time record and/or the time-in and time-out times recorded in the period-to-date record for the employee timing out, the date of said time-in and time-out transactions in said records also being indicated on said receipt so that said printed certification receipt provides a receipt of time transactions for the employee; and (f) said system further including communication means for transferring at least said daily time records from said storage means to a payroll computer.

8. The system according to claim 7 wherein said time clock computer further includes manager control means activated by entry of manager password code at said input means for performing the steps of:

(a) acquiring a manually entered, time-in time, time-out time, and employee code from said input means;

(b) using said entered times and employee code to create or alter schedule data so that a manager can create or alter schedule data at said time clock computer.

9. A system of time keeping for hourly employees wherein a plurality of said hourly employees time-in and time-out at a central time clock location when beginning and ending a workshift respectively, a time clock computer located at said location and including input means for entering commands and data, output printer means for printing time certification receipts for an employee, output display means for displaying information to an employee, clock means for maintaining the current time and date and storage means for holding valid job codes indicative of what job an employee is scheduled to perform on a work shift, daily time records of time-in and time-out transactions made by employees at the beginning and end of a work shift and period-to-date time records of period-to-date time-in and time-out transactions recorded by the time clock during a predetermined pay period, said time clock computer further including:

(a) means for monitoring said input means to detect and interpret the entry of an employee code and a transaction code by an employee;

(b) means for dating time-in and time-out transactions recorded in daily time records with the current date obtained from said clock means;

(c) time-in means responsive to a time-in transaction code for performing the steps of:
   (i) reading the current time from said clock means to provide a time-in time;
   (ii) prompting with said display means for a job code indicative of the job to be performed by the employee;
   (iii) getting a job code entered through said input means by the employee;
   (iv) comparing the entered job code against the valid job code associated with the scheduled job and indicating a discrepancy to the employee if the codes do not match;
   (v) creating a daily time record for the employee timing in and recording in a daily time record for the employee said time-in time;
   (vi) storing said daily time record in said storage means; and (d) time-out means responsive to a time-out transaction code for performing the steps of:
   (i) reading the current time from said clock means to provide a time-out time;
   (ii) recording said time-out time in the daily time record of the employee;

(e) said time clock computer further including means for causing said printer means to print a certification receipt for the employee timing out, said receipt including a record of the time-in and time-out times recorded in the daily time record and/or the time-in and time-out times recorded in the period-to-date record for the employee timing out, the date of said time-in and time-out transactions in said records also being indicated on said receipt so that said printed certification receipt provides a receipt of time transactions for the employee; and (f) said system further including communication means for transferring at least said daily time records from said storage means to a payroll computer.

10. A system of time keeping for hourly employees wherein a plurality of said hourly employees time-in and time-out at a central time clock location when beginning and ending a workshift respectively, a time clock computer located at said location and including input means for entering commands and data, output printer means for printing time certification receipts for an employee, output display means for displaying information to an employee, clock means for maintaining the current time and date and storage means for holding the scheduled times for scheduled employees, daily time records of time-in and time-out transactions made by employees at the beginning and end of a work shift and period-to-date time records of period-to-date time-in and time-out transactions recorded by the time clock during a predetermined pay period, said time clock computer further including:

(a) means for monitoring said input means to detect and interpret the entry of an employee code and a transaction code by an employee;

(b) means for dating time-in and time-out transactions recorded in daily time records with the current date obtained from said clock means;

(c) time-in means responsive to a time-in transaction code for performing the steps of:
 (i) reading the current time from said clock means to provide a time-in time;
 (ii) creating a daily time record for the employee timing in and recording in a daily time record for the employee said time-in time;
 (iii) storing said daily time record in said storage means; and (d) time-out means responsive to a time-out transaction code for performing the steps of:
 (i) reading the current time from said clock means to provide a time-out time;
 (ii) preventing an employee from timing out at a time more than a predetermined time interval later than the scheduled time-out time;
 (iii) recording said time-out time in the daily time record of the employee; and (e) said time clock computer further including means for causing said printer means to print a certification receipt for the employee timing out, said receipt including a record of the time-in and time-out times recorded in the daily time record and/or the time-in and time-out times recorded in the period-to-date record for the employee timing out, the date of said time-in and time-out transactions in said records also being indicated on said receipt so that said printed certification receipt provides a receipt of time transactions for the employee; and (f) said system further including communication means for transferring at least said daily time records from said storage means to a payroll computer.

11. A system of time keeping for hourly employees wherein a plurality of said hourly employees time-in and time-out at a central time clock location when beginning and ending a workshift respectively, a time clock computer located at said location and including input means for entering commands and data, output printer means for printing time certification receipts for an employee, output display means for displaying information to an employee, clock means for maintaining the current time and date and storage means for holding daily time records of time-in and time-out transactions made by employees at the beginning and end of a work shift and period-to-date time records of period-to-date time-in and time-out transactions recorded by the time clock during a predetermined pay period, said time clock computer further including:

(a) means for monitoring said input means to detect and interpret the entry of an employee code and a transaction code by an employee;

(b) means for dating time-in and time-out transactions recorded in daily time records with the current date obtained from said clock means;

(c) time-in means responsive to a time-in transaction code for performing the steps of:
 (i) reading the current time from said clock means to provide a time-in time;
 (ii) creating a daily time record for the employee timing in and recording in a daily time record for the employee and time-in time;
 (iii) storing said daily time record in said storage means, and (d) time-out means responsive to a time-out transaction code for performing the steps of:
 (i) reading the current time from said clock means to provide a time-out time;
 (ii) recording said time-out time in the daily time record of the employee;

(e) manager control means activated by entry of manager password code at said input means for performing the steps of:
 (i) acquiring an employee code from said input means;
 (ii) acquiring a manually entered time from said input means; and
 (iii) using said entered time to create or replace a time-in or time-out time in the daily time record corresponding to the employee code acquired in step (i) so that a manager can create or alter employee time records at said time clock computer; and (f) said time clock computer further including means for causing said printer means to print a certification receipt for the employee timing out, said receipt including a record of the time-in and time-out times recorded in the daily time record and/or the time-in and time-out times recorded in the period-to-date record for the employee timing out, the date of said time-in and time-out transactions in said records also being indicated on said receipt so that said printed certification receipt provides a receipt of time transactions for the employee; and (g) said system further including communications means for transferring at least said daily time records from said storage means to a payroll computer.

12. A system of time keeping for hourly employees wherein a plurality of said hourly employees time-in and time-out at a central time clock location when beginning and ending a workshift respectively, a time clock computer located at said location and including input means for entering commands and data, output printer means for printing time certification receipts for an employee, output display means for displaying information to an employee, clock means for maintaining the current time and date and storage means for holding daily time records of time-in and time-out transactions made by employees at the beginning and end of a work shift and period-to-date time records of period-to-date time-in and time-out transactions recorded by the time clock during a predetermined pay period, said time clock computer further including:

(a) means for monitoring said input means to detect and interpret the entry of an employee code and a transaction code by an employee;

(b) means for dating time-in and time-out transactions recorded in daily time records with the current date obtained from said clock means;

(c) time-in means responsive to a time-in transaction code for performing the steps of:
  (i) reading the current time from said clock means to provide a time-in time;
  (ii) creating a daily time record for the employee timing in and recording in a daily time record for the employee said time-in time;
  (iii) storing said daily time record in said storage means; and (d) time-out means responsive to a time-out transaction code for performing the steps of:
  (i) reading the current time from said clock means to provide a time-out time;
  (ii) recording said time-out time in the daily time record of the employee;

(e) manager control means activated by entry of manager password code at said input means for performing the steps of:
  (i) acquiring an employee code from said input means;
  (ii) acquiring one or more manually entered times from said input means;
  (iii) using said entered time or times to create a daily time record corresponding to the employee code acquired in step (i) and cause said printer to print a corresponding time certification receipt; and (f) said time clock computer further including means for causing said printer means to print a certification receipt for the employee timing out, said receipt including a record of the time-in and time-out times recorded in the daily time record and/or the time-in and time-out times recorded in the period-to-date record for the employee timing out, the date of said time-in and time-out transactions in said records also being indicated on said receipt so that said printed certification receipt provides a receipt of time transactions for the employee; and (g) said system further including communication means for transferring at least said daily time records from said storage means to a payroll computer.

13. A method of time keeping for hourly employees, said method comprising the steps of:

(a) providing a time clock computer accessible by hourly employees time clock location at the beginning and end of a work shift, said time clock computer including input means for entering commands and data, output printer means for printing time certification receipts for an employee, clock means for maintaining the current time and date, and storage means for holding daily time records of time-in and time-out transactions made by employees at the beginning and end of a work shift and period-to-date time records of period-to-date time-in and time-out transactions recorded by the time clock during a predetermined pay period;

(b) waiting for an entry and data at said input means;

(c) entering an employee code and a transaction code into said input means;

(d) accepting said codes from said input means;

(e) determining whether said transaction code is a time-in transaction or a time-out transaction and if said transaction code is a time-out transaction, performing step (i) next and if said transaction code is a time-in transaction, performing step (f) next;

(f) creating a daily time record for the employee timing in and dating the record with the current date obtained from said clock means;

(g) reading the current time from said clock means to provide a time-in time and recording in said daily time record said time-in time;

(h) storing said daily time record in said storage means and returning to step (b);

(i) reading the current time from said clock means to provide a time-out time;

(j) recording said time-out time in the daily time record of the employee;

(k) printing with said output printer means a certification receipt for the employee timing out including a record of the time-in and time-out times recorded in the daily time record and/or the time-in and time-out times recorded in the period-to-date record for the employee timing out, the date of such time-in and time-out transactions in said records also being indicated on said receipt;

(l) removing said certification receipt from said output printer means and retaining the receipt as a paper record of the employee's time transactions; and (m) returning to step (b).

14. The method according to claim 13 wherein said time clock computer further includes output display means for displaying information to an employee and further comprising the step of verifying at said output display means that the employee code entered in step (c) is the proper employee code.

15. A method of cardless time keeping wherein there are no employee timecards on which time is recorded in human readable form for the employee, said method comprising the steps of:

(a) providing a time clock computer accessible by hourly employees for timing in and out at the beginning and end of a work shift, said time clock computer including:
  (i) input means for entering commands and data for timing in and out;
  (ii) storage means for holding daily time records;
  (iii) clock means for maintaining the current time and for providing time-in and time-out times;
  (iv) output printer means for printing time certification receipts for an employee;
  (v) transaction control means for accepting time in and time out commands and data entered at said input means by an employee and for performing a time in or time out transaction in response to said commands and data, the time of the time in or time out transaction obtained from said clock means, and for recording time in and time out transactions in said storage means and causing said output printer means to print a certification receipt for time recorded by said time clock computer;

(b) entering a time-in transaction code and an employee code at said input means at the beginning of a work shift;

(c) entering a time-out transaction code and an employee code at the end of a work shift;

(d) removing the certification receipt for said recorded time from said output printer means and keeping said receipt as a permanent record of hours worked.

16. A method of timekeeping for an hourly employee, comprising:

(a) providing time clock apparatus for accomplishing a timekeeping transaction, each said timekeeping transaction including a time-in transaction and a time-out transaction, said apparatus including:

(i) input means for initiating time-in and time-out transactions and for inputting time-in and time-out transaction data, said data including an identification of the employee accomplishing the transaction;

(ii) means for recording a time-in and time-out time for time-in and time-out transactions, representing and creating digital data record of the time said employee has worked;

(iii) means for printing a human-readable certification receipt of said timekeeping transaction;

(b) said employee initiating a time-in transaction and entering time-in transaction data at said input means;

(c) said employee initiating a time-out transaction and entering time-out transaction data at said input means; and (d) said employee obtaining said certification receipt from said means for printing and keeping it as a record of said timekeeping transaction.

17. A method according to claim 16 wherein said means for printing prints a said certification receipt at the time of a time-in transaction to provide a record thereof.

18. A method according to claim 16 wherein said means for printing prints a said certification receipt at the time of a time-out transaction and wherein said receipt includes a record of the times of said time-in and time-out transaction to provide a record thereof.

19. A method according to claim 16 wherein said input means includes keyboard input means for inputting time-in and time-out transaction data, and further wherein said time-in transaction data and said time-out transaction data entered in steps (b) and (c) is entered using said keyboard means.

20. A method according to claim 16 further wherein said means for recording includes random access memory means for storing said digital data record.

21. A method according to claim 16 further wherein said method includes the step of using said digital data record to prepare a payroll check for said employee.

22. A method according to claim 16 further wherein said time clock apparatus includes a display means for displaying information and means for storing the name of said employee, and further including means active during a time-in or time-out transaction to display the name of said employee.

23. A method according to claim 16 further wherein said time clock apparatus includes memory means for storing a time schedule for said employee, and further wherein said time clock apparatus includes a means for preventing said employee from performing a time-out transaction unless said transaction is in accordance with said schedule.

24. A method according to claim 16 further wherein said time clock apparatus includes memory means for storing a time schedule for said employee, and further wherein said time clock apparatus includes a means for preventing said employee from performing a time-out transaction unless said transaction is in accordance with said schedule.

25. A method according to claim 16 further wherein said means for recording includes means for maintaining a record of all timekeeping transactions for a predetermined period.

26. A method according to claim 25 further wherein said certification receipt includes a record of all timekeeping transactions recorded during said predetermined period.

27. A method according to claim 16 further wherein said time clock apparatus includes means for storing job designation data for said employee and further wherein said apparatus includes means for checking job code data entered by an employee against said job designation data and preventing said employee from accomplishing a time-in transaction unless said job code data matches said job designations data, and wherein said method further includes the step of said employee entering said job code data as part of said time-in transaction data.

28. A method according to claim 16 further wherein said time clock apparatus includes memory means for storing a time schedule for said employee, and further wherein said time clock apparatus includes a means for using the scheduled time-in time as the time-in time for said record if said employee performs a time-in transaction before said scheduled time-in time.

29. A method according to claim 16 further wherein said time clock apparatus includes memory means for storing a time schedule for said employee, and further wherein said time clock apparatus includes a means for preventing said employee from performing a time-out transaction if the time of said time-out transaction is later than the scheduled time-out time until said attempted time-out transaction is approved by a manager.

* * * * *

UNITED STATES PATENT AND TRADEMARK OFFICE
CERTIFICATE OF CORRECTION

PATENT NO. : 4,819,162
DATED : April 4, 1989
INVENTOR(S) : Frederick W. Webb, Jr., et al.

It is certified that error appears in the above-identified patent and that said Letters Patent is hereby corrected as shown below:

In claim 3, line 1, please delete "cardless".

In claim 4, line 1, please delete "cardless".

In claim 16, lines 13 and 14, please delete "representing", and also insert --a-- after "creating".

Please add the following claims:

30. A system according to claims 1, 2, 3, 4, 5, 6, 7, 8, 9, 10, 11 or 12 wherein said system is cardless.

31. A method according to claims 13, 16, 17, 18, 19, 20, 21, 22, 23, 24, 25, 26, 27, 28 or 29 further wherein said method of timekeeping is cardless.

Signed and Sealed this

Fifth Day of June, 1990

Attest:

HARRY F. MANBECK, JR.

Attesting Officer   Commissioner of Patents and Trademarks